US010571277B2

(12) United States Patent
Li

(10) Patent No.: US 10,571,277 B2
(45) Date of Patent: Feb. 25, 2020

(54) CHARGER, AND METHOD, APPARATUS AND SYSTEM FOR FINDING CHARGER BASED ON MAP CONSTRUCTING

(71) Applicant: GUANGZHOU AIROB ROBOT TECHNOLOGY CO., LTD., Guangzhou, Guangdong (CN)

(72) Inventor: Beichen Li, Guangdong (CN)

(73) Assignee: GUANGZHOU AIROB ROBOT TECHNOLOGY CO., LTD., Guangzhou (CN)

( * ) Notice: Subject to any disclaimer, the term of this patent is extended or adjusted under 35 U.S.C. 154(b) by 182 days.

(21) Appl. No.: 15/719,659

(22) Filed: Sep. 29, 2017

(65) Prior Publication Data
US 2018/0038697 A1   Feb. 8, 2018

Related U.S. Application Data

(63) Continuation of application No. PCT/CN2015/075564, filed on Mar. 31, 2015.

(51) Int. Cl.
*G01C 21/20* (2006.01)
*G05D 1/02* (2006.01)
*G01S 5/16* (2006.01)
*G01S 13/74* (2006.01)

(52) U.S. Cl.
CPC .......... *G01C 21/206* (2013.01); *G05D 1/027* (2013.01); *G05D 1/0214* (2013.01); *G05D 1/0225* (2013.01); *G05D 1/0234* (2013.01); *G05D 1/0261* (2013.01); *G05D 1/0274* (2013.01); *G01S 5/16* (2013.01); *G01S 13/74* (2013.01); *G05D 1/024* (2013.01); *G05D 1/0242* (2013.01); *G05D 2201/0203* (2013.01)

(58) Field of Classification Search
CPC .. G01C 21/206; G05D 1/0214; G05D 1/0225; G05D 1/027; G05D 1/0234; G05D 1/0261; G05D 1/0274; G05D 1/024; G05D 1/0242; G05D 2201/0203; G01S 5/16; G01S 13/74
See application file for complete search history.

(56) References Cited

U.S. PATENT DOCUMENTS

2005/0213082 A1*  9/2005  DiBernardo ............ G01S 5/163
                                                356/139.03
2013/0138246 A1*  5/2013  Gutmann ............. G05D 1/0231
                                                700/253
2017/0364087 A1* 12/2017  Tang .................... G05D 1/0088

* cited by examiner

*Primary Examiner* — Mussa A Shaawat

(57) ABSTRACT

The present invention discloses a charger, and a method, an apparatus and a system for finding charger based on map constructing, which are performed by means of: when a map for an area to be localized with a charger arranged in is constructed in real time by a mobile electronic device, the constructed map is updated based on coordinate values of a shift position of the charger when the mobile electronic device receives the coordinate values of the shift position of the charger transmitted by the charger which has shifted. Therefore, when the charger has shifted, it only needs to update the position of the charger on the constructed map without reconstructing map, which has the advantages of low cost, simple operation and effective technical results.

26 Claims, 24 Drawing Sheets

```
┌─────────────────────────────────────────────────────────────┐
│   taking a position of the charger as a coordinate origin of a coordinate │
│ system, moving the mobile electronic device with the coordinate origin as │
│ a starting point to traverse all over the area to be localized, calculating and │   S11
│ recording coordinate values of a location of an obstacle based on a moving │
│ direction and a moving distance of the mobile electronic device relative to │
│   the starting point when the mobile electronic device detects the obstacle │
│                   each time during the traversal                │
└─────────────────────────────────────────────────────────────┘
                              │
                              ▼
┌─────────────────────────────────────────────────────────────┐
│     constructing a map according to recorded coordinate values of the       │   S12
│  coordinate origin and the location of each said obstacle when the traversal │
│                          has been finished                                  │
└─────────────────────────────────────────────────────────────┘
                              │
                              ▼
┌─────────────────────────────────────────────────────────────┐
│ updating constructed map based on coordinate values of a shift position of │   S13
│     the charger when the mobile electronic device receives the coordinate    │
│ values of the shift position of the charger transmitted by the charger which │
│                              has shifted                                    │
└─────────────────────────────────────────────────────────────┘
```

Fig. 1

```
┌─────────────────────────────────────────────────────────────┐
│   taking a position of the charger as a coordinate origin of a coordinate system, │
│  moving the mobile electronic device with the coordinate origin as a starting point │   S21
│   to traverse all over the area to be localized, calculating and recording coordinate │
│     values of a location of an obstacle based on a moving direction and a moving │
│    distance of the mobile electronic device relative to the starting point when the │
│    mobile electronic device detects the obstacle each time during the traversal │
└─────────────────────────────────────────────────────────────┘
                              │
                              ▼
┌─────────────────────────────────────────────────────────────┐
│                                                                              │   S22
│   constructing a map according to recorded coordinate values of the coordinate │
│  origin and the location of each said obstacle when the traversal has been finished │
└─────────────────────────────────────────────────────────────┘
                              │
                              ▼
┌─────────────────────────────────────────────────────────────┐
│   moving the mobile electronic device to a position with coordinate values of a │   S23
│       shift position of the charger when the mobile electronic device receives the │
│     coordinate values of the shift position of the charger transmitted by the charger │
│   which has shifted; taking coordinate values of a position of the charger where the │
│  charger is detected by the mobile electronic device as corrected coordinate values │
│     of the shift position of the charger; and updating constructed map based on the │
│              corrected coordinate values of the shift position of the charger │
└─────────────────────────────────────────────────────────────┘
```

Fig. 2 taking a position of the charger as a coordinate origin of a coordinate system, moving the mobile electronic device with the coordinate origin as a starting point to traverse all over the area to be localized; during the traversal, based on a moving direction and a moving distance of the mobile electronic device relative to the starting point, calculating and recording coordinate values of a location of an obstacle each time when the mobile electronic device detects the obstacle, and calculating coordinate values of a location of a locating tag each time when the mobile electronic device obtains information of the locating tag, and recording the information of the locating tag and the corresponding coordinate values — S31 constructing a map according to the recorded coordinate values of the coordinate origin and each said obstacle, and information of the locating tag and coordinate values thereof when the traversal has been finished — S32 updating constructed map based on coordinate values of a shift position of the charger when the mobile electronic device receives the coordinate values of the shift position of the charger transmitted by the charger which has shifted — S33

Fig. 3 taking a position of the charger as a coordinate origin of a coordinate system, moving the mobile electronic device with the coordinate origin as a starting point to traverse all over the area to be localized; during the traversal, based on a moving direction and a moving distance of the mobile electronic device relative to the starting point, calculating and recording coordinate values of a location of an obstacle each time when the mobile electronic device detects the obstacle, and calculating coordinate values of a location of a locating tag each time when the mobile electronic device obtains information of the locating tag, and recording the information of the locating tag and the corresponding coordinate values — S41 constructing a map according to the recorded coordinate values of the coordinate origin and each said obstacle, and information of the locating tag and coordinate values thereof when the traversal has been finished — S42 enabling the mobile electronic device to traverse all over the area to be localized for multiple times with the coordinate origin as the starting point, and correcting the coordinate values of each said locating tag by using a correction algorithm based on the coordinate values of each said locating tag obtained from traversal for each time; and correcting constructed map based on corrected coordinate values — S43 updating constructed map based on coordinate values of a shift position of the charger when the mobile electronic device receives the coordinate values of the shift position of the charger transmitted by the charger which has shifted — S44

Fig. 4 taking any initial position as a coordinate origin of a coordinate system, moving the mobile electronic device with the coordinate origin as a starting point to traverse all over the area to be localized, calculating and recording coordinate values of the charger or an obstacle based on a moving direction and a moving distance of the mobile electronic device relative to the starting point when the mobile electronic device detects the charger or the obstacle each time during the traversal — S91 constructing a map according to recorded coordinate values of the coordinate origin, the charger and the obstacle when the traversal has been finished — S92 updating constructed map based on coordinate values of a shift position of the charger when the mobile electronic device receives the coordinate values of the shift position of the charger transmitted by the charger which has shifted — S93

Fig. 9 taking any initial position as a coordinate origin of a coordinate system, moving the mobile electronic device with the coordinate origin as a starting point to traverse all over the area to be localized, calculating and recording coordinate values of the charger or an obstacle based on a moving direction and a moving distance of the mobile electronic device relative to the starting point when the mobile electronic device detects the charger or the obstacle each time during the traversal — S101 constructing a map according to recorded coordinate values of the coordinate origin, the charger and the obstacle when the traversal has been finished — S102 moving the mobile electronic device to a position with coordinate values of a shift position of the charger when the mobile electronic device receives the coordinate values of the shift position of the charger transmitted by the charger which has shifted; taking coordinate values of a position of the charger where the charger is detected by the mobile electronic device as corrected coordinate values of the shift position of the charger; and updating constructed map based on the corrected coordinate values of the shift position of the charger — S103

Fig. 10 taking any initial position as a coordinate origin of a coordinate system, moving the mobile electronic device with the coordinate origin as a starting point to traverse all over the area to be localized, during the traversal, based on a moving direction and a moving distance of the mobile electronic device relative to the starting point, calculating and recording coordinate values of the charger or an obstacle each time when the mobile electronic device detects the charger or the obstacle, and calculating coordinate values of a location of a locating tag each time when the mobile electronic device obtains information of the locating tag, and recording the information of the locating tag and the corresponding coordinate values — S111 constructing a map according to the recorded coordinate values of the coordinate origin, the charger and each said obstacle, and information of the locating tag and coordinate values thereof when the traversal has been finished — S112 updating constructed map based on coordinate values of a shift position of the charger when the mobile electronic device receives the coordinate values of the shift position of the charger transmitted by the charger which has shifted — S113

Fig. 11 taking any initial position as a coordinate origin of a coordinate system, moving the mobile electronic device with the coordinate origin as a starting point to traverse all over the area to be localized; during the traversal, based on a moving direction and a moving distance of the mobile electronic device relative to the starting point, calculating and recording coordinate values of the charger or an obstacle each time when the mobile electronic device detects the charger or the obstacle, and calculating coordinate values of a location of a locating tag each time when the mobile electronic device obtains information of the locating tag, and recording the information of the locating tag and the corresponding coordinate values — S121 constructing a map according to the recorded coordinate values of the coordinate origin, the charger and each said obstacle and information of the locating tag and coordinate values thereof when the traversal has been finished — S122 enabling the mobile electronic device to traverse all over the area to be localized for multiple times with the coordinate origin as the starting point, and correcting the coordinate values of each said locating tag by using a correction algorithm based on the coordinate values of each said locating tag obtained from traversal for each time; and correcting constructed map based on corrected coordinate values — S123 updating constructed map based on coordinate values of a shift position of the charger when the mobile electronic device receives the coordinate values of the shift position of the charger transmitted by the charger which has shifted — S124

Fig. 12

```
┌─────────────────────────────────────────────────────────────────┐
│   taking a location of a first locating tag as a coordinate origin of a │
│ coordinate system when information of the first locating tag is obtained by │  S171
│ a mobile electronic device which is moving along a certain trajectory for a │
│    first time, and recording the information of the first locating tag and   │
│                        coordinate values thereof                              │
└─────────────────────────────────────────────────────────────────┘
                                    ↓
┌─────────────────────────────────────────────────────────────────┐
│   moving the mobile electronic device with the coordinate origin as a       │  S172
│        starting point to traverse all over the area to be localized          │
└─────────────────────────────────────────────────────────────────┘
                                    ↓
┌─────────────────────────────────────────────────────────────────┐
│ calculating coordinate values of location of other locating tag except the  │
│   first locating tag each time when the mobile electronic device obtains     │
│   information of the other locating tag based on a moving direction and a   │  S173
│   moving distance of the mobile electronic device relative to the starting   │
│   point during the traversal, and recording the information of the other     │
│           locating tag and the corresponding coordinate values               │
└─────────────────────────────────────────────────────────────────┘
                                    ↓
┌─────────────────────────────────────────────────────────────────┐
│ determining whether a locating tag is on the charger based on the unique    │
│   coding information of the locating tag when the mobile electronic device   │  S174
│      obtains the information of any locating tag, so as to obtain coordinate │
│  values of the charger, and sending the coordinate values of the charger to  │
│                               the charger                                     │
└─────────────────────────────────────────────────────────────────┘
                                    ↓                                            S175
┌─────────────────────────────────────────────────────────────────┐
│    constructing a map according to recorded information of the locating tag │
│                          and coordinate values thereof                        │
└─────────────────────────────────────────────────────────────────┘
                                    ↓
┌─────────────────────────────────────────────────────────────────┐
│ updating constructed map based on coordinate values of a shift position of  │  S176
│     the charger when the mobile electronic device receives the coordinate    │
│  values of the shift position of the charger transmitted by the charger which│
│                                has shifted                                    │
└─────────────────────────────────────────────────────────────────┘
```

Fig. 17

| taking a location of a first locating tag as a coordinate origin of a coordinate system when information of the first locating tag is obtained by a mobile electronic device which is moving along a certain trajectory for a first time, and recording the information of the first locating tag and coordinate values thereof | S201 |

↓

| moving the mobile electronic device with the coordinate origin as a starting point to traverse all over the area to be localized | S202 |

↓

| calculating coordinate values of location of other locating tag except the first locating tag each time when the mobile electronic device obtains information of the other locating tag based on a moving direction and a moving distance of the mobile electronic device relative to the starting point during the traversal, and recording the information of the other locating tag and the corresponding coordinate values | S203 |

↓

| determining whether a locating tag is on the charger based on the unique coding information of the locating tag when the mobile electronic device obtains the information of any locating tag, so as to obtain coordinate values of the charger, and sending the coordinate values of the charger to the charger | S204 |

↓

| constructing a map according to recorded information of the locating tag and coordinate values thereof | S205 |

↓

| enabling the mobile electronic device to traverse all over the area to be localized for multiple times with the coordinate origin as the starting point, and correcting the coordinate values of each said locating tag by using a correction algorithm based on the coordinate values of each said locating tag obtained from traversal for each time; correcting constructed map based on corrected coordinate values | S206 |

↓

| updating constructed map based on coordinate values of a shift position of the charger when the mobile electronic device receives the coordinate values of the shift position of the charger transmitted by the charger which has shifted | S207 |

Fig. 20

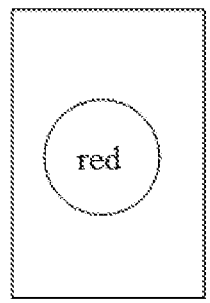 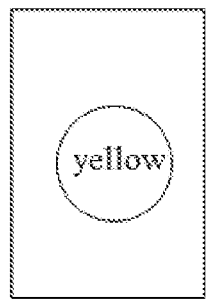 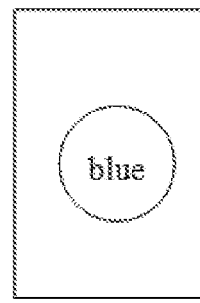
color block tag 1    color block tag 2    color block tag 3
Fig. 27A
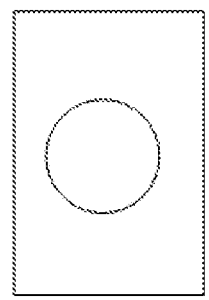 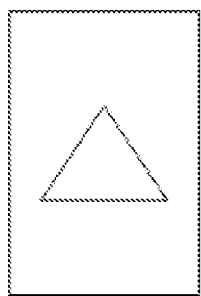 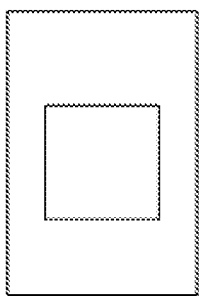
color block tag 1    color block tag 2    color block tag 3
Fig. 27B
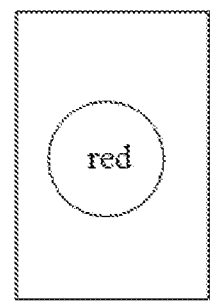 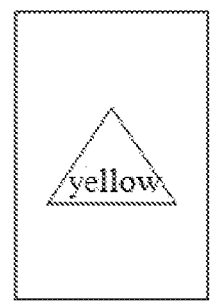 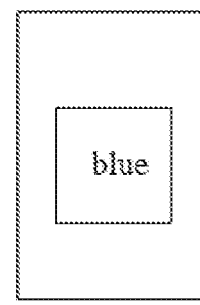
color block tag 1    color block tag 2    color block tag 3
Fig. 27C

CHARGER, AND METHOD, APPARATUS AND SYSTEM FOR FINDING CHARGER BASED ON MAP CONSTRUCTING

CROSS REFERENCE TO RELATED APPLICATIONS

This application is a continuation application of PCT Application No. PCT/CN2015/075564 filed on Mar. 31, 2015, the entire contents of which are incorporated herein by reference.

FIELD OF THE INVENTION

The present invention relates to the simultaneous localization and mapping field, more particularly to a charger, and a method, an apparatus and a system for finding charger based on map constructing.

BACKGROUND OF THE INVENTION

Robots generally adopt battery charger device to provide power. When the battery power is almost exhausted, the robot needs to be charged to maintain its function.

Robots are able to automatically find the charging equipment and realize self-docking charging according to existing technique. In this way it will reduce the cost of human action to get the robots charged. The existing technique for automatically finding the charging equipment by robots mainly adopts the following two approaches:

Approach 1: when a robot need to be charged for battery power almost exhausted, the robot does not construct a map, but search the charger blindly by walking along a wall each time. In this way the robot usually run out of power before finding the charger.

Approach 2: The robot constructs the map, and every time the robot starts traversing the room with the charger as starting point (reference point), the robot returns to the charger according to the constructed map when the battery almost runs out, but in this way, if user moves the charger during map constructing process, the robot still return to the original charger location, leading to the situation that the robot can't find the charger. In addition, there is another drawback that the charger has moved before the robot starts working, so the map constructed with the charger as the starting point (reference point) will fail and have to be reconstructed, as a result the map constructed by the robot can't be optimized and updated.

SUMMARY OF THE INVENTION

The present invention aims to provide a charger, and a method, an apparatus and a system for finding charger based on map constructing, which can effectively solve the problem that robots can't find charger and map constructed with the charger as reference point will fail and have to be reconstructed if the charger has moved according to exiting technique.

The present invention provides a method for finding charger based on map constructing, applicable for real-time mapping of an area to be localized in which a charger is arranged, and the method comprises steps of:

taking a position of the charger as a coordinate origin of a coordinate system, moving the mobile electronic device with the coordinate origin as a starting point to traverse all over the area to be localized, calculating and recording coordinate values of a location of an obstacle based on a moving direction and a moving distance of the mobile electronic device relative to the starting point when the mobile electronic device detects the obstacle each time during the traversal;

constructing a map according to recorded coordinate values of the coordinate origin and the location of each said obstacle when the traversal has been finished; and updating constructed map based on coordinate values of a shift position of the charger when the mobile electronic device receives the coordinate values of the shift position of the charger transmitted by the charger which has shifted.

According to another embodiment of the present invention, when the charger has shifted, the coordinate values of the shift position of the charger are calculated through the following steps:

calculating a direction and a distance of a shift position of the charger based on an angular velocity or/and an angle and an acceleration of the charger relative to a position from which the charger has shifted; and calculating the coordinate values of the shift position of the charger according to coordinate values of the position from which the charger has shifted and the direction and the distance of the shift position of the charger relative to the position from which the charger has shifted.

According to another embodiment of the present invention, the updating constructed map based on coordinate values of a shift position of the charger when the mobile electronic device receives the coordinate values of the shift position of the charger transmitted by the charger which has shifted constructed map specifically comprises steps of:

moving the mobile electronic device to a position with the coordinate values of the shift position of the charger when the mobile electronic device receives the coordinate values of the shift position of the charger transmitted by the charger which has shifted; taking coordinate values of a position of the charger where the charger is detected by the mobile electronic device as corrected coordinate values of the shift position of the charger; and updating constructed map based on the corrected coordinate values of the shift position of the charger.

According to another embodiment of the present invention, the coordinate values of a location of an obstacle are calculated based on a moving direction and a moving distance of the mobile electronic device relative to the starting point when the mobile electronic device detects the obstacle each time in the following manners:

sensing the obstacle by using a collision sensor, and taking coordinate values of the mobile electronic device as the coordinate values of the location of the obstacle when the collision sensor senses a collision with the obstacle; or detecting the obstacle by using a laser sensor/an infrared sensor, and obtaining the location of the obstacle relative to a current location of the mobile electronic device according to a calculation principle of laser/infrared distance when the laser sensor/the infrared sensor detects the obstacle, thus calculating the coordinate values of the location of the obstacle.

As an improvement of the above-described embodiment, at least two locating tags are arranged in the area to be localized, each said locating tag is correspondingly arranged at a specific position of the area to be localized, and the information of each said locating tag comprises unique coding information used for distinguishing an absolute position thereof, the method further comprises step of:

calculating coordinate values of a location of a locating tag each time when the mobile electronic device obtains information of the locating tag based on a moving direction and a moving distance of the mobile electronic device relative to the starting point during the traversal, and recording the information of the locating tag and the corresponding coordinate values; and constructing a map according to recorded information of the locating tag and coordinate values thereof and the coordinate values of the location of each said obstacle.

As an improvement of the above-described embodiment, after constructing the map, the method further comprises steps of:

enabling the mobile electronic device to traverse all over the area to be localized for multiple times with the coordinate origin as the starting point, and correcting the coordinate values of each said locating tag by using a correction algorithm based on the coordinate values of each said locating tag obtained from traversal for each time; and correcting constructed map based on corrected coordinate values.

As an improvement of the above-described embodiment, each said locating tag is RFID tag, and a unique number of each said RFID tag which is originally arranged in the RFID tag or is written into the RFID tag by an RFID reader-writer is taken as the unique coding information of the locating tag.

As an improvement of the above-described embodiment, passive RFID tag is employed as the locating tag, and it is limited that only when the mobile electronic device is closest to one of the locating tags can the mobile electronic device obtain the information of the locating tag, and taking a location of the mobile electronic device where the mobile electronic device obtains the information of the locating tag as the location of the locating tag.

As an improvement of the above-described embodiment, active RFID tag is employed as the locating tag, when the mobile electronic device has sensed the information of any one of the locating tags, the mobile electronic device is enabled to move in a direction in which RSSI of the locating tag is gradually increasing until RSSI of the locating tag sensed by the mobile electronic device is equal to or greater than a preset maximum RSSI value or the mobile electronic device collides with the locating tag, and then taking a location of the mobile electronic device as the location of the locating tag.

As an improvement of the above-described embodiment, each said locating tag is color block tag, the unique coding information is represented by a plurality of different colors, different shapes, combinations of different shapes and different colors or color blocks with different gray scales.

As an improvement of the above-described embodiment, the location of each said color block tag is determined in one of the following manners:

when the mobile electronic device has sensed tag information of any one of the color block tags by using a color sensor, enabling the mobile electronic device to move in a direction in which strength of tag information of the color block tag is gradually increasing until the strength of the tag information of the color block tag sensed by the mobile electronic device is equal to or greater than a preset maximum value or the mobile electronic device collides with the color block tag, and then taking a current location of the mobile electronic device as the location of the color block tag;

when the mobile electronic device has sensed tag information of any one of the color block tags by using a camera, the location of the color block tag relative to the mobile electronic device is determined based on number of pixels obtained by projecting a pattern of the color block tag onto CCD, thereby calculating the coordinate values of the color block tag; or when the mobile electronic device read tag information of the color block tags by using a camera, enabling the mobile electronic device to move in a direction in which a pixel value obtained by projecting a pattern of a color block tag onto CCD is gradually increasing until the pixel value obtained by projecting the pattern of the color block tag onto the CCD reach a certain threshold or the mobile electronic device collides with the color block tag, and then taking a current location of the mobile electronic device as the location of the color block tag.

As an improvement of the above-described embodiment, the method further comprises step of:

correcting each said moving direction and each said moving distance of the mobile electronic device relative to the starting point based on an angular velocity or/and an angle and an acceleration of the mobile electronic device, and coordinate values are obtained according to corrected moving direction and corrected moving distance of the mobile electronic device relative to the starting point.

The present invention provides an apparatus, the apparatus is applicable for real-time mapping of an area to be localized in which a charger is arranged, the apparatus for finding charger based on map constructing is set in a mobile electronic device, and the apparatus comprises:

an encoder, configured to record a moving distance and a moving direction of the mobile electronic device relative to a starting point in real time when the mobile electronic device traverses all over the area to be localized with a location of the charger as a coordinate origin of a coordinate system as the starting point;

an obstacle detecting unit, configured to detect obstacle;

a first calculating unit, configured to calculate coordinate values of a location of an obstacle based on a moving direction and a moving distance of the mobile electronic device relative to the starting point recorded by the encoder when the mobile electronic device detects the obstacle, and send the calculated coordinate values to a coordinate system constructing and recording unit;

a coordinate system constructing and recording unit, configured to record coordinate values of the charger and each said obstacle;

a map constructing unit, configured to construct a map according to coordinate values of the coordinate origin and the location of each said obstacle recorded by the coordinate system constructing and recording unit; and a wireless receiving/transmitting unit, configured to transmit coordinate values of a shift position of the charger when the mobile electronic device receives the coordinate values of the shift position of the charger transmitted by the charger which has shifted to the coordinate system constructing and recording unit to update coordinate values of the charger, so as to cause the map constructing unit to update constructed map.

As an improvement of the above-described embodiment, when the charger has shifted, the coordinate values of the shift position of the charger is calculated through the following steps:

calculating a direction and a distance of a shift position of the charger relative to a position from which the charger has shifted based on an angular velocity or/and an angle and an acceleration of the charger; and calculating the coordinate values of the shift position of the charger according to coordinate values of the position from which the charger has shifted, and the direction and the distance of the shift position of the charger relative to the position from which the charger has shifted.

As an improvement of the above-described embodiment, the apparatus further comprises a laser transmitting/receiving sensor; the mobile electronic device is moved to a position with the coordinate values of the shift position of the charger when the mobile electronic device receives the coordinate values of the shift position of the charger transmitted by the charger which has shifted; coordinate values of a position of the charger where the charger is detected by the laser transmitting/receiving sensor are taken corrected coordinate values of the shift position of the charger; constructed map is updated based on the corrected coordinate values of the shift position of the charger; or the apparatus further comprises an infrared transmitting/receiving sensor or/and a camera, the mobile electronic device is moved to a position with the coordinate values of the shift position of the charger when the mobile electronic device receives the coordinate values of the shift position of the charger transmitted by the charger which has shifted; the mobile electronic device is guided by the infrared transmitting/receiving sensor or/and the camera to an exact position of the charger which is taken as corrected coordinate values of the shift position of the charger; updating constructed map based on the corrected coordinate values of the shift position of the charger.

As an improvement of the above-described embodiment, the obstacle detecting unit comprises a collision sensor, a laser sensor or an infrared sensor;

the first calculating unit takes calculated coordinate values of a current location of the mobile electronic device as the coordinate values of the location of the obstacle when the collision sensor senses a collision with the obstacle; or the laser sensor/the infrared sensor calculates the location of the obstacle relative to a current location of the mobile electronic device according to a calculation principle of laser/infrared distance when the laser sensor/the infrared sensor detects the obstacle, which is sent to the first calculating unit; the first calculating unit calculates the coordinate values of the location of the obstacle based on calculated coordinate values of the current location of the mobile electronic device and the location of the obstacle relative to the current location of the mobile electronic device.

As an improvement of the above-described embodiment, at least two locating tags are arranged in the area to be localized, each said locating tag is correspondingly arranged at a specific position of the area to be localized, and the information of each said locating tag comprises unique coding information used for distinguishing an absolute position thereof, and the apparatus further comprises:

a second calculating unit, configured to calculate coordinate values of a location of a locating tag each time when the mobile electronic device obtains information of the locating tag based on a moving direction and a moving distance of the mobile electronic device relative to the starting point during the traversal, and send the information of the locating tag and the corresponding coordinate values to the coordinate system constructing and recording unit;

a map is constructed according to recorded information of the locating tag and coordinate values thereof and the coordinate values of the location of each said obstacle.

As an improvement of the above-described embodiment, the apparatus further comprises:

a second correcting unit, configured to enable the mobile electronic device to traverse all over the area to be localized for multiple times with the coordinate origin as the starting point, and correcting the coordinate values of each said locating tag by using a correction algorithm based on the coordinate values of each said locating tag obtained from traversal for each time; and send corrected coordinate values to the map constructing unit to correct constructed map.

As an improvement of the above-described embodiment, each said locating tag is RFID tag, and a unique number of each said RFID tag which is originally arranged in the RFID tag or is written into the RFID tag by a RFID reader-writer is taken as the unique coding information of the locating tag.

As an improvement of the above-described embodiment, passive RFID tag is employed as the locating tag, and it is limited that only when the mobile electronic device is closest to one of the locating tags can the mobile electronic device obtain the information of the locating tag, and a location of the mobile electronic device where the mobile electronic device obtains the information of the locating tag is taken as the location of the locating tag.

As an improvement of the above-described embodiment, active RFID tag is employed as the locating tag, when the mobile electronic device has sensed the information of any one of the locating tags, the mobile electronic device is enabled to move in a direction in which RSSI of the locating tag is gradually increasing until RSSI of the locating tag sensed by the mobile electronic device is equal to or greater than a preset maximum RSSI value or the mobile electronic device collides with the locating tag, and then a location of the mobile electronic device is taken as the location of the locating tag.

As an improvement of the above-described embodiment, each said locating tag is color block tag, the unique coding information is represented by a plurality of different colors, different shapes, combinations of different shapes and different colors or color blocks with different gray scales.

As an improvement of the above-described embodiment, the location of each said color block tag is determined in one of the following manners:

when the mobile electronic device has sensed tag information of any one of the color block tags by using a color sensor, enabling the mobile electronic device to move in a direction in which strength of tag information of the color block tag is gradually increasing until the strength of the tag information of the color block tag sensed by the mobile electronic device is equal to or greater than a preset maximum value or the mobile electronic device collides with the color block tag, and then taking a current location of the mobile electronic device as the location of the color block tag;

when the mobile electronic device has sensed tag information of any one of the color block tags by using a camera, the location of the color block tag relative to the mobile electronic device is determined based on number of pixels obtained by projecting a pattern of the color block tag onto CCD, thereby calculating the coordinate values of the color block tag; or when the mobile electronic device read tag information of the color block tags by using a camera, enabling the mobile electronic device to move in a direction in which a pixel value obtained by projecting a pattern of a color block tag onto CCD is gradually increasing until the pixel value obtained by projecting the pattern of the color block tag onto the CCD reach a certain threshold or the mobile electronic device collides with the color block tag, and then taking a current location of the mobile electronic device as the location of the color block tag.

As an improvement of the above-described embodiment, the apparatus further comprises:

a gyro sensor or/and an electronic compass and an accelerometer, configured to record an angular velocity or/and an angle and an acceleration of the mobile electronic device in real time respectively when the mobile electronic device traverses all over the area to be localized with the coordinate origin as the starting point; and a first correcting unit, configured to correct each said moving direction and each said moving distance of the mobile electronic device relative to the starting point based on the angular velocity or/and the angle and the acceleration of the mobile electronic device;

the first calculating unit calculates corrected coordinate values according to corrected moving direction and corrected moving distance of the mobile electronic device relative to the starting point.

The present invention provides a method for finding charger based on map constructing, wherein the method is applicable for real-time mapping of an area to be localized in which a charger is arranged, and the method comprises steps of:

taking any initial position as a coordinate origin of a coordinate system, moving the mobile electronic device with the coordinate origin as a starting point to traverse all over the area to be localized, calculating and recording coordinate values of the charger or an obstacle based on a moving direction and a moving distance of the mobile electronic device relative to the starting point when the mobile electronic device detects the charger or the obstacle each time during the traversal;

constructing a map according to recorded coordinate values of the coordinate origin, the charger and the obstacle when the traversal has been finished; and updating constructed map based on coordinate values of a shift position of the charger when the mobile electronic device receives the coordinate values of the shift position of the charger transmitted by the charger which has shifted.

As an improvement of the above-described embodiment, when the charger has shifted, coordinate values of a shift position of the charger are calculated through the following steps:

calculating a direction and a distance of a shift position of the charger relative to a position from which the charger has shifted based on an angular velocity or/and an angle and an acceleration of the charger; and calculating the coordinate values of the shift position of the charger according to coordinate values of the position from which the charger has shifted, and the direction and the distance of the shift position of the charger relative to the position from which the charger has shifted.

As an improvement of the above-described embodiment, the step of updating constructed map based on coordinate values of a shift position of the charger when the mobile electronic device receives the coordinate values of the shift position of the charger transmitted by the charger which has shifted specifically comprises steps of:

moving the mobile electronic device to a position with the coordinate values of the shift position of the charger when the mobile electronic device receives the coordinate values of the shift position of the charger transmitted by the charger which has shifted;

taking coordinate values of a position of the charger where the charger is detected by the mobile electronic device as corrected coordinate values of the shift position of the charger; and updating constructed map based on corrected coordinate values of the shift position of the charger.

As an improvement of the above-described embodiment, coordinate values of the position of the charger where the charger is detected by the mobile electronic device is calculated in the following manners:

the mobile electronic device is moved to a position with the coordinate values of the shift position of the charger when the mobile electronic device receives the coordinate values of the shift position of the charger transmitted by the charger which has shifted; coordinate values of a position of the charger where the charger is detected by a laser transmitting/receiving sensor are taken as corrected coordinate values of the shift position of the charger; constructed map is updated based on corrected coordinate values of the shift position of the charger; or the mobile electronic device is moved to a position with the coordinate values of the shift position of the charger when the mobile electronic device receives the coordinate values of the shift position of the charger transmitted by the charger which has shifted; the mobile electronic device is guided by an infrared transmitting/receiving sensor or/and a camera to an exact position of the charger which is taken as corrected coordinate values of the shift position of the charger; updating constructed map based on corrected coordinate values of the shift position of the charger.

As an improvement of the above-described embodiment, the coordinate values of the location of the obstacle are calculated when the mobile electronic device detects the obstacle each time in the following manners:

sensing the obstacle by using a collision sensor, and taking coordinate values of the mobile electronic device as the coordinate values of the location of the obstacle when the collision sensor senses a collision with the obstacle; or detecting the obstacle by using a laser sensor/an infrared sensor, and obtaining the location of the obstacle relative to a current location of the mobile electronic device according to a calculation principle of laser/infrared distance when the laser sensor/the infrared sensor detects the obstacle, thus calculating the coordinate values of the location of the obstacle.

As an improvement of the above-described embodiment, at least two locating tags are arranged in the area to be localized, each said locating tag is correspondingly arranged at a specific position of the area to be localized, and information of each said locating tag comprises unique coding information used for distinguishing an absolute position thereof, the method further comprises step of:

calculating coordinate values of a location of a locating tag each time when the mobile electronic device obtains information of the locating tag based on a moving direction and a moving distance of the mobile electronic device relative to the starting point during the traversal, and recording the information of the locating tag and the corresponding coordinate values; and constructing a map according to recorded information of the locating tag and coordinate values thereof and the coordinate values of the location of each said obstacle.

As an improvement of the above-described embodiment, after constructing the map, the method further comprises steps of:

enabling the mobile electronic device to traverse all over the area to be localized for multiple times with the coordinate origin as the starting point, and correcting the coordinate values of each said locating tag by using a correction algorithm based on the coordinate values of each said locating tag obtained from traversal for each time; and correcting constructed map based on corrected coordinate values.

As an improvement of the above-described embodiment, each said locating tag is RFID tag, and a unique number of each said RFID tag which is originally arranged in the RFID tag or is written into the RFID tag by an RFID reader-writer is taken as the unique coding information of the locating tag.

As an improvement of the above-described embodiment, passive RFID tag is employed as the locating tag, and it is limited that only when the mobile electronic device is closest to one of the locating tags can the mobile electronic device obtain the information of the locating tag, and taking a location of the mobile electronic device where the mobile electronic device obtains the information of the locating tag as the location of the locating tag.

As an improvement of the above-described embodiment, active RFID tag is employed as the locating tag, when the mobile electronic device has sensed the information of any one of the locating tags, the mobile electronic device is enabled to move in a direction in which RSSI of the locating tag is gradually increasing until RSSI of the locating tag sensed by the mobile electronic device is equal to or greater than a preset maximum RSSI value or the mobile electronic device collides with the locating tag, and then taking a location of the mobile electronic device as the location of the locating tag.

As an improvement of the above-described embodiment, each said locating tag is color block tag, the unique coding information is represented by a plurality of different colors, different shapes, combinations of different shapes and different colors or color blocks with different gray scales.

As an improvement of the above-described embodiment, the position of each color block tag is determined in one of the following manners:

when the mobile electronic device has sensed tag information of any one of the color block tags by using a color sensor, enabling the mobile electronic device to move in a direction in which strength of tag information of the color block tag is gradually increasing until the strength of the tag information of the color block tag sensed by the mobile electronic device is equal to or greater than a preset maximum value or the mobile electronic device collides with the color block tag, and then taking a current location of the mobile electronic device as the location of the color block tag;

when the mobile electronic device has sensed tag information of any one of the color block tags by using a camera, the location of the color block tag relative to the mobile electronic device is determined based on number of pixels obtained by projecting a pattern of the color block tag onto CCD, thereby calculating the coordinate values of the color block tag; or when the mobile electronic device read tag information of the color block tags by using a camera, enabling the mobile electronic device to move in a direction in which a pixel value obtained by projecting a pattern of a color block tag onto CCD is gradually increasing until the pixel value obtained by projecting the pattern of the color block tag onto the CCD reach a certain threshold or the mobile electronic device collides with the color block tag, and then taking a current location of the mobile electronic device as the location of the color block tag.

As an improvement of the above-described embodiment, the method further comprises step of correcting each said moving direction and each said moving distance of the mobile electronic device relative to the starting point based on an angular velocity or/and an angle and an acceleration of the mobile electronic device, and coordinate values are obtained according to corrected moving direction and corrected moving distance of the mobile electronic device relative to the starting point.

The present invention provides An apparatus for finding charger based on map constructing, the apparatus is applicable for real-time mapping of an area to be localized in which a charger is arranged, the apparatus for finding charger based on map constructing is set in a mobile electronic device, and the apparatus comprises:

an encoder, configured to record a moving distance and a moving direction of the mobile electronic device relative to a starting point in real time when the mobile electronic device traverses all over the area to be localized with any initial position as a coordinate origin of a coordinate system as the starting point;

an obstacle detecting unit, configured to detect obstacle;

a charger detecting unit, configured to detect the charger;

a first calculating unit, configured to calculate coordinate values of the charger or an obstacle based on a moving direction and a moving distance of the mobile electronic device relative to the starting point recorded by the encoder when the mobile electronic device detects the charger or the obstacle each time during the traversal, and send the calculated coordinate values to a coordinate system constructing and recording unit;

a coordinate system constructing and recording unit, configured to record coordinate values of the charger and each said obstacle;

a map constructing unit, configured to construct a map according to coordinate values of the coordinate origin, the charger, each said obstacle recorded by the coordinate system constructing and recording unit; and a wireless receiving/transmitting unit, configured to transmit the coordinate values of the charger obtained by the first calculating unit to the charger, and receive coordinate values of a shift position of the charger transmitted by the charger which has shifted, and send the coordinate values of the shift position of the charger to the coordinate system constructing and recording unit to update coordinate values of the charger, so as to cause the map constructing unit to update constructed map.

As an improvement of the above-described embodiment, when the charger has shifted the coordinate values of the shift position of the charger is calculated through the following steps:

calculating a direction and a distance of a shift position of the charger relative to a position from which the charger has shifted based on an angular velocity or/and an angle and an acceleration of the charger; and calculating the coordinate values of the shift position of the charger according to coordinate values of the position from which the charger has shifted, and the direction and the distance of the shift position of the charger relative to the position from which the charger has shifted.

As an improvement of the above-described embodiment, the charger detecting unit is an infrared transmitting/receiving sensor, and the mobile electronic device is correspondingly arrange with an infrared transmitting/receiving sensor or/and a camera;

the mobile electronic device is guided by the infrared transmitting/receiving sensor or/and the camera to an exact position of the charger which is taken as corrected coordinate values of the shift position of the charger.

As an improvement of the above-described embodiment, the mobile electronic device is moved to a position with the coordinate values of the shift position of the charger when the mobile electronic device receives the coordinate values of the shift position of the charger transmitted by the charger which has shifted; the mobile electronic device is guided by the infrared transmitting/receiving sensor or/and the camera to an exact position of the charger which is taken as corrected coordinate values of the shift position of the charger; constructed map is updated based on corrected coordinate values of the shift position of the charger.

As an improvement of the above-described embodiment, the obstacle detecting unit comprises a collision sensor, a laser sensor or an infrared sensor;

the first calculating unit takes calculated coordinate values of a current location of the mobile electronic device as the coordinate values of the location of the obstacle when the collision sensor senses a collision with the obstacle; or the laser sensor/the infrared sensor calculates the location of the obstacle relative to a current location of the mobile electronic device according to a calculation principle of laser/infrared distance when the laser sensor/the infrared sensor detects the obstacle, which is send to the first calculating unit; the first calculating unit calculates the coordinate values of the location of the obstacle based on the calculated coordinate values of the current location of the mobile electronic device and the location of the obstacle relative to the current location of the mobile electronic device.

As an improvement of the above-described embodiment, at least two locating tags are arranged in the area to be localized, each said locating tag is correspondingly arranged at a specific position of the area to be localized, and the information of each said locating tag comprises unique coding information used for distinguishing an absolute position thereof, and the apparatus further comprises:

a second calculating unit, configured to calculate coordinate values of a location of a locating tag each time when the mobile electronic device obtains information of the locating tag based on a moving direction and a moving distance of the mobile electronic device relative to the starting point during the traversal, and send the information of the locating tag and the corresponding coordinate values to the coordinate system constructing and recording unit;

a map is constructed according to recorded information of the locating tag and coordinate values thereof and the coordinate values of the location of each said obstacle.

As an improvement of the above-described embodiment, the apparatus further comprises:

a second correcting unit, configured to enable the mobile electronic device to traverse all over the area to be localized for multiple times with the coordinate origin as the starting point, and correct the coordinate values of each said locating tag by using a correction algorithm based on the coordinate values of each said locating tag obtained from traversal for each time; and send corrected coordinate values to the map constructing unit to correct constructed map.

As an improvement of the above-described embodiment, each said locating tag is RFID tag, and a unique number of each said RFID tag which is originally arranged in the RFID tag or is written into the RFID tag by an RFID reader-writer is taken as the unique coding information of the locating tag.

As an improvement of the above-described embodiment, passive RFID tag is employed as the locating tag, and it is limited that only when the mobile electronic device is closest to one of the locating tags can the mobile electronic device obtain the information of the locating tag, and a location of the mobile electronic device where the mobile electronic device obtains the information of the locating tag is taken as the location of the locating tag.

As an improvement of the above-described embodiment, active RFID tag is employed as the locating tag, when the mobile electronic device has sensed the information of any one of the locating tags, the mobile electronic device is enabled to move in a direction in which RSSI of the locating tag is gradually increasing until RSSI of the locating tag sensed by the mobile electronic device is equal to or greater than a preset maximum RSSI value or the mobile electronic device collides with the locating tag, and then a location of the mobile electronic device is taken as the location of the locating tag.

As an improvement of the above-described embodiment, each said locating tag is color block tag, the unique coding information is represented by a plurality of different colors, different shapes, combinations of different shapes and different colors or color blocks with different gray scales.

As an improvement of the above-described embodiment, the position of each color block tag is determined in one of the following manners:

when the mobile electronic device has sensed tag information of any one of the color block tags by using a color sensor, enabling the mobile electronic device to move in a direction in which strength of tag information of the color block tag is gradually increasing until the strength of the tag information of the color block tag sensed by the mobile electronic device is equal to or greater than a preset maximum value or the mobile electronic device collides with the color block tag, and then taking a current location of the mobile electronic device as the location of the color block tag;

when the mobile electronic device has sensed tag information of any one of the color block tags by using a camera, the location of the color block tag relative to the mobile electronic device is determined based on number of pixels obtained by projecting a pattern of the color block tag onto CCD, thereby calculating the coordinate values of the color block tag; or when the mobile electronic device read tag information of the color block tags by using a camera, enabling the mobile electronic device to move in a direction in which a pixel value obtained by projecting a pattern of a color block tag onto CCD is gradually increasing until the pixel value obtained by projecting the pattern of the color block tag onto the CCD reach a certain threshold or the mobile electronic device collides with the color block tag, and then taking a current location of the mobile electronic device as the location of the color block tag.

As an improvement of the above-described embodiment, the apparatus further comprises:

a gyro sensor or/and an electronic compass and an accelerometer, configured to record an angular velocity or/and an angle and an acceleration of the mobile electronic device in real time respectively when the mobile electronic device traverses all over the area to be localized with the coordinate origin as the starting point; and a first correcting unit, configured to correct each said moving direction and each said moving distance of the mobile electronic device relative to the starting point based on the angular velocity or/and the angle and the acceleration of the mobile electronic device;

the first calculating unit calculates corrected coordinate values according to corrected moving direction and corrected moving distance of the mobile electronic device relative to the starting point.

The present invention provides a method for finding charger based on map constructing, wherein the method is applicable for real-time mapping of an area to be localized in which at least one locating tag is arranged, a charger is located in the area to be localized, and the charger is provided with one locating tag as well, information of each said locating tag comprises unique coding information used for distinguishing an absolute position thereof, and the method comprises steps of:

taking a location of a first locating tag as a coordinate origin of a coordinate system when information of the first locating tag is obtained by a mobile electronic device which is moving along a certain trajectory for a first time, and recording the information of the first locating tag and coordinate values thereof;

calculating coordinate values of location of other locating tag except the first locating tag each time when the mobile electronic device obtains information of the other locating tag based on a moving direction and a moving distance of the mobile electronic device relative to the starting point during the traversal, and recording the information of the other locating tag and the corresponding coordinate values;

determining whether a locating tag is on the charger based on the unique coding information of the locating tag when the mobile electronic device obtains the information of any locating tag, so as to obtain coordinate values of the charger, and sending the coordinate values of the charger to the charger;

constructing a map according to recorded information of the locating tag and coordinate values thereof; and updating constructed map based on coordinate values of a shift position of the charger when the mobile electronic device receives the coordinate values of the shift position of the charger transmitted by the charger which has shifted.

As an improvement of the above-described embodiment, the method further comprises step of:

calculating and recording coordinate values of an obstacle based on a moving direction and a moving distance of the mobile electronic device relative to the starting point when the mobile electronic device detects the obstacle each time during the traversal; and constructing a map according to recorded information of the locating tag and coordinate values thereof and the coordinate values of each said obstacle when the traversal has been finished.

As an improvement of the above-described embodiment, the method further comprises step of:

prestoring the unique coding information of the locating tag on the charger in the mobile electronic device; and determining whether a locating tag is on the charger or not by judging the unique coding information of the locating tag every time when the mobile electronic device obtains the information of the locating tag, and if so, taking the coordinate values of the locating tag as the coordinate values of the charger.

As an improvement of the above-described embodiment, after constructing the map, the method further comprises steps of:

enabling the mobile electronic device to traverse all over the area to be localized for multiple times with the coordinate origin as the starting point, and correcting the coordinate values of each said locating tag by using a correction algorithm based on the coordinate values of each said locating tag obtained from traversal for each time; and correcting constructed map based on corrected coordinate values.

As an improvement of the above-described embodiment, when the charger has shifted, the coordinate values of the shift position of the charger is calculated through the following steps:

calculating a direction and a distance of a shift position of the charger based on an angular velocity or/and an angle and an acceleration of the charger relative to a position from which the charger has shifted; and calculating the coordinate values of the shift position of the charger according to coordinate values of the position from which the charger has shifted, and the direction and the distance of the shift position of the charger relative to the position from which the charger has shifted.

As an improvement of the above-described embodiment, the updating constructed map based on coordinate values of a shift position of the charger when the mobile electronic device receives the coordinate values of the shift position of the charger transmitted by the charger which has shifted specifically comprises steps of:

moving the mobile electronic device to a position with the coordinate values of the shift position of the charger when the mobile electronic device receives the coordinate values of the shift position of the charger transmitted by the charger which has shifted;

taking coordinate values of a position of the charger where the charger is detected by the mobile electronic device as corrected coordinate values of the shift position of the charger; and updating constructed map based on corrected coordinate values of the shift position of the charger.

As an improvement of the above-described embodiment, the coordinate values of the location of the obstacle are calculated when the mobile electronic device detects the obstacle each time in the following manners:

sensing the obstacle by using a collision sensor, and taking coordinate values of the mobile electronic device as the coordinate values of the location of the obstacle when the collision sensor senses a collision with the obstacle; or detecting the obstacle by using a laser sensor/an infrared sensor, and obtaining the location of the obstacle relative to a current location of the mobile electronic device according to a calculation principle of laser/infrared distance when the laser sensor/the infrared sensor detects the obstacle, thus calculating the coordinate values of the location of the obstacle.

As an improvement of the above-described embodiment, the method further comprises step of:

correcting each said moving direction and each said moving distance of the mobile electronic device relative to the starting point based on an angular velocity or/and an angle and an acceleration of the mobile electronic device, and coordinate values are obtained according to corrected moving direction and corrected moving distance of the mobile electronic device relative to the starting point.

As an improvement of the above-described embodiment, each said locating tag is RFID tag, and a unique number of each said RFID tag which is originally arranged in the RFID tag or is written into the RFID tag by an RFID reader-writer is taken as the unique coding information of the locating tag.

As an improvement of the above-described embodiment, passive RFID tag is employed as the locating tag, and it is limited that only when the mobile electronic device is closest to one of the locating tags can the mobile electronic device obtain the information of the locating tag, and taking a location of the mobile electronic device where the mobile electronic device obtains the information of the locating tag as the location of the locating tag.

As an improvement of the above-described embodiment, active RFID tag is employed as the locating tag, when the mobile electronic device has sensed the information of any one of the locating tags, the mobile electronic device is enabled to move in a direction in which RSSI of the locating tag is gradually increasing until RSSI of the locating tag sensed by the mobile electronic device is equal to or greater than a preset maximum RSSI value or the mobile electronic device collides with the locating tag, and then taking a location of the mobile electronic device as the location of the locating tag.

As an improvement of the above-described embodiment, each said locating tag is color block tag, the unique coding information is represented by a plurality of different colors, different shapes, combinations of different shapes and different colors or color blocks with different gray scales.

As an improvement of the above-described embodiment, the position of each color block tag is determined in one of the following manners:

when the mobile electronic device has sensed tag information of any one of the color block tags by using a color sensor, enabling the mobile electronic device to move in a direction in which strength of tag information of the color block tag is gradually increasing until the strength of the tag information of the color block tag sensed by the mobile electronic device is equal to or greater than a preset maximum value or the mobile electronic device collides with the color block tag, and then taking a current location of the mobile electronic device as the location of the color block tag; or when the mobile electronic device has sensed tag information of any one of the color block tags by using a camera, the location of the color block tag relative to the mobile electronic device is determined based on number of pixels obtained by projecting a pattern of the color block tag onto CCD, thereby calculating the coordinate values of the color block tag.

As an improvement of the above-described embodiment, the position of each color block tag is determined in one of the following manners:

when the mobile electronic device read tag information of the color block tags by using a camera, enabling the mobile electronic device to move in a direction in which a pixel value obtained by projecting a pattern of a color block tag onto CCD is gradually increasing until the pixel value obtained by projecting the pattern of the color block tag onto the CCD reach a certain threshold or the mobile electronic device collides with the color block tag, and then taking a current location of the mobile electronic device as the location of the color block tag.

As an improvement of the above-described embodiment, the mobile electronic device is a robot.

As an improvement of the above-described embodiment, the method is applicable for real-time mapping for an indoor area to be localized.

As an improvement of the above-described embodiment, the locating tag with exception of that on the charger is arranged on a left and/or right side wall of a door frame.

The present invention provides an apparatus for finding charger based on map constructing, wherein the apparatus is applicable for real-time mapping of an area to be localized in which at least one locating tag is arranged, a charger is located in the area to be localized, and the charger is provided with one locating tag as well, information of each said locating tag comprises unique coding information used for distinguishing an absolute position thereof, the apparatus can be a mobile electronic device, and the apparatus comprises:

a locating tag information reading unit, configured to read information of the locating tag;

a coordinate system constructing and recording unit, configured to take a location of a first locating tag as a coordinate origin of a coordinate system when information of the first locating tag is obtained by the locating tag information reading unit of the mobile electronic device which is moving along a certain trajectory for a first time, and record the information of the first locating tag and coordinate values thereof;

an encoder, configured to record a moving distance and a moving direction of the mobile electronic device relative to a starting point in real time when the mobile electronic device traverses all over the area to be localized with the coordinate origin as the starting point;

a first calculating unit, configured to calculate coordinate values of location of other locating tag except the first locating tag each time when the mobile electronic device obtains information of the other locating tag based on a moving direction and a moving distance of the mobile electronic device relative to the starting point during the traversal, and send the information of the other locating tag and the corresponding coordinate values to the coordinate system constructing and recording unit;

a charger position determining unit, configured to determine whether a locating tag is on the charger or not according to the unique coding information of the locating tag every time when the mobile electronic device obtains information of the locating tag, so as to obtain coordinate values of the charger;

a wireless receiving/transmitting unit, configured to transmit the coordinate values of the charger to the charger; and a map constructing unit, configured to construct a map according to the information of the locating tag and coordinate values thereof recorded by the coordinate system constructing and recording unit;

the wireless receiving/transmitting unit is further configured to receive coordinate values of a shift position of the charger transmitted by the charger which has shifted, and send the coordinate values of the shift position of the charger to the coordinate system constructing and recording unit to update the coordinate values of the charger, so as to cause the map constructing unit to update constructed map.

As an improvement of the above-described embodiment, the apparatus further comprises:

an obstacle detecting unit, configured to detect obstacle; and a second calculating unit, configured to calculate coordinate values of an obstacle based on a moving direction and a moving distance of the mobile electronic device relative to the starting point recorded by the encoder when the obstacle detecting unit detects the obstacle each time during the traversal, and send the calculated coordinate values to a coordinate system constructing and recording unit.

As an improvement of the above-described embodiment, the apparatus further comprises:

a charger coding information prestoring unit, configured to prestore the unique coding information of the locating tag on the charger in the mobile electronic device;

the charger position determining unit compares unique coding information of a locating tag and the prestored information in charger coding information prestoring unit when the mobile electronic device obtains information of the locating tag, so as to determine whether the locating tag is on the charger.

As an improvement of the above-described embodiment, the apparatus further comprises:

a second correcting unit, configured to enable the mobile electronic device to traverse all over the area to be localized for multiple times with the coordinate origin as the starting point, and correcting the coordinate values of each said locating tag by using a correction algorithm based on the coordinate values of each said locating tag obtained from traversal for each time; and send corrected coordinate values to the map constructing unit to correct constructed map to correct constructed map.

As an improvement of the above-described embodiment, when the charger has shifted the coordinate values of the shift position of the charger is calculated through the following steps:

calculating a direction and a distance of a shift position of the charger relative to a position from which the charger has shifted based on an angular velocity or/and an angle and an acceleration of the charger; and calculating the coordinate values of the shift position of the charger according to coordinate values of the position from which the charger has shifted, and the direction and the distance of the shift position of the charger relative to the position from which the charger has shifted.

As an improvement of the above-described embodiment, the mobile electronic device is moved to a position with the coordinate values of the shift position of the charger when the wireless receiving/transmitting unit receives the coordinate values of the shift position of the charger transmitted by the charger which has shifted; coordinate values of the locating tag in the charger is taken as corrected coordinate values of the shift position of the charger when the locating tag information reading unit obtains the information of the locating tag in the charger; updating constructed map based on the corrected coordinate values of the shift position of the charger.

As an improvement of the above-described embodiment, the obstacle detecting unit comprises a collision sensor, a laser sensor or an infrared sensor;

the first calculating unit takes calculated coordinate values of a current location of the mobile electronic device as the coordinate values of the location of the obstacle when the collision sensor senses a collision with the obstacle; or the laser sensor/the infrared sensor calculates the location of the obstacle relative to a current location of the mobile electronic device according to a calculation principle of laser/infrared distance when the laser sensor/the infrared sensor detects the obstacle, which is send to the first calculating unit; the first calculating unit calculates the coordinate values of the location of the obstacle based on the calculated coordinate values of the current location of the mobile electronic device and the location of the obstacle relative to the current location of the mobile electronic device.

As an improvement of the above-described embodiment, the apparatus further comprises:

a gyro sensor or/and an electronic compass and an accelerometer, configured to record an angular velocity or/and an angle and an acceleration of the mobile electronic device in real time respectively when the mobile electronic device traverses all over the area to be localized with the coordinate origin as the starting point; and a first correcting unit, configured to correct each said moving direction and each said moving distance of the mobile electronic device relative to the starting point based on the angular velocity or/and the angle and the acceleration of the mobile electronic device;

the first calculating unit calculates corrected coordinate values according to corrected moving direction and corrected moving distance of the mobile electronic device relative to the starting point.

As an improvement of the above-described embodiment, each said locating tag is RFID tag, and a unique number of each said RFID tag which is originally arranged in the RFID tag or is written into the RFID tag by an RFID reader-writer is taken as the unique coding information of the locating tag.

As an improvement of the above-described embodiment, passive RFID tag is employed as the locating tag, and it is limited that only when the mobile electronic device is closest to one of the locating tags can the mobile electronic device obtain the information of the locating tag, and a location of the mobile electronic device where the mobile electronic device obtains the information of the locating tag is taken as the location of the locating tag.

As an improvement of the above-described embodiment, active RFID tag is employed as the locating tag, when the mobile electronic device has sensed the information of any one of the locating tags, the mobile electronic device is enabled to move in a direction in which RSSI of the locating tag is gradually increasing until RSSI of the locating tag sensed by the mobile electronic device is equal to or greater than a preset maximum RSSI value or the mobile electronic device collides with the locating tag, and then a location of the mobile electronic device is taken as the location of the locating tag.

As an improvement of the above-described embodiment, each said locating tag is color block tag, the unique coding information is represented by a plurality of different colors, different shapes, combinations of different shapes and different colors or color blocks with different gray scales.

As an improvement of the above-described embodiment, the position of each color block tag is determined in one of the following manners:

it is limited that only when the mobile electronic device is closest to one of the color block tags can the mobile electronic device obtain the information of the color block tag, and a location of the mobile electronic device where the mobile electronic device obtains the information of the color block tag is taken as the location of the color block tag;

when the mobile electronic device has sensed tag information of any one of the color block tags by using a color sensor, enabling the mobile electronic device to move in a direction in which strength of tag information of the color block tag is gradually increasing until the strength of the tag information of the color block tag sensed by the mobile electronic device is equal to or greater than a preset maximum value or the mobile electronic device collides with the color block tag, and then taking a current location of the mobile electronic device as the location of the color block tag; or when the mobile electronic device has sensed tag information of any one of the color block tags by using a camera, the location of the color block tag relative to the mobile electronic device is determined based on number of pixels obtained by projecting a pattern of the color block tag onto CCD, thereby calculating the coordinate values of the color block tag.

As an improvement of the above-described embodiment, the apparatus further comprises:

a collision strategy unit, configured to enable the mobile electronic device to continue to advance to avoid an obstacle when the mobile electronic device has collided with the obstacle during the traversal according to a preset collision strategy;

the preset collision strategy is preferably:

enabling the mobile electronic device to retreat by M cm and rotate to the left/right by N° when a collision occurs, wherein $0<M<20$, $0<N<10$.

As an improvement of the above-described embodiment, the mobile electronic device is a robot.

As an improvement of the above-described embodiment, the apparatus is applicable for real-time mapping for an indoor area to be localized.

As an improvement of the above-described embodiment, the locating tag with exception of that on the charger is arranged on a left and/or right side wall of a door frame.

As an improvement of the above-described embodiment, a fixing groove is arranged on a left side and/or right side wall of a door frame, and the locating tag is set in the fixing groove.

The present invention provides a system for finding charger based on map constructing, wherein the apparatus comprises a charger and the apparatus for finding charger based on map constructing as claimed in any one of claim 13~24, 38~50 or 68~85; the charger comprises:

a charging unit, configured to charge battery in the mobile electronic device;

a wireless transmitting/receiving unit, configured to receive the coordinate values of the charger;

a storing unit, configured to store the coordinate values of the charger;

a gyro sensor or/and an electronic compass and an accelerometer, configured to record an angular velocity or/and an angle and an acceleration of the charger in real time respectively when the charger start to shift; and a micro-controller, configured to calculate a direction and a distance of a shift position of the charger relative to a position from which the charger has shifted based on an angular velocity or/and an angle and an acceleration of the charger recorded by the gyro sensor or/and the electronic compass and the accelerometer; and calculate the coordinate values of the shift position of the charger according to coordinate values of the position from which the charger has shifted, and which is stored in the storing unit and the direction and the distance of the shift position of the charger relative to the position from which the charger has shifted;

the wireless transmitting/receiving unit is further configured to transmit the coordinate values of the shift position of the charger to the mobile electronic device.

As an improvement of the above-described embodiment, the charger further comprises:

a vibration sensor, configured to sense whether the charger shifts;

if the charger shifts, the micro-controller would activates the gyro sensor or/and the electronic compass and the accelerometer in standby mode when detecting signal change from the vibration sensor.

The present invention provides a charger, the charger is applicable set at any position of an area to be localized where a mobile electronic constructs a map in real time, the charger comprises:

a charging unit, configured to charge battery of the mobile electronic device;

a wireless transmitting/receiving unit, configured to receive the coordinate values of the charger;

a storing unit, configured to store the coordinate values of the charger;

a gyro sensor or/and an electronic compass and an accelerometer, configured to record an angular velocity or/and an angle and an acceleration of the charger in real time respectively when the charger start to shift; and a micro-controller, configured to calculate a direction and a distance of a shift position of the charger relative to a position from which the charger has shifted based on an angular velocity or/and an angle and an acceleration of the charger recorded by the gyro sensor or/and the electronic compass and the accelerometer; and calculate the coordinate values of the shift position of the charger according to coordinate values of the position stored in the storing unit from which the charger has shifted, and the direction and the distance of the shift position of the charger relative to the position from which the charger has shifted;

the wireless transmitting/receiving unit is further configured to transmit the coordinate values of the shift position of the charger to the mobile electronic device.

As an improvement of the above-described embodiment, the coordinate values of the position from which the charger has shifted are obtained by the mobile electronic device during real-time mapping process for the area to be localized a map, and meanwhile are transmitted to the charger.

As an improvement of the above-described embodiment, the charger further comprises:

a vibration sensor, configured to sense whether the charger shifts;

if the charger shifts, the micro-controller would activates the gyro sensor or/and the electronic compass and the accelerometer in standby mode when detecting signal change from the vibration sensor.

Compared with the exiting technique, the charger, the method, the apparatus and the system for finding charger based on map constructing disclosed by the present invention by means of: if a map for an area to be localized with a charger arranged in is constructed in real time by a mobile electronic device, updating constructed map based on coordinate values of a shift position of the charger when the mobile electronic device receives the coordinate values of the shift position of the charger transmitted by the charger which has shifted. Moreover, when the position of the charger has changed (e.g., a shift happens), the mobile electronic device will receive coordinate values of the shift position of the charger transmitted by the charger which has shifted, and then update constructed map based on coordinate values of a shift position of the charger. Besides, when the charger has shifted, it only needs to update the position of the charger on the constructed map without reconstructing the map, which has the advantages of low cost, simple operation and effective technical results.

BRIEF DESCRIPTION OF THE DRAWINGS

FIG. 1 is a flowchart of a method for finding charger based on map constructing according to the embodiment 1 of the present invention;

FIG. 2 is a flowchart of a method for finding charger based on map constructing according to the embodiment 2 of the present invention;

FIG. 3 is a flowchart of a method for finding charger based on map constructing according to the embodiment 3 of the present invention;

FIG. 4 is a flowchart of a method for finding charger based on map constructing according to the embodiment 4 of the present invention;

FIG. 9 is a flowchart of a method for finding charger based on map constructing according to the embodiment 9 of the present invention;

FIG. 10 is a flowchart of a method for finding charger based on map constructing according to the embodiment 10 of the present invention;

FIG. 11 is a flowchart of a method for finding charger based on map constructing according to the embodiment 11 of the present invention;

FIG. 12 is a flowchart of a method for finding charger based on map constructing according to the embodiment 12 of the present invention;

FIG. 17 is a flowchart of a method for finding charger based on map constructing according to the embodiment 17 of the present invention;

FIG. 20 is a flowchart of a method for finding charger based on map constructing according to the embodiment 20 of the present invention;

FIG. 27A~FIG. 27C show representations of three different color block tags, to act as unique coding information used for distinguishing the absolute position thereof.

DETAILED DESCRIPTION OF ILLUSTRATED EMBODIMENTS

Figure 5:
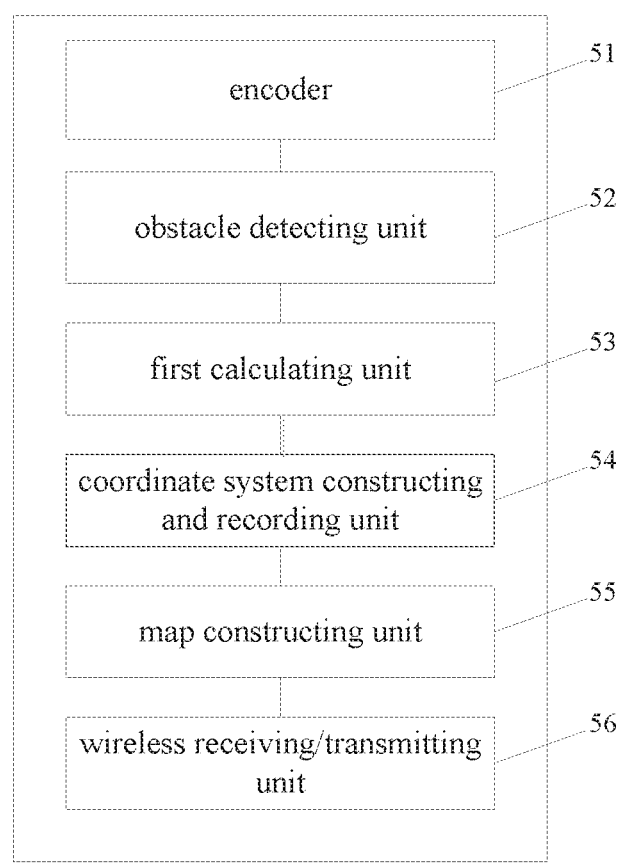
FIG. 5 is a composition block diagram of an apparatus for finding charger based on map constructing according to the embodiment 5 of the present invention.

The technical solutions of the embodiments according to the present invention are clearly and fully described as below with reference to the accompanying drawings in the embodiments of the present invention. Apparently, the embodiments to be described are merely a part rather than all of the embodiments of the present invention. All other embodiments obtained by persons with ordinary skills in the art based on the embodiments of the present invention without creative efforts shall fall within the protection scope of the present invention.

Referring to FIG. 1, it is a flowchart of a method for finding charger based on map constructing according to the embodiment 1 of the present invention, wherein the method is applicable for real-time mapping of an area to be localized in which a charger is arranged; the mobile electronic device can be, for example, a robot.

The method comprises:

step 11, taking a position of the charger as a coordinate origin of a coordinate system, moving the mobile electronic device with the coordinate origin as a starting point to traverse all over the area to be localized, calculating and recording coordinate values of a location of an obstacle based on a moving direction and a moving distance of the mobile electronic device relative to the starting point when the mobile electronic device detects the obstacle each time during the traversal;

step 12, constructing a map according to recorded coordinate values of the coordinate origin and the location of each said obstacle when the traversal has been finished;

step 13, updating constructed map based on coordinate values of a shift position of the charger when the mobile electronic device receives the coordinate values of the shift position of the charger transmitted by the charger which has shifted.

In step 11, with the charger arranged at an arbitrary position of the area to be localized and mapped, the mobile electronic device can be located at the position of the charger to start moving; or enabled to move along a certain trajectory, until detecting the position of the charger by an infrared sensor, and the mobile electronic device start to traverse with the position of the charger as a coordinate origin of a coordinate system composed of X-axis and Y-axis, and record the coordinate values of position of the charger (coordinate origin). Preferably, the mobile electronic device sends the coordinate values of the position of the charger to the charger for store at the same time.

As can be understood, the position of the charger is taken as the coordinate origin of the coordinate system composed of the X axis and the Y axis in order to facilitate calculation and composition. However, the position of the charger is not limited as the coordinate origin of the coordinate system composed of the X-axis and the Y-axis, and may be marked as other reference points, so as to have a reference function to facilitate recording information of other points.

In step 11, the mobile electronic device is moved to traverse the entire area to be localized with the coordinate origin as the starting point when it is determined that the location of the charger is taken as the coordinate origin. Furthermore, when the mobile electronic device starts to move from the starting point, real-time calculation of a moving direction and a moving distance of the mobile electronic device relative to the starting point is started up (for example, moving path and relative position and relative angle of a robot can be recorded in real time through an encoder installed on a driving wheel axle of the robot), so that a location (including distance and direction) of the mobile electronic device relative to the starting point can be obtained through calculation, and coordinate values of the mobile electronic device are obtained as well. Thereby when the mobile electronic device detects an obstacle each time during the traversal, the coordinate values of the location of the obstacle can be calculated. The more recorded information, the richer and more detailed the constructed map will be. For example, when the mobile electronic device collides with an obstacle, the coordinate values of the obstacle are recorded, so that when the mobile electronic device which is placed in the indoor environment has traversed the entire room, the coordinate values of all the obstacles can be recorded continuously, and the obstacles which surrounds as periphery and at the same time makes a circle can be considered as a wall, so that a barrier-free region area, an obstacle area and a wall area of the room can be separated to construct the map of the whole room.

The coordinate values of the location of the obstacle can be calculated during the traversal in the following approaches:

The obstacle is sensed by using a collision sensor, and current coordinate values of the mobile electronic device are taken as the coordinate values of the location of the obstacle when the collision sensor senses a collision with the obstacle; or The obstacle is detected by using a laser sensor/an infrared sensor, and the location of the obstacle relative to the current location of the mobile electronic device is calculated on the basis of a calculation principle of laser/infrared distance when the laser sensor/infrared sensor detects the obstacle, thus the coordinate values of the location of the obstacle is calculated.

Moreover, an additional collision strategy is set in the present embodiment, that is, when the mobile electronic device has collided with an obstacle during the traversal, the mobile electronic device is enabled to continue to advance to avoid the obstacle according to the preset collision strategy. According to a preferable embodiment of the present invention, the preset collision strategy comprises: when the mobile electronic device senses a collision with the obstacle through, for example, a collision sensor, the mobile electronic device will perform an intelligent analysis to determine the further movement. For example, the mobile electronic device may choose to retreat by greater than 0 and less than 20 cm and rotate to the right or left by 1-10 degrees according to a specific environmental of the area to be localized. Moreover, when the mobile electronic device is in a confined space, the mobile electronic device may choose to retreat by greater than 0 and less than 2 cm. Furthermore, the mobile electronic device chooses a larger angle of rotation, for example, 2 degrees or even 10 degrees, when rotating consecutively by 1 degree for 3 times with collision points of the consecutive rotations on the same plane.

As can be understood, in addition to the preset collision strategy disclosed herein, the collision strategy according to the present embodiment can also adopt other approaches, which is not limited thereto.

Therefore, according the preset collision strategy, the mobile electronic device is moved continually to obtain coordinate values of other obstacle, and the traversal for one time is accomplished until the entire area to be localized has been traversed. As can be understood, all feature information (including the location information of locating tag and t each said obstacle) of the area to be localized is recorded after the mobile electronic device has accomplished the traversal for one time.

In step 12, a map is constructed on the basis of the recorded coordinate origin and the coordinate values of the location of each said obstacle after the mobile electronic device has accomplished the traversal for one time.

As can be understood, the constructed map is 2D map, and the mobile electronic device (for example, a robot) may navigate according to the constructed map.

In step 13, when the charger start to shift, the mobile electronic device will receive (through wireless means) the coordinate values of the shift position of the charger transmitted by the charger which has shifted (the charger is capable of calculating a distance and direction relative to the position from which the charger has shifted in real time, thereby calculating the coordinate value of the shift position of the charger shifted). For example, according to a preferable embodiment of the present invention, when the charger has shifted, the coordinate values of the shift position of the charger are calculated through the following steps:

calculating a direction and a distance of a shift position of the charger relative to a position from which the charger has shifted based on an angular velocity or/and an angle and an acceleration of the charger;

calculating the coordinate values of the shift position of the charger according to coordinate values of the position from which the charger has shifted from which the charger has shifted, and the direction and the distance of the shift position of the charger relative to the position from which the charger has shifted.

Therefore, the mobile electronic device updates the constructed map based on coordinate values of a shift position of the charger when the charger has shifted (that is, makes marks of the charger on the constructed map according to coordinate values of the shift position of the charger, and the coordinate values of the position from which the charger has shifted is only taken as the coordinate origin on the constructed map), so that the mobile electronic device can take advantage of the updated map to find the charger when it needs to be charged.

According to a preferable embodiment of the present invention, to further improve accuracy of constructed map, each said moving direction and each said moving distance of the mobile electronic device relative to the starting point can be corrected based on an angular velocity or/and an angle and an acceleration of the mobile electronic device; so that obtained coordinate values are corrected. For example, if the moving direction and the moving distance of a robot relative to the starting point are recorded in real time by an encoder installed on a driving wheel axle of the robot, there exit cumulative errors in the calculation process of the encoder due to wheel slippage, uncertain distance of contact points between the two driving wheels and the ground or the like. Therefore, according to the present embodiment the mobile electronic device records the angular velocity and/or the angle and the acceleration of the mobile electronic device in real time, for example, preferably by using a gyro sensor and/or an electronic compass and an accelerometer, respectively, then the moving direction and moving distance of the mobile electronic device relative to the starting point recorded by the encoder in real time are corrected based on the angular velocity and/or angle and acceleration recorded by the gyro sensor and/or the electronic compass and the accelerometer in real time, so that coordinate values calculated based on the corrected moving direction and moving distance of the mobile electronic device relative to the starting point and are made more accurate, so that the map constructed based on the coordinate values is made more accurate.

It can be seen that with the method of finding the charger based on map constructing according to the present embodiment, the mobile electronic device can accurately find the charger when the charger has shifted. Moreover, when the charger has shifted, it only needs to update the position of the charger on the constructed map without reconstructing the map, which has the advantage of low cost, simple operation and effective technical results.

Referring to FIG. 2, it is a flowchart of a method for finding charger based on map constructing according to the embodiment 2 of the present invention, wherein the method is applicable for real-time mapping of an area to be localized in which a charger is arranged; the mobile electronic device can be, for example, a robot.

The method comprises:

step 21, taking a position of the charger as a coordinate origin of a coordinate system, moving the mobile electronic device with the coordinate origin as a starting point to traverse all over the area to be localized, calculating and recording coordinate values of a location of an obstacle based on a moving direction and a moving distance of the mobile electronic device relative to the starting point when the mobile electronic device detects the obstacle each time during the traversal;

step 22, constructing a map according to recorded coordinate values of the coordinate origin and the location of each said obstacle when the traversal has been finished;

step 23, moving the mobile electronic device to a position with coordinate values of a shift position of the charger when the mobile electronic device receives the coordinate values of the shift position of the charger transmitted by the charger which has shifted; taking coordinate values of a position of the charger where the charger is detected by the mobile electronic device as corrected coordinate values of the shift position of the charger; and updating constructed map based on the corrected coordinate values of the shift position of the charger.

As can be understood, steps 21~22 in the present embodiment are basically consistent with steps 11~12, which will not be repeated thereto.

Different from the embodiment 1, in step 23 of the present embodiment, when receiving the coordinate values of the shift position of the charger transmitted by the charger which has shifted, the mobile electronic device is not directly exploiting the coordinate values of the shift position of the charger to update the constructed map. Since the charger records an angular velocity or/and an angle and an acceleration of the charger in real time through a gyro sensor or/and a electronic compass and a accelerometer, so as to obtain the direction and the distance of the shift position of the charger, and further obtain the coordinate values of the shift position of the charger, consequently there exit errors for the coordinate values of the shift position of the charger, which will lead to errors for coordinate values of the charger obtained by the mobile electronic device. Therefore, in the present embodiment, errors are reduced, for example, in the following manners:

The mobile electronic device is moved to a position with the coordinate values of the shift position of the charger (there exit certain errors) when the mobile electronic device receives the coordinate values of the shift position of the charger transmitted by the charger which has shifted, then the exact shift position of the charger can be determined by the following means. For example, the mobile electronic device is provided with a laser transmitting/receiving sensor, and the mobile electronic device is moved to a position with the coordinate values of the shift position of the charger when the mobile electronic device receives the coordinate values of the shift position of the charger transmitted by the charger which has shifted; coordinate values of a position of the charger where the charger is detected by the laser transmitting/receiving sensor are taken corrected coordinate values of the shift position of the charger; the constructed map is updated based on the corrected coordinate values of the shift position of the charger; or The mobile electronic device is provided with an infrared transmitting/receiving sensor or/and a camera. The mobile electronic device is moved to a position with the coordinate values of the shift position of the charger when the mobile electronic device receives the coordinate values of the shift position of the charger transmitted by the charger which has shifted; then the mobile electronic device is guided by the infrared transmitting/receiving sensor or/and the camera to an exact position of the charger which is taken as corrected coordinate values of the shift position of the charger; the constructed map is updated based on the corrected coordinate values of the shift position of the charger.

As can be understood, the mobile electronic device sends the corrected coordinate values of the shift position of the charger to the charger for storing.

It can be seen that the present embodiment can not only achieve the corresponding effect of the embodiment 1, but also obtain more accurate coordinate values of the position of the charger on the basis of the embodiment 1, so that the updated map is more accurate and the mobile electronic device can accurately find the charger.

Referring to FIG. 3, it is a flowchart of a method for finding charger based on map constructing according to the embodiment 3 of the present invention, wherein the method is applicable for real-time mapping of an area to be localized in which a charger is arranged. At least two locating tags are arranged in the area to be localized, each said locating tag is correspondingly arranged at a specific position of the area to be localized, and the information of each said locating tag comprises unique coding information used for distinguishing an absolute position thereof; the mobile electronic device can be, for example, a robot.

The method comprises:

step 31, taking a position of the charger as a coordinate origin of a coordinate system, moving the mobile electronic device with the coordinate origin as a starting point to traverse all over the area to be localized; during the traversal, based on a moving direction and a moving distance of the mobile electronic device relative to the starting point, calculating and recording coordinate values of a location of an obstacle each time when the mobile electronic device detects the obstacle, and calculating coordinate values of a location of a locating tag each time when the mobile electronic device obtains information of the locating tag, and recording the information of the locating tag and the corresponding coordinate values;

step 32, constructing a map according to the recorded coordinate values of the coordinate origin and each said obstacle, and information of the locating tag and coordinate values thereof when the traversal has been finished;

step 33, updating constructed map based on coordinate values of a shift position of the charger when the mobile electronic device receives the coordinate values of the shift position of the charger transmitted by the charger which has shifted.

As can be understood, steps 32~33 in the present embodiment are basically consistent with steps 11~13 in FIG. 1, which will not be repeated thereto.

Different from the embodiment 1, at least two locating tags are arranged at specific positions/arbitrary positions of the area to be localized and mapped according to the present embodiment, wherein tag information of the locating tag can be read by a locating tag information reader in the mobile electronic device in step 31.

According to an achievable embodiment of the present invention, each said locating tag is RFID tag, and a unique number which is originally arranged in the RFID tag (or is written into the RFID tag by a RFID reader-writer) is taken as the unique coding information of the locating tag. Correspondingly, the RFID tag is generally used in conjunction with a RFID tag information reader, and the RFID tag can transmit information to the RFID tag information reader with signal and energy excitation from the RFID tag information reader. Thus, in the present embodiment, the mobile electronic device in the present embodiment can read the information of the RFID tag through the RFID tag information reader.

How the mobile electronic device determines specific location of the RFID tag when reading the information of the RFID tag through the RFID tag information reader will be described in detail as below.

Approach 1: each RFID tag adopts passive RFID tag, and it is limited that only when the mobile electronic equipment is closest to a RFID tag can the mobile electronic device sense (obtain) the information of the RFID tag.

In this way, when the RFID tag information reader of the mobile electronic device can obtain the information of the RFID tag, it can be indicated that the mobile electronic device is close enough to the RFID tag (the distance between each other can be negligible). Hence the current location of the mobile electronic device when the mobile electronic device obtains the information of the RFID tag can be taken as the location of the RFID tag.

As can be understood, the reading range (as small as possible) of the RFID tag information reader of the mobile electronic device can be adjusted to achieve the approach 1.

Approach 2: each RFID tag adopts an active RFID tag; during the moving process, when the mobile electronic device has sensed the information of any one of the RFID tags (which reach a certain reading range), the mobile electronic device is enabled to move in a direction in which RSSI of the RFID tag is gradually increasing; as can be understood, since that the information the mobile electronic device has sensed is from not less than one RFID tag, the mobile electronic device is enabled to move in a direction of the RFID tag with the largest RSSI, and the location of the mobile electronic device is taken as the location of the RFID tag when the RSSI of the RFID tag sensed by the mobile electronic device is equal to or greater than a preset maximum RSSI value or the mobile electronic device collides with the RFID tag (the collision can be sensed by a collision sensor).

According to another achievable embodiment of the present invention, each said locating tag is color block tag, the unique coding information is represented by a plurality of different colors, different shapes, combinations of different shapes and different colors or color blocks with different gray scales. Referring to FIG. 27A~FIG. 27C, wherein different color block tags are distinguished by different colors representing unique coding information 200 (the shape may be the same) in FIG. 27A, for example, the red represents color block tag 1, the yellow represents color block tag 2, and the blue represents color block tag 3 . . . ; different color block tags are distinguished by different shapes representing unique coding information 200 (colors may be the same) in FIG. 27B; for example, the circle represents color block tag 1, the triangle represents color block tag 2, the square represents color block tag 3 . . . ; different color block tags are distinguished by combinations of different shapes and different colors representing unique coding information 200 in FIG. 27C, for example, the circle plus the red represents color block tag 1, the triangle plus the yellow represents color block tag 2, the blue plus the square represents color block tag 3 . . . .

As can be understood that the above provides only easy-to-understand description of the color block tag, which is not limited thereto. For example, each said color block tag may be composed of a plurality of small color blocks, each of which may be represented by a plurality of different colors or different shapes or combinations of different shapes and different colors or color blocks with different gray scales. Therefore, there exit a variety of composition ways of the of the color block tag. Specifically, which way is more convenient is determined by the number of the color block tags needed in the environment of the area to be localized.

When adopting color block tag as locating tag, the mobile electronic device can read the information of the color block tags by a color sensor/camera. How the mobile electronic device determine the specific location of the color block tag when reading the information of the color block tag through the color sensor/camera will be described in detail as below.

Approach 1: it is limited that only when the mobile electronic equipment is closest to a color block tag can the color sensor/camera of the mobile electronic device sense (obtain) the tag information of the color block tag.

In this way, when the color sensor/camera of the mobile electronic device can obtain the tag information of the color block tag, it can be indicated that the mobile electronic device is close enough to the color block tag (the distance between each other can be negligible). Hence current location of the mobile electronic device where the mobile electronic device obtains the information of the color block tag can be taken as the location of the color block tag.

As can be understood, the reading range (as small as possible) of the color sensor/camera of the mobile electronic device or the size of the color block tag (small enough) can be adjusted to achieve the approach 1.

Approach 2: during the moving process, when the mobile electronic device has sensed tag information of any one of the color block tags (which reach a certain reading range) by using a color sensor, the mobile electronic device is enabled to move in a direction in which strength of the tag information of the color block tag is gradually increasing until the strength of the tag information of the color block tag sensed by the mobile electronic device is equal to or greater than a preset maximum value or the mobile electronic device collides with the color block tag, and then a current location of the mobile electronic device is taken as the location of the color block tag. As can be understood, since that the tag information sensed by the color sensor during the mobile electronic device's moving process is from not less than one color block tag, the mobile electronic device is enabled to move in a direction of the color block tag with the most strong tag information.

Approach 3: when a camera is used to read the tag information of the color block tags, the location of the color block tag relative to the mobile electronic device is determined based on number of pixels obtained by projecting a pattern of the color block tag onto CCD, thereby calculating the coordinate values of the color block tag.

As can be understood, the locating tag can be represented by other tag type, which is not limited to the disclosed RFID tag or color block tag described above.

As can be understood, the locating tag of the present embodiment has the function of localizing a specific position for the area to be localized. In the present embodiment, it is preferable to use two or more locating tags for localization in the area to be localized, and each of the locating tags is set at a specific position of the area to be localized. Furthermore the information of each said locating tag comprises unique coding information used for distinguishing an absolute position thereof. For example, when at least two locating tags are placed at different specific positions (for example, room 1, room 2, . . . ) of the area to be localized, it is necessary to determine and distinguish a specific location (absolute location) where a locating tag is located by the unique coding information of the locating tag, for example, the locating tag is located in room 1 or room 2 or the like. In general, for passive RFID tags, each tag will generally has its own unique number (or the unique number is written into the RFID tag), which can be used as unique coding information for distinguishing absolute position thereof, and the passive RFID tag is placed at the specific position to identify the specific position. Therefore, the absolute position where the locating tag is located can be identified and then determined by obtaining the unique coding information of each locating tag.

Figure 28:
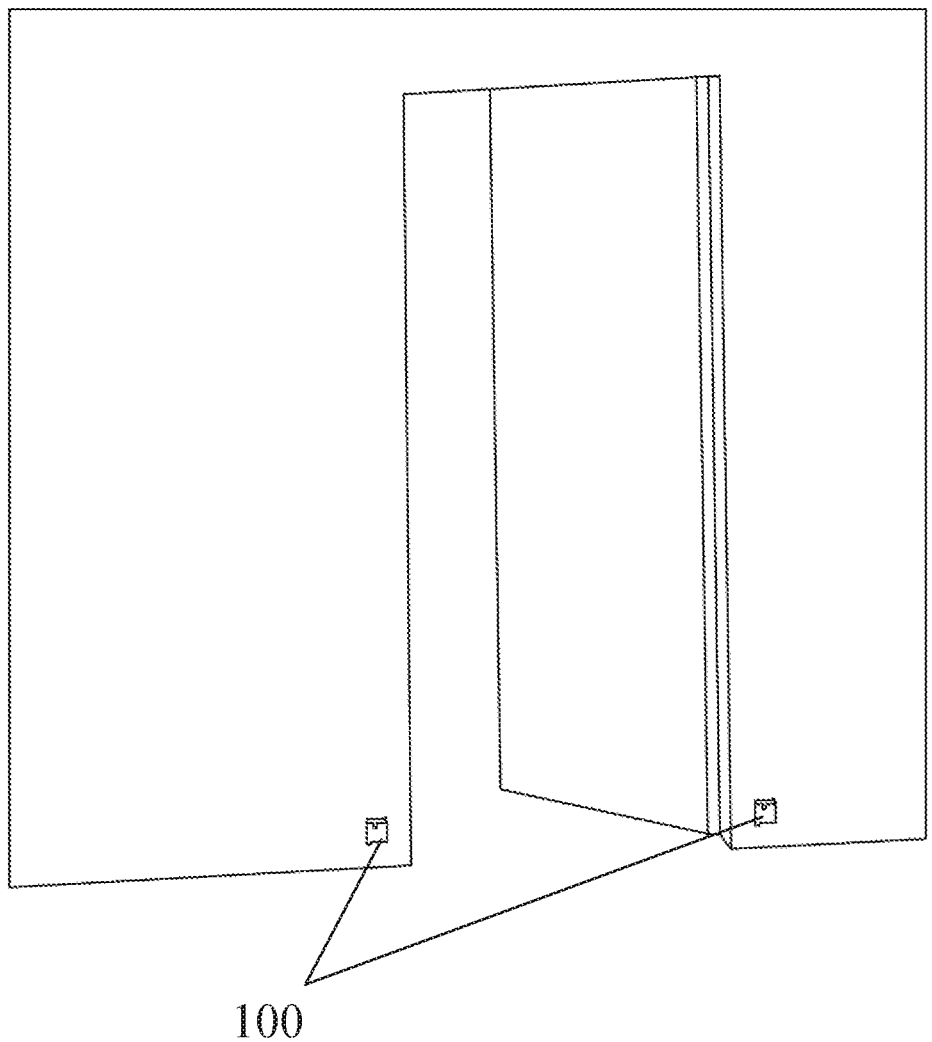
FIG. 28 is a composition block diagram of fixing a locating tag on the wall.
Figure 29:
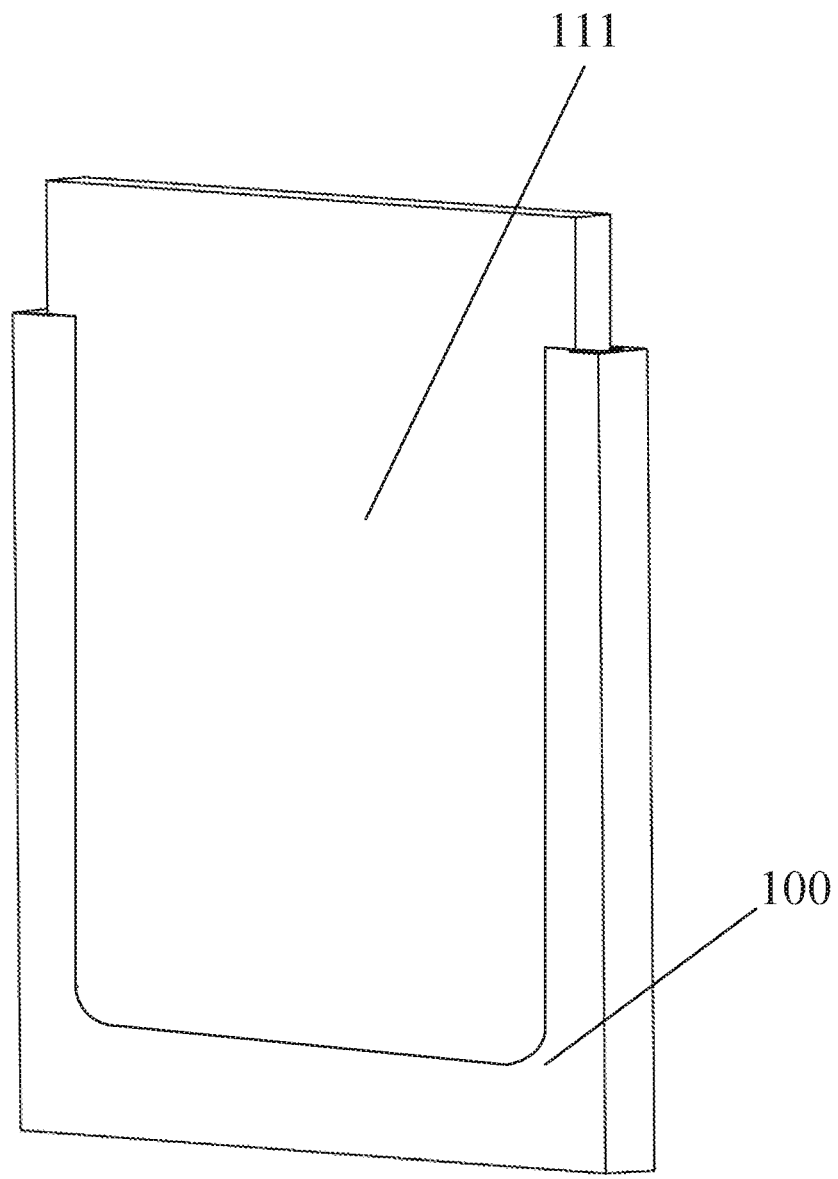
FIG. 29 shows structural schematic diagrams of placing a locating label in a fixing groove fixed on the wall.

As can be understood, the method according to the present embodiment is applicable for real-time mapping for the indoor area to be localized. When localizing the indoor environment, it is preferable to place one locating tag 111 on a wall on left and/or right side of a door frame in each room; as can be understood that the locating tag 111 can be fixed on the wall through magnet or the like. Preferably a fixing groove 100 is arranged on the wall on the left side and/or the right side of the door frame, and the locating tag 111 is set in the fixing groove 100, as shown in FIG. 28~FIG. 29.

In this way, the mobile electronic device can realize navigating and identifying of the absolute position based on the unique coding information each said locating tag after the map construction is accomplished based on the recorded information of each said locating tag. For example, when a robot is required to traverse the room 2 for one time, the absolute position of the room 2 (namely, the location of the locating tag) can be determined based on the unique coding information of the locating tag placed on the left and/or right side wall of the door frame in the room 2 and the mobile electronic device navigates to arrive in the room 2 based on the relative coordinate values (both direction and distance relative to the coordinates origin) of the locating tag on the constructed map. In addition, the mobile electronic device (the robot) is enabled to know where it is located based on the unique coding information of each locating tag.

Referring to FIG. 4, it is a flowchart of a method for finding charger based on map constructing according to the embodiment 4 of the present invention, wherein the method is applicable for real-time mapping of an area to be localized in which a charger is arranged. At least two locating tags are arranged in the area to be localized, each said locating tag is correspondingly arranged at a specific position of the area to be localized, and the information of each said locating tag comprises unique coding information used for distinguishing an absolute position thereof; the mobile electronic device can be, for example, a robot.

The method comprises:

step 41, taking a position of the charger as a coordinate origin of a coordinate system, moving the mobile electronic device with the coordinate origin as a starting point to traverse all over the area to be localized; during the traversal, based on a moving direction and a moving distance of the mobile electronic device relative to the starting point, calculating and recording coordinate values of a location of an obstacle each time when the mobile electronic device detects the obstacle, and calculating coordinate values of a location of a locating tag each time when the mobile electronic device obtains information of the locating tag, and recording the information of the locating tag and the corresponding coordinate values;

step 42, constructing a map according to the recorded coordinate values of the coordinate origin and each said obstacle, and information of the locating tag and coordinate values thereof when the traversal has been finished;

step 43, enabling the mobile electronic device to traverse all over the area to be localized for multiple times with the coordinate origin as the starting point, and correcting the coordinate values of each said locating tag by using a correction algorithm based on the coordinate values of each said locating tag obtained from traversal for each time; and correcting constructed map based on corrected coordinate values;

step 44, updating constructed map based on coordinate values of a shift position of the charger when the mobile electronic device receives the coordinate values of the shift position of the charger transmitted by the charger which has shifted.

It can be seen that on the basis of embodiment 3 the present embodiment further corrects the location of the locating tags through a correction algorithm according to the coordinate values of the locating tags obtained from traversal for multiple times, that is, step 43.

Specifically, due to cumulative errors of the encoder or for other reasons, the coordinate values of the locating tag obtained by the traversal for one time are inevitably erroneous, resulting in an inaccurate map. Therefore, after a map has been constructed, the coordinate values of each said locating tag are obtained for multiply times by the means that the mobile device traverses for multiply times, and then the coordinate values of each said locating tag are corrected by the recursive algorithm. The more times the mobile device traverses for, the more accurate the calculated coordinate values of the locating tag will be, until final errors will be reduced to negligible. Finally, the constructed map is corrected based on the corrected coordinate values.

Therefore, the present embodiment provides the technical scheme that the coordinate values of each said locating tag are obtained for multiply times from traversal for multiply times, and then the coordinate values of each said locating tag are corrected by a recursive algorithm and the constructed map is corrected based on the corrected coordinate values, which further eliminates the cumulative errors of the mobile electronic device, thereby improving the accuracy of the constructed map.

Referring to FIG. 5, it is a composition block diagram of an apparatus for finding charger based on map constructing according to the embodiment 5 of the present invention. The apparatus for finding charger based on map constructing is a mobile electronic device or installed in a mobile electronic device, which is applicable for real-time mapping of an area to be localized in which a charger is arranged; the mobile electronic device can be, for example, a robot.

The mobile electronic device comprises:

an encoder 51, configured to record a moving distance and a moving direction of the mobile electronic device relative to a starting point in real time when the mobile electronic device traverses all over the area to be localized with a location of the charger as a coordinate origin of a coordinate system as the starting point;

an obstacle detecting unit 52, configured to detect obstacle;

a first calculating unit 53, configured to calculate coordinate values of a location of an obstacle based on a moving direction and a moving distance of the mobile electronic device relative to the starting point recorded by the encoder 51 when the mobile electronic device detects the obstacle, and send the calculated coordinate values to a coordinate system constructing and recording unit 54;

a coordinate system constructing and recording unit 54, configured to record coordinate values of the charger and each said obstacle;

a map constructing unit 55, configured to construct a map according to coordinate values of the coordinate origin and the location of each said obstacle recorded by the coordinate system constructing and recording unit 54; and a wireless receiving/transmitting unit 56, configured to transmit coordinate values of a shift position of the charger when the mobile electronic device receives the coordinate values of the shift position of the charger transmitted by the charger which has shifted to the coordinate system constructing and recording unit 54 to update coordinate values of the charger, so as to cause the map constructing unit 55 to update constructed map.

The operation principle and working process of the apparatus for finding charger based on map constructing according to present embodiment can be referred to embodiment 1, which will not be repeated thereto.

According to another embodiment, when receiving the coordinate values of the shift position of the charger transmitted by the charger which has shifted, the mobile electronic device is not directly exploiting the coordinate values of the shift position of the charger to update the constructed map. Since the charger records an angular velocity or/and an angle and an acceleration of the charger in real time through a gyro sensor or/and a electronic compass and a accelerometer, so as to obtain the direction and the distance of the shift position of the charger, and further obtain the coordinate values of the shift position of the charger, consequently there exit errors for the coordinate values of the shift position of the charger, which will lead to errors for coordinate values of the charger obtained by the mobile electronic device. Therefore, in the present embodiment, errors are reduced, for example, in the following manners:

The mobile electronic device further comprises a laser transmitting/receiving sensor; and the mobile electronic device is moved to a position with the coordinate values of the shift position of the charger when the mobile electronic device receives the coordinate values of the shift position of the charger transmitted by the charger which has shifted; coordinate values of a position of the charger where the charger is detected by the laser transmitting/receiving sensor are taken corrected coordinate values of the shift position of the charger; the constructed map is updated based on the corrected coordinate values of the shift position of the charger; or The mobile electronic device further comprises an infrared transmitting/receiving sensor or/and a camera; the mobile electronic device is moved to a position with the coordinate values of the shift position of the charger when the mobile electronic device receives the coordinate values of the shift position of the charger transmitted by the charger which has shifted; then the mobile electronic device is guided by the infrared transmitting/receiving sensor or/and the camera to an exact position of the charger which is taken as corrected coordinate values of the shift position of the charger; the constructed map is updated based on the corrected coordinate values of the shift position of the charger.

Figure 6:
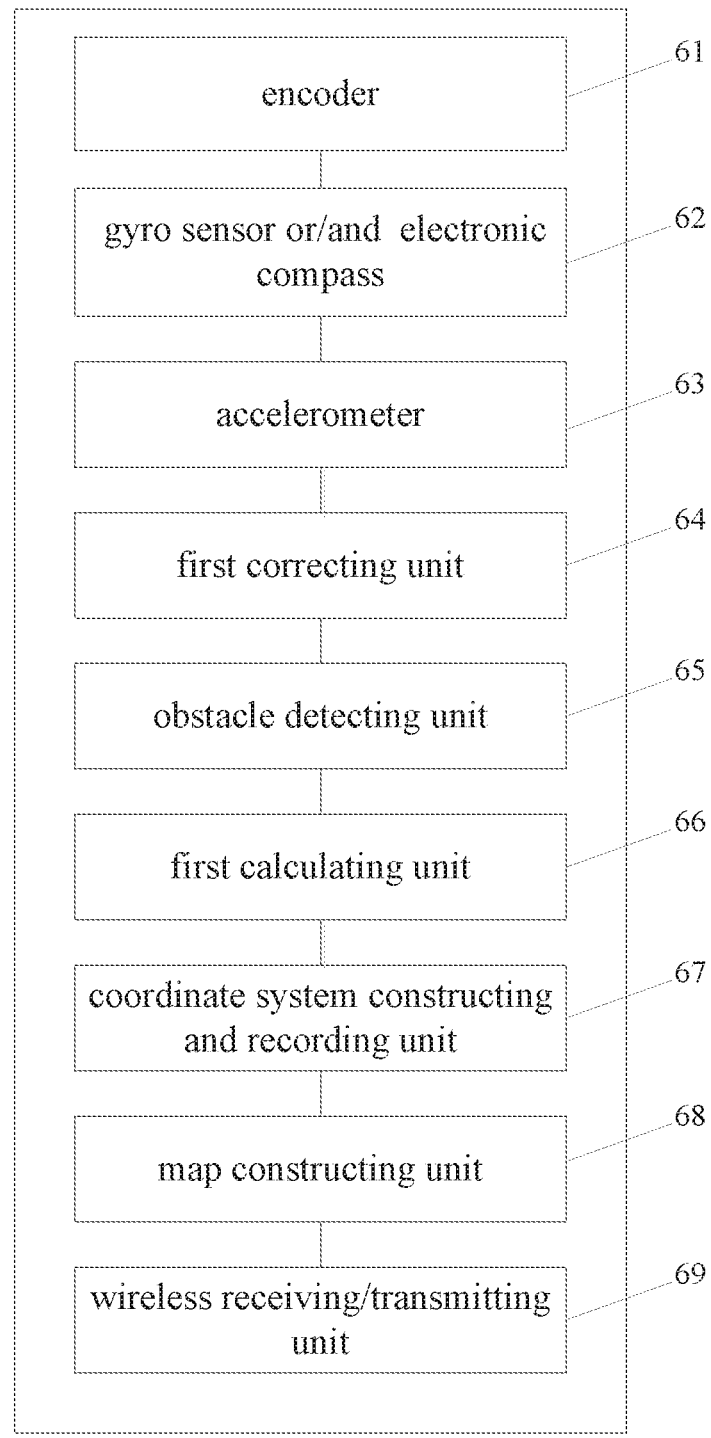
FIG. 6 is a composition block diagram of an apparatus for finding charger based on map constructing according to the embodiment 6 of the present invention.

Referring to FIG. 6, it is a composition block diagram of an apparatus for finding charger based on map constructing according to the embodiment 6 of the present invention. The apparatus for finding charger based on map constructing is a mobile electronic device or installed in a mobile electronic device, which is applicable for real-time mapping of an area to be localized in which a charger is arranged; the mobile electronic device can be, for example, a robot.

The apparatus for finding charger based on map constructing comprises:

an encoder 61, configured to record a moving distance and a moving direction of the mobile electronic device relative to a starting point in real time when the mobile electronic device traverses all over the area to be localized with a location of the charger as a coordinate origin of a coordinate system as the starting point;

a gyro sensor or/and an electronic compass 62, configured to record an angular velocity or/and an angle of the mobile electronic device in real time;

an accelerometer 63, configured to record an acceleration of the mobile electronic device in real time;

a first correcting unit 64, configured to correct each said moving direction and each said moving distance of the mobile electronic device relative to the starting point based on the angular velocity or/and the angle, and the acceleration of the mobile electronic device;

an obstacle detecting unit 65, configured to detect obstacle;

a first calculating unit 66, configured to calculate coordinate values of a location of an obstacle based on a moving direction and a moving distance of the mobile electronic device relative to the starting point recorded by the encoder 61 when the mobile electronic device detects the obstacle, and send the calculated coordinate values to a coordinate system constructing and recording unit 67;

a coordinate system constructing and recording unit 67, configured to record coordinate values of the charger and each said obstacle;

a map constructing unit 68, configured to construct a map according to coordinate values of the coordinate origin and the location of each said obstacle recorded by the coordinate system constructing and recording unit 67; and a wireless receiving/transmitting unit 69, configured to transmit coordinate values of a shift position of the charger when the mobile electronic device receives the coordinate values of the shift position of the charger transmitted by the charger which has shifted to the coordinate system constructing and recording unit 67 to update coordinate values of the charger, so as to cause the map constructing unit 68 to update constructed map.

It can be seen that on the basis of embodiment 5, the present embodiment adds the gyro sensor or/and the electronic compass 62 and the accelerometer 63, which are configured to record the angular velocity or/and the angle and the acceleration of the mobile electronic device in real time respectively so as to correct each said moving direction and each said moving distance of the mobile electronic device relative to the starting point, and calculate the coordinate values based on the corrected moving direction and the moving distance, thereby correcting each obtained coordinate value. Wherein, the gyro include, but are not limited to, wire gyro, electrostatic gyro, laser gyro, fiber optic gyro, micromechanical gyro or the like.

Therefore, the present embodiment can eliminate exiting cumulative errors from calculation process of the encoder 61 installed on the driving wheels, which is resulted from wheel slippage, uncertain distance of contact points between two driving wheels and ground or the like. So coordinate values calculated based on the corrected moving direction and moving distance of the mobile electronic device relative to the starting point and is made more accurate, so that the map constructed on the basis of the coordinate values is made more accurate.

Figure 7:
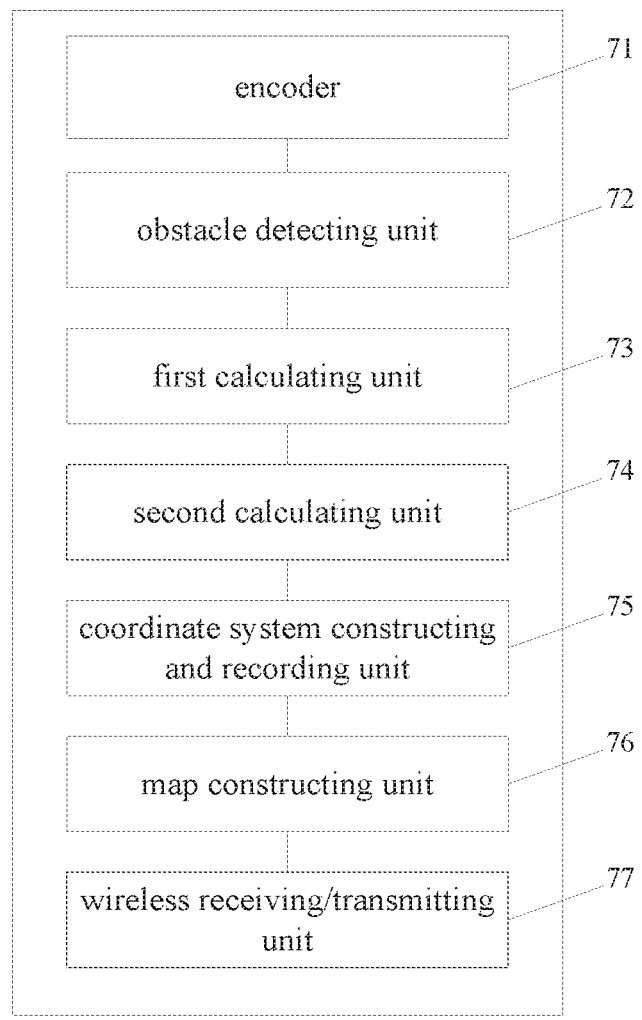
FIG. 7 is a composition block diagram of an apparatus for finding charger based on map constructing according to the embodiment 7 of the present invention.

Referring to FIG. 7, it is a composition block diagram of an apparatus for finding charger based on map constructing according to the embodiment 7 of the present invention. The apparatus for finding charger based on map constructing is a mobile electronic device or installed in a mobile electronic device, which is applicable for real-time mapping of an area to be localized in which a charger is arranged, and at least two locating tags are arranged in the area to be localized, each said locating tag is correspondingly arranged at a specific position of the area to be localized, and the information of each said locating tag comprises unique coding information used for distinguishing an absolute position thereof; the mobile electronic device can be, for example, a robot.

The apparatus for finding charger based on map constructing comprises:

an encoder 71, configured to record a moving distance and a moving direction of the mobile electronic device relative to a starting point in real time when the mobile electronic device traverses all over the area to be localized with a location of the charger as a coordinate origin of a coordinate system as the starting point;

an obstacle detecting unit 72, configured to detect obstacle;

a first calculating unit 73, configured to calculate coordinate values of a location of an obstacle based on a moving direction and a moving distance of the mobile electronic device relative to the starting point recorded by the encoder 71 when the mobile electronic device detects the obstacle, and send the calculated coordinate values to a coordinate system constructing and recording unit 75;

a second calculating unit 74, configured to calculate coordinate values of a location of a locating tag each time when the mobile electronic device obtains information of the locating tag based on a moving direction and a moving distance of the mobile electronic device relative to the starting point during the traversal, and send the information of the locating tag and the corresponding coordinate values to the coordinate system constructing and recording unit 75;

a coordinate system constructing and recording unit 75, configured to record coordinate values of the coordinate origin and each said obstacle, and the information of the locating tag and the coordinate values thereof when the traversal has been finished;

a map constructing unit 76, configured to construct a map according to the recorded coordinate values of the coordinate origin and each said obstacle, and the information of the locating tag and the coordinate values thereof when the traversal has been finished; and a wireless receiving/transmitting unit 77, configured to transmit coordinate values of a shift position of the charger when the mobile electronic device receives the coordinate values of the shift position of the charger transmitted by the charger which has shifted to the coordinate system constructing and recording unit 75 to update coordinate values of the charger, so as to cause the map constructing unit 76 to update constructed map.

The operation principle and working process of the apparatus for finding charger based on map constructing according to present embodiment can be referred to embodiment 1, which will not be repeated thereto.

Figure 8:
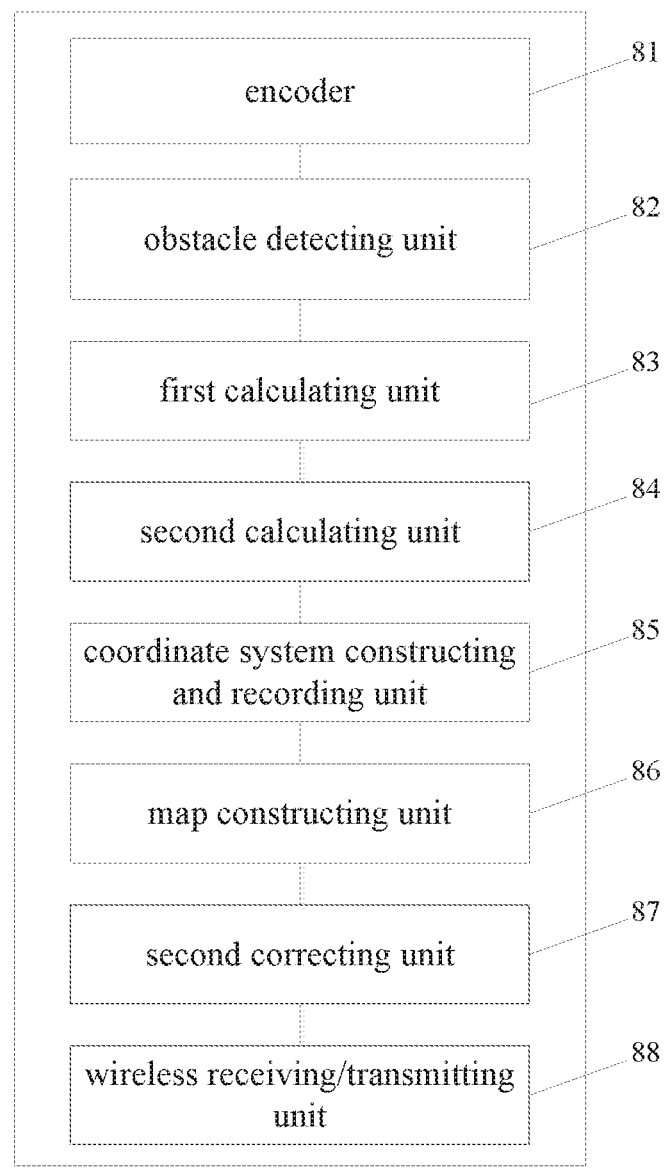
FIG. 8 is a composition block diagram of an apparatus for finding charger based on map constructing according to the embodiment 8 of the present invention.

Referring to FIG. 8, it is a composition block diagram of an apparatus for finding charger based on map constructing according to the embodiment 8 of the present invention. The apparatus for finding charger based on map constructing is a mobile electronic device or installed in a mobile electronic device, which is applicable for real-time mapping of an area to be localized in which a charger is arranged, and at least two locating tags are arranged in the area to be localized, each said locating tag is correspondingly arranged at a specific position of the area to be localized, and the information of each said locating tag comprises unique coding information used for distinguishing an absolute position thereof; the mobile electronic device can be, for example, a robot.

The apparatus for finding charger based on map constructing comprises:

an encoder 81, configured to record a moving distance and a moving direction of the mobile electronic device relative to a starting point in real time when the mobile electronic device traverses all over the area to be localized with a location of the charger as a coordinate origin of a coordinate system as the starting point;

an obstacle detecting unit 82, configured to detect obstacle;

a first calculating unit 83, configured to calculate coordinate values of a location of an obstacle based on a moving direction and a moving distance of the mobile electronic device relative to the starting point recorded by the encoder 81 when the mobile electronic device detects the obstacle, and send the calculated coordinate values to a coordinate system constructing and recording unit 85;

a second calculating unit 84, configured to calculate coordinate values of a location of a locating tag each time when the mobile electronic device obtains information of the locating tag based on a moving direction and a moving distance of the mobile electronic device relative to the starting point during the traversal, and send the information of the locating tag and the corresponding coordinate values to the coordinate system constructing and recording unit 85;

a coordinate system constructing and recording unit 85, configured to record coordinate values of the coordinate origin and each said obstacle, and the information of the locating tag and the coordinate values thereof when the traversal has been finished;

a map constructing unit 86, configured to construct a map according to the recorded coordinate values of the coordinate origin and each said obstacle, and the information of the locating tag and the coordinate values thereof when the traversal has been finished; and a second correcting unit 87, configured to enable the mobile electronic device to traverse all over the area to be localized for multiple times with the coordinate origin as the starting point, and correcting the coordinate values of each said locating tag by using a correction algorithm based on the coordinate values of each said locating tag obtained from traversal for each time; and send corrected coordinate values to the map constructing unit 86 to correct constructed map; and a wireless receiving/transmitting unit 88, configured to transmit coordinate values of a shift position of the charger when the mobile electronic device receives the coordinate values of the shift position of the charger transmitted by the charger which has shifted to the coordinate system constructing and recording unit 85 to update coordinate values of the charger, so as to cause the map constructing unit 86 to update constructed map.

The present embodiment adds the second correcting unit 87 on basis of the embodiment 7, according to which the coordinate values of each locating tag are obtained for multiply times in the way that the mobile device traverses for multiply times, and then the coordinate values of each locating tag are corrected by the recursive algorithm. The more times the mobile device traverses for, the more accurate the calculated coordinate values of the locating tag will be, until final errors will be reduced to negligible. Finally, the constructed map is corrected based on the corrected coordinate values by the map constructing unit 86. Thereby exiting cumulative errors from the mobile device traversing for one time are eliminated, and accuracy of the constructed map is improved.

Referring to FIG. 9, it is a flowchart of a method for finding charger based on map constructing according to the embodiment 9 of the present invention, wherein the method is applicable for real-time mapping of an area to be localized in which a charger is arranged; the mobile electronic device can be, for example, a robot.

The method comprises:

step 91, taking any initial position as a coordinate origin of a coordinate system, moving the mobile electronic device with the coordinate origin as a starting point to traverse all over the area to be localized, calculating and recording coordinate values of the charger or an obstacle based on a moving direction and a moving distance of the mobile electronic device relative to the starting point when the mobile electronic device detects the charger or the obstacle each time during the traversal;

step 92, constructing a map according to recorded coordinate values of the coordinate origin, the charger and the obstacle when the traversal has been finished;

step 93, updating constructed map based on coordinate values of a shift position of the charger when the mobile electronic device receives the coordinate values of the shift position of the charger transmitted by the charger which has shifted.

Different from the embodiment 1, instead of being limited to take the position of the charger as the coordinate origin for constructing the map, any position in the area to be localized (of which the coordinate values can be recorded by the mobile electronic device) can be taken as the coordinate origin according to the method of the present embodiment, and then the mobile electronic device is moved with the coordinate origin as a starting point to traverse all over the area to be localized. Coordinate values of the charger or an obstacle would be calculated and recorded based on a moving direction and a moving distance of the mobile electronic device relative to the starting point when the mobile electronic device detects the charger or the obstacle each time during the traversal, meanwhile the coordinate values of the charger would be transmitted to charger. When the charger start to shift, the mobile electronic device will receive (through wireless means) the coordinate values of the shift position of the charger transmitted by the charger which has shifted (the charger is capable of calculating a distance and direction relative to the position from which the charger has shifted in real time, thereby calculating the coordinate value of the shift position of the charger shifted). For example, according to a preferable embodiment of the present invention, when the charger has shifted, the coordinate values of the shift position of the charger are calculated through the following steps:

calculating a direction and a distance of a shift position of the charger relative to a position from which the charger has shifted based on an angular velocity or/and an angle and an acceleration of the charger;

calculating the coordinate values of the shift position of the charger according to coordinate values of the position from which the charger has shifted from which the charger has shifted, and the direction and the distance of the shift position of the charger relative to the position from which the charger has shifted.

Therefore, the mobile electronic device updates the constructed map based on coordinate values of a shift position of the charger when the charger has shifted (that is, makes marks of the charger on the constructed map according to coordinate values of the shift position of the charger, and deletes the coordinate values of the position from which the charger has shifted), so that the mobile electronic device can take advantage of the updated map to find the charger when it needs to be charged.

Referring to FIG. 10, it is a flowchart of a method for finding charger based on map constructing according to the embodiment 10 of the present invention, wherein the method is applicable for real-time mapping of an area to be localized in which a charger is arranged by a mobile electronic; the mobile electronic device can be, for example, a robot.

The method comprises:

step 101, taking any initial position as a coordinate origin of a coordinate system, moving the mobile electronic device with the coordinate origin as a starting point to traverse all over the area to be localized, calculating and recording coordinate values of the charger or an obstacle based on a moving direction and a moving distance of the mobile electronic device relative to the starting point when the mobile electronic device detects the charger or the obstacle each time during the traversal;

step 102, constructing a map according to recorded coordinate values of the coordinate origin, the charger and the obstacle when the traversal has been finished;

step 103, moving the mobile electronic device to a position with coordinate values of a shift position of the charger when the mobile electronic device receives the coordinate values of the shift position of the charger transmitted by the charger which has shifted; taking coordinate values of a position of the charger where the charger is detected by the mobile electronic device as corrected coordinate values of the shift position of the charger; and updating constructed map based on the corrected coordinate values of the shift position of the charger.

Different from the embodiment 9, when receiving the coordinate values of the shift position of the charger transmitted by the charger which has shifted, the mobile electronic device is not directly exploiting the coordinate values of the shift position of the charger to update the constructed map according to the present embodiment. Since the charger records an angular velocity or/and an angle and an acceleration of the charger in real time through a gyro sensor or/and a electronic compass and a accelerometer, so as to obtain the direction and the distance of the shift position of the charger, and further obtain the coordinate values of the shift position of the charger, consequently there exit errors for the coordinate values of the shift position of the charger, which will lead to errors for coordinate values of the charger obtained by the mobile electronic device. Therefore, in the present embodiment, errors are reduced, for example, in the following manners:

The mobile electronic device is moved to a position with the coordinate values of the shift position of the charger (there exit certain errors) when the mobile electronic device receives the coordinate values of the shift position of the charger transmitted by the charger which has shifted, then the exact shift position of the charger can be determined by the following means. For example, the mobile electronic device is provided with a laser transmitting/receiving sensor, and the mobile electronic device is moved to a position with the coordinate values of the shift position of the charger when the mobile electronic device receives the coordinate values of the shift position of the charger transmitted by the charger which has shifted; coordinate values of a position of the charger where the charger is detected by the laser transmitting/receiving sensor are taken corrected coordinate values of the shift position of the charger; the constructed map is updated based on the corrected coordinate values of the shift position of the charger; or The mobile electronic device is provided with an infrared transmitting/receiving sensor or/and a camera. The mobile electronic device is moved to a position with the coordinate values of the shift position of the charger when the mobile electronic device receives the coordinate values of the shift position of the charger transmitted by the charger which has shifted; then the mobile electronic device is guided by the infrared transmitting/receiving sensor or/and the camera to an exact position of the charger which is taken as corrected coordinate values of the shift position of the charger; the constructed map is updated based on the corrected coordinate values of the shift position of the charger.

As can be understood, the mobile electronic device sends the corrected coordinate values of the shift position of the charger to the charger for storing.

It can be seen that the present embodiment can not only achieve the corresponding effect of the embodiment 1, but also obtain more accurate coordinate values of the position of the charger on the basis of the embodiment 1, so that the updated map is more accurate and the mobile electronic device can accurately find the charger.

Referring to FIG. 11, it is a flowchart of a method for finding charger based on map constructing according to the embodiment 11 of the present invention, wherein the method is applicable for real-time mapping of an area to be localized in which a charger is arranged. At least two locating tags are arranged in the area to be localized, each said locating tag is correspondingly arranged at a specific position of the area to be localized, and the information of each said locating tag comprises unique coding information used for distinguishing an absolute position thereof; the mobile electronic device can be, for example, a robot.

The method comprises:

step 111, taking any initial position as a coordinate origin of a coordinate system, moving the mobile electronic device with the coordinate origin as a starting point to traverse all over the area to be localized, during the traversal, based on a moving direction and a moving distance of the mobile electronic device relative to the starting point, calculating and recording coordinate values of the charger or an obstacle each time when the mobile electronic device detects the charger or the obstacle, and calculating coordinate values of a location of a locating tag each time when the mobile electronic device obtains information of the locating tag, and recording the information of the locating tag and the corresponding coordinate values;

step 112, constructing a map according to the recorded coordinate values of the coordinate origin, the charger and each said obstacle, and information of the locating tag and coordinate values thereof when the traversal has been finished;

step 113, updating constructed map based on coordinate values of a shift position of the charger when the mobile electronic device receives the coordinate values of the shift position of the charger transmitted by the charger which has shifted.

Different from the embodiment 9, at least two locating tags are arranged at specific positions/arbitrary positions of the area to be localized and mapped according to the present embodiment, wherein tag information of the locating tag can be read by a locating tag information reader in the mobile electronic device in step 111. The specific working mode in the present embodiment can be referred to the embodiment 1, which will not be repeated herein.

Referring to FIG. 12, it is a flowchart of a method for finding charger based on map constructing according to the embodiment 12 of the present invention, wherein the method is applicable for real-time mapping of an area to be localized in which a charger is arranged. At least two locating tags are arranged in the area to be localized, each said locating tag is correspondingly arranged at a specific position of the area to be localized, and the information of each said locating tag comprises unique coding information used for distinguishing an absolute position thereof; the mobile electronic device can be, for example, a robot.

The method comprises:

step 121, taking any initial position as a coordinate origin of a coordinate system, moving the mobile electronic device with the coordinate origin as a starting point to traverse all over the area to be localized; during the traversal, based on a moving direction and a moving distance of the mobile electronic device relative to the starting point, calculating and recording coordinate values of the charger or an obstacle each time when the mobile electronic device detects the charger or the obstacle, and calculating coordinate values of a location of a locating tag each time when the mobile electronic device obtains information of the locating tag, and recording the information of the locating tag and the corresponding coordinate values;

step 122, constructing a map according to the recorded coordinate values of the coordinate origin, the charger and each said obstacle and information of the locating tag and coordinate values thereof when the traversal has been finished;

step 123, enabling the mobile electronic device to traverse all over the area to be localized for multiple times with the coordinate origin as the starting point, and correcting the coordinate values of each said locating tag by using a correction algorithm based on the coordinate values of each said locating tag obtained from traversal for each time; and correcting constructed map based on corrected coordinate values;

step 124, updating constructed map based on coordinate values of a shift position of the charger when the mobile electronic device receives the coordinate values of the shift position of the charger transmitted by the charger which has shifted.

It can be seen that on the basis of embodiment 11 the present embodiment further corrects the location of the locating tags through a correction algorithm according to the coordinate values of the locating tags obtained from traversal for multiple times, that is, step 43.

Specifically, due to cumulative errors of the encoder or for other reasons, the coordinate values of the locating tag obtained by the traversal for one time are inevitably erroneous, resulting in an inaccurate map. Therefore, after a map has been constructed, the coordinate values of each said locating tag are obtained for multiply times by the means that the mobile device traverses for multiply times, and then the coordinate values of each said locating tag are corrected by the recursive algorithm. The more times the mobile device traverses for, the more accurate the calculated coordinate values of the locating tag will be, until final errors will be reduced to negligible. Finally, the constructed map is corrected based on the corrected coordinate values.

Therefore, the present embodiment provides the technical scheme that the coordinate values of each said locating tag are obtained for multiply times from traversal for multiply times, and then the coordinate values of each said locating tag are corrected by a recursive algorithm and the constructed map is corrected based on the corrected coordinate values, which further eliminates the cumulative errors of the mobile electronic device, thereby improving the accuracy of the constructed map.

Figure 13:
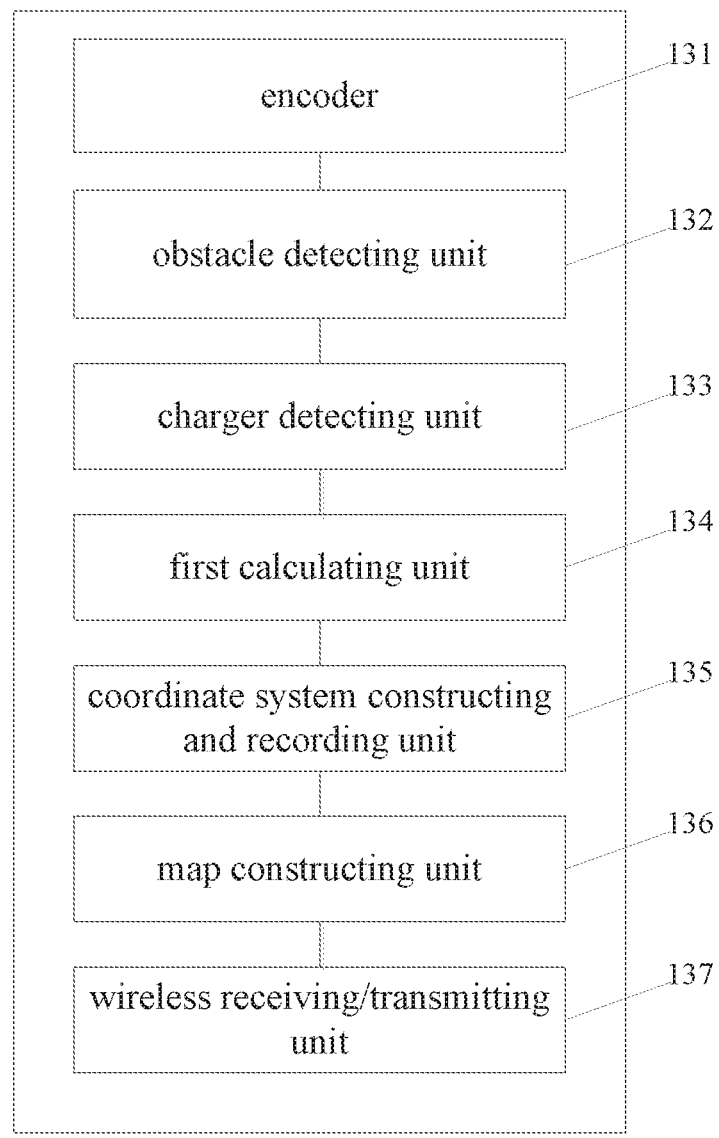
FIG. 13 is a composition block diagram of an apparatus for finding charger based on map constructing according to the embodiment 13 of the present invention.

Referring to FIG. 13, it is a composition block diagram of an apparatus for finding charger based on map constructing according to the embodiment 13 of the present invention. The apparatus for finding charger based on map constructing is a mobile electronic device or installed in a mobile electronic device, which is applicable for real-time mapping of an area to be localized in which a charger is arranged; the mobile electronic device can be, for example, a robot.

The apparatus for finding charger based on map constructing comprises:

an encoder 131, configured to record a moving distance and a moving direction of the mobile electronic device relative to a starting point in real time when the mobile electronic device traverses all over the area to be localized with any initial position as a coordinate origin of a coordinate system as the starting point;

an obstacle detecting unit 132, configured to detect obstacle;

a charger detecting unit 133, configured to detect the charger;

a first calculating unit 134, configured to calculate coordinate values of the charger or an obstacle based on a moving direction and a moving distance of the mobile electronic device relative to the starting point recorded by the encoder 131 when the charger detecting unit 133 detects the charger or the obstacle detecting unit 132 detects the obstacle each time during the traversal, and send the calculated coordinate values to a coordinate system constructing and recording unit 135;

a coordinate system constructing and recording unit 135, configured to record the coordinate values of the charger and each said obstacle;

a map constructing unit 136, configured to construct a map according to coordinate values of the coordinate origin, the charger and each said obstacle recorded by the coordinate system constructing and recording unit 135; and a wireless receiving/transmitting unit 137, configured to transmit the coordinate values of the charger obtained by the first calculating unit 134 to the charger, and receive coordinate values of a shift position of the charger transmitted by the charger which has shifted, and send the coordinate values of the shift position of the charger to the coordinate system constructing and recording unit 135 to update coordinate values of the charger, so as to cause the map constructing unit 136 to update constructed map.

The operation principle and working process of the apparatus for finding charger based on map constructing according to the present embodiment can be referred to embodiment 9, which will not be repeated thereto.

According to another embodiment, when receiving the coordinate values of the shift position of the charger transmitted by the charger which has shifted, the mobile electronic device is not directly exploiting the coordinate values of the shift position of the charger to update the constructed map. Since the charger records an angular velocity or/and an angle and an acceleration of the charger in real time through a gyro sensor or/and a electronic compass and a accelerometer, so as to obtain the direction and the distance of the shift position of the charger, and further obtain the coordinate values of the shift position of the charger, consequently there exit errors for the coordinate values of the shift position of the charger, which will lead to errors for coordinate values of the charger obtained by the mobile electronic device. Therefore, in the present embodiment, errors are reduced, for example, in the following manners:

The mobile electronic device further comprises a laser transmitting/receiving sensor; and the mobile electronic device is moved to a position with the coordinate values of the shift position of the charger when the mobile electronic device receives the coordinate values of the shift position of the charger transmitted by the charger which has shifted; coordinate values of a position of the charger where the charger is detected by the laser transmitting/receiving sensor are taken corrected coordinate values of the shift position of the charger; the constructed map is updated based on the corrected coordinate values of the shift position of the charger; or The mobile electronic device further comprises an infrared transmitting/receiving sensor or/and a camera; the mobile electronic device is moved to a position with the coordinate values of the shift position of the charger when the mobile electronic device receives the coordinate values of the shift position of the charger transmitted by the charger which has shifted; then the mobile electronic device is guided by the infrared transmitting/receiving sensor or/and the camera to an exact position of the charger which is taken as corrected coordinate values of the shift position of the charger; the constructed map is updated based on the corrected coordinate values of the shift position of the charger.

Figure 14:
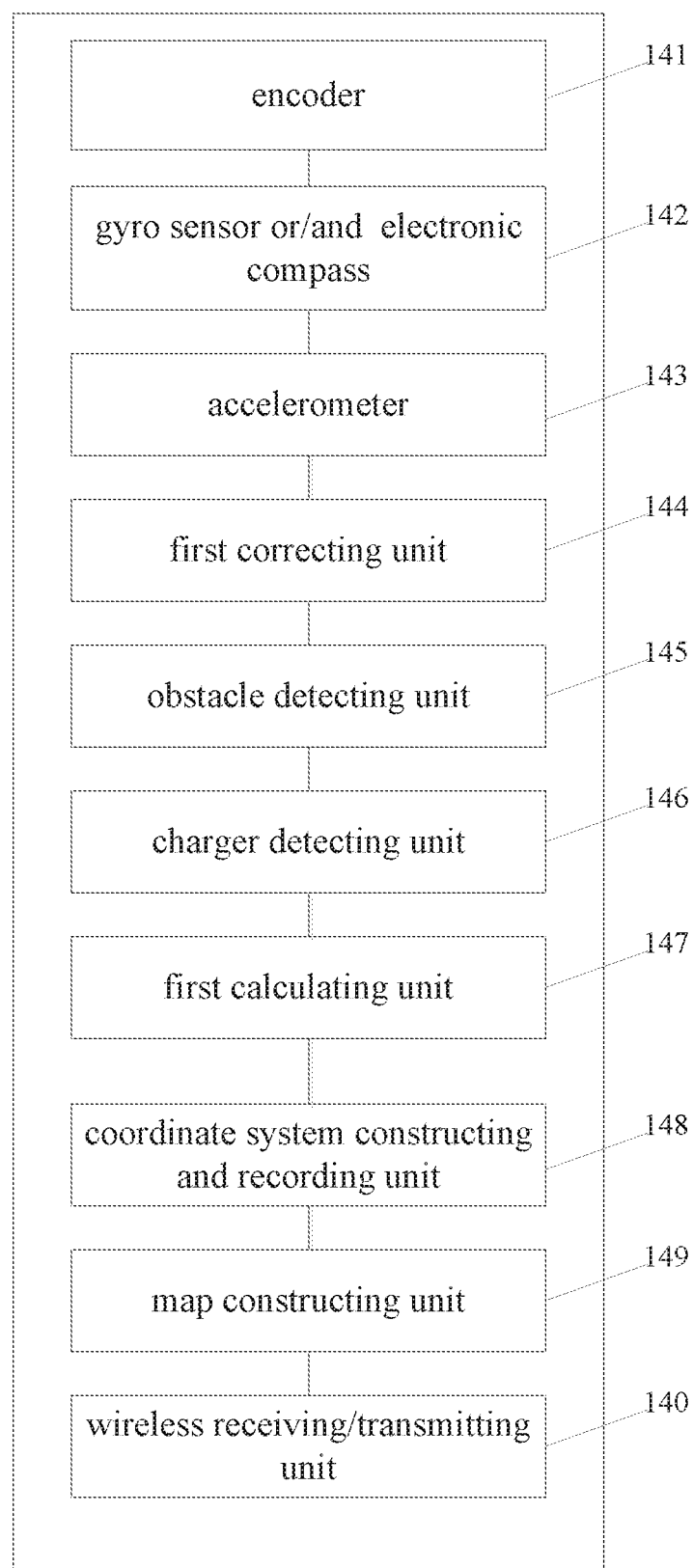
FIG. 14 is a composition block diagram of an apparatus for finding charger based on map constructing according to the embodiment 14 of the present invention.

Referring to FIG. 14, it is a composition block diagram of an apparatus for finding charger based on map constructing according to the embodiment 14 of the present invention. The apparatus for finding charger based on map constructing is a mobile electronic device or installed in a mobile electronic device, which is applicable for real-time mapping of an area to be localized in which a charger is arranged; the mobile electronic device can be, for example, a robot.

The apparatus for finding charger based on map constructing comprises:

an encoder 141, configured to record a moving distance and a moving direction of the mobile electronic device relative to a starting point in real time when the mobile electronic device traverses all over the area to be localized with any initial position as a coordinate origin of a coordinate system as the starting point;

a gyro sensor or/and an electronic compass 142, configured to record an angular velocity or/and an angle of the mobile electronic device in real time;

an accelerometer 143, configured to record an acceleration of the mobile electronic device in real time;

a first correcting unit 144, configured to correct each said moving direction and each said moving distance of the mobile electronic device relative to the starting point based on the angular velocity or/and the angle, and the acceleration of the mobile electronic device;

an obstacle detecting unit 145, configured to detect obstacle;

a charger detecting unit 146, configured to detect the charger;

a first calculating unit 147, configured to calculate coordinate values of the charger or an obstacle based on a moving direction and a moving distance of the mobile electronic device relative to the starting point recorded by the encoder 141 when the charger detecting unit 146 detects the charger or the obstacle detecting unit 145 detects the obstacle each time during the traversal, and send the calculated coordinate values to a coordinate system constructing and recording unit 148;

a coordinate system constructing and recording unit 148, configured to record the coordinate values of the charger and each said obstacle;

a map constructing unit 149, configured to construct a map according to coordinate values of the coordinate origin, the charger, each said obstacle recorded by the coordinate system constructing and recording unit 148; and a wireless receiving/transmitting unit 140, configured to transmit the coordinate values of the charger obtained by the first calculating unit 147 to the charger, and receive coordinate values of a shift position of the charger transmitted by the charger which has shifted, and send the coordinate values of the shift position of the charger to the coordinate system constructing and recording unit 148 to update coordinate values of the charger, so as to cause the map constructing unit 149 to update constructed map.

It can be seen that on the basis of embodiment 13, the present embodiment adds the gyro sensor or/and the electronic compass 142 and the accelerometer 143, which are configured to record the angular velocity or/and the angle and the acceleration of the mobile electronic device in real time respectively so as to correct each said moving direction and each said moving distance of the mobile electronic device relative to the starting point, and calculate the coordinate values based on the corrected moving direction and the moving distance, thereby correcting each obtained coordinate value. Wherein, the gyro include, but are not limited to, wire gyro, electrostatic gyro, laser gyro, fiber optic gyro, micromechanical gyro or the like.

Therefore, the present embodiment can eliminate exiting cumulative errors from calculation process of the encoder 141s installed on the driving wheels, which is resulted from wheel slippage, uncertain distance of contact points between two driving wheels and ground or the like. So coordinate values calculated based on the corrected moving direction and moving distance of the mobile electronic device relative to the starting point and is made more accurate, so that the map constructed on the basis of the coordinate values is made more accurate.

Figure 15:
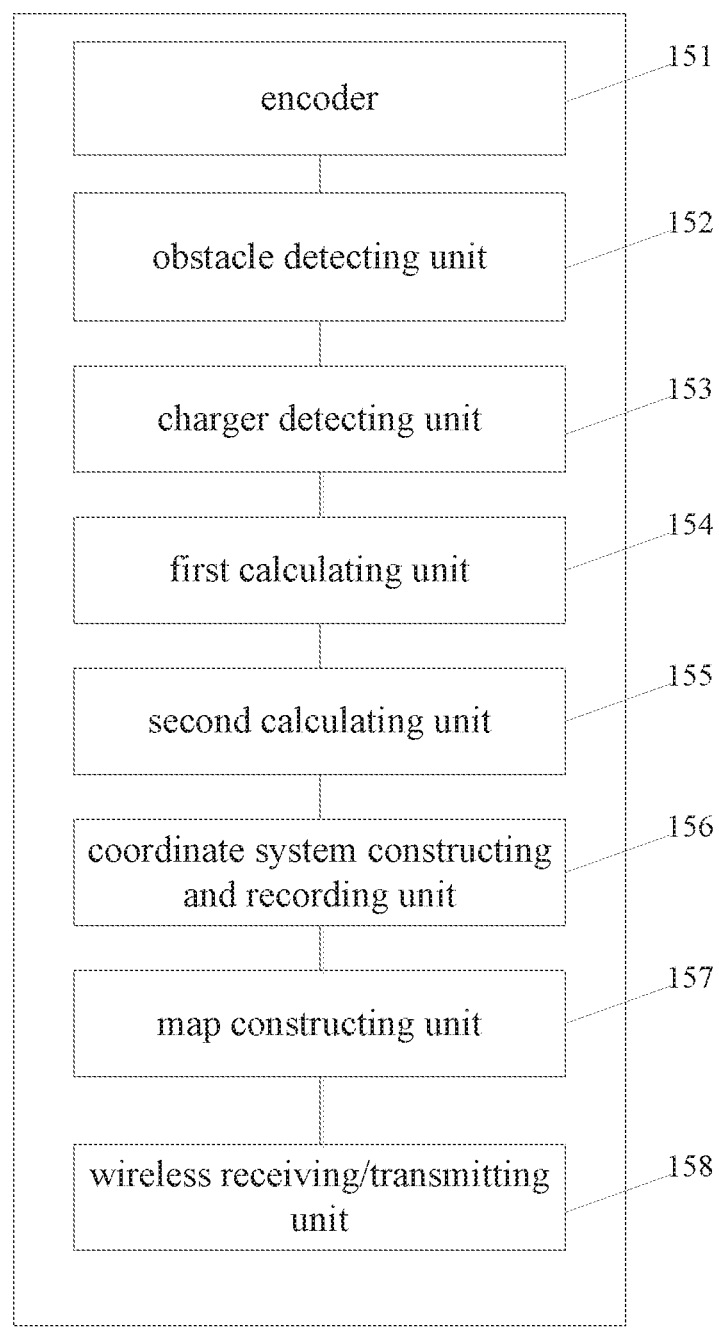
FIG. 15 is a composition block diagram of an apparatus for finding charger based on map constructing according to the embodiment 15 of the present invention.

Referring to FIG. 15, it is a composition block diagram of an apparatus for finding charger based on map constructing according to the embodiment 15 of the present invention. The apparatus for finding charger based on map constructing is a mobile electronic device or installed in a mobile electronic device, which is applicable for real-time mapping of an area to be localized in which a charger is arranged, at least two locating tags are arranged in the area to be localized, each said locating tag is correspondingly arranged at a specific position of the area to be localized, and the information of each said locating tag comprises unique coding information used for distinguishing an absolute position thereof; the mobile electronic device can be, for example, a robot.

The apparatus for finding charger based on map constructing comprises:

an encoder 151, configured to record a moving distance and a moving direction of the mobile electronic device relative to a starting point in real time when the mobile electronic device traverses all over the area to be localized with any initial position as a coordinate origin of a coordinate system as the starting point;

an obstacle detecting unit 152, configured to detect obstacle;

a charger detecting unit 153, configured to detect the charger;

a first calculating unit 154, configured to calculate coordinate values of the charger or an obstacle based on a moving direction and a moving distance of the mobile electronic device relative to the starting point recorded by the encoder 151 when the charger detecting unit 153 detects the charger or the obstacle detecting unit 152 detects the obstacle each time during the traversal, and send the calculated coordinate values to a coordinate system constructing and recording unit 156;

a second calculating unit 155, configured to calculate coordinate values of a location of a locating tag each time when the mobile electronic device obtains information of the locating tag based on a moving direction and a moving distance of the mobile electronic device relative to the starting point during the traversal, and send the information of the locating tag and the corresponding coordinate values to the coordinate system constructing and recording unit 156;

a coordinate system constructing and recording unit 156, configured to record coordinate values of the charger and each said obstacle, and information of the locating tag and coordinate values thereof when the traversal has been finished;

a map constructing unit 157, configured to construct a map according to coordinate values of the coordinate origin, the charger and each said obstacle, and the information of the locating tag and coordinate values thereof recorded by the coordinate system constructing and recording unit 156; and a wireless receiving/transmitting unit 158, configured to transmit the coordinate values of the charger obtained by the first calculating unit 154 to the charger, and receive coordinate values of a shift position of the charger transmitted by the charger which has shifted, and send the coordinate values of the shift position of the charger to the coordinate system constructing and recording unit 156 to update coordinate values of the charger, so as to cause the map constructing unit 157 to update constructed map.

The operation principle and working process of the apparatus for finding charger based on map constructing according to the present embodiment can be referred to embodiment 11, which will not be repeated thereto.

Figure 16:
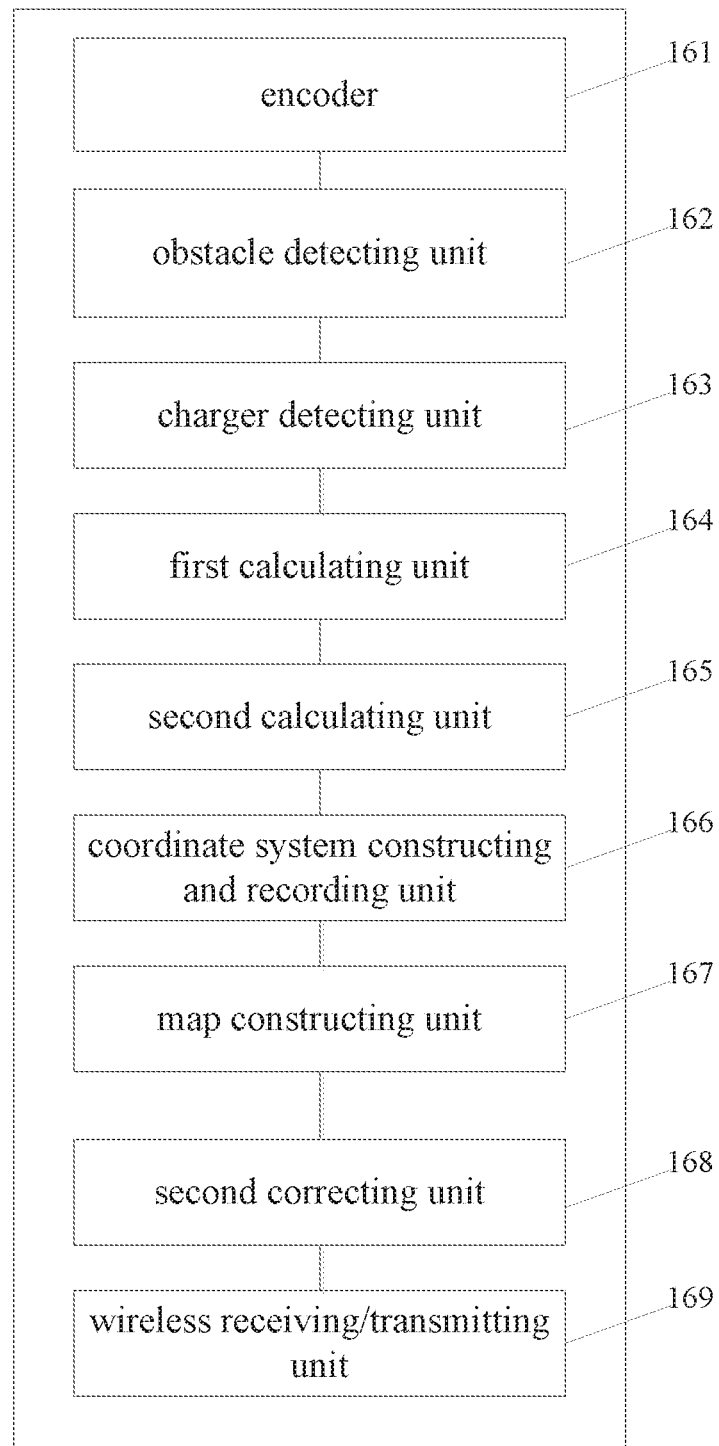
FIG. 16 is a composition block diagram of an apparatus for finding charger based on map constructing according to the embodiment 16 of the present invention.

Referring to FIG. 16, it is a composition block diagram of an apparatus for finding charger based on map constructing according to the embodiment 16 of the present invention. The apparatus for finding charger based on map constructing is a mobile electronic device or installed in a mobile electronic device, which is applicable for real-time mapping of an area to be localized in which a charger is arranged, at least two locating tags are arranged in the area to be localized, each said locating tag is correspondingly arranged at a specific position of the area to be localized, and the information of each said locating tag comprises unique coding information used for distinguishing an absolute position thereof; the mobile electronic device can be, for example, a robot.

The apparatus for finding charger based on map constructing comprises:

an encoder 161, configured to record a moving distance and a moving direction of the mobile electronic device relative to a starting point in real time when the mobile electronic device traverses all over the area to be localized with any initial position as a coordinate origin of a coordinate system as the starting point;

an obstacle detecting unit 162, configured to detect obstacle;

a charger detecting unit 163, configured to detect the charger;

a first calculating unit 164, configured to calculate coordinate values of the charger or an obstacle based on a moving direction and a moving distance of the mobile electronic device relative to the starting point recorded by the encoder 161 when the charger detecting unit 163 detects the charger or the obstacle detecting unit 162 detects the obstacle each time during the traversal, and send the calculated coordinate values to a coordinate system constructing and recording unit 166;

a second calculating unit 165, configured to calculate coordinate values of a location of a locating tag each time when the mobile electronic device obtains information of the locating tag based on a moving direction and a moving distance of the mobile electronic device relative to the starting point during the traversal, and send the information of the locating tag and the corresponding coordinate values to the coordinate system constructing and recording unit 166;

a coordinate system constructing and recording unit 166, configured to record coordinate values of the charger and each said obstacle, and information of the locating tag and coordinate values thereof when the traversal has been finished;

a map constructing unit 167, configured to construct a map according to coordinate values of the coordinate origin, the charger and each said obstacle, and the information of the locating tag and coordinate values thereof recorded by the coordinate system constructing and recording unit 166;

a second correcting unit 168, configured to enable the mobile electronic device to traverse all over the area to be localized for multiple times with the coordinate origin as the starting point, and correct the coordinate values of each said locating tag by using a correction algorithm based on the coordinate values of each said locating tag obtained from traversal for each time; and send corrected coordinate values to the map constructing unit 167 to correct constructed map; and a wireless receiving/transmitting unit 169, configured to transmit the coordinate values of the charger obtained by the first calculating unit 164 to the charger, and receive coordinate values of a shift position of the charger transmitted by the charger which has shifted, and send the coordinate values of the shift position of the charger to the coordinate system constructing and recording unit 166 to update coordinate values of the charger, so as to cause the map constructing unit 167 to update constructed map.

The present embodiment adds the second correcting unit 168 on basis of the embodiment 15, according to which the coordinate values of each locating tag are obtained for multiply times in the way that the mobile device traverses for multiply times, and then the coordinate values of each locating tag are corrected by the recursive algorithm. The more times the mobile device traverses for, the more accurate the calculated coordinate values of the locating tag will be, until final errors will be reduced to negligible. Finally, the constructed map is corrected based on the corrected coordinate values by the map constructing unit 167. Thereby exiting cumulative errors from the mobile device traversing for one time are eliminated, and accuracy of the constructed map is improved.

Referring to FIG. 17, it is a flowchart of a method for finding charger based on map constructing according to the embodiment 17 of the present invention, wherein the method is applicable for real-time mapping of an area to be localized in which at least one locating tag is arranged, and a charger is located in the area to be localized, and the charger is provided with one locating tag as well, information of each said locating tag comprises unique coding information used for distinguishing an absolute position thereof; the mobile electronic device can be, for example, a robot.

The method for finding charger based on map constructing comprises:

step 171, taking a location of a first locating tag as a coordinate origin of a coordinate system when information of the first locating tag is obtained by a mobile electronic device which is moving along a certain trajectory for a first time, and recording the information of the first locating tag and coordinate values thereof;

step 172, moving the mobile electronic device with the coordinate origin as a starting point to traverse all over the area to be localized;

step 173, calculating coordinate values of location of other locating tag except the first locating tag each time when the mobile electronic device obtains information of the other locating tag based on a moving direction and a moving distance of the mobile electronic device relative to the starting point during the traversal, and recording the information of the other locating tag and the corresponding coordinate values;

step 174, determining whether a locating tag is on the charger based on the unique coding information of the locating tag when the mobile electronic device obtains the information of any locating tag, so as to obtain coordinate values of the charger, and sending the coordinate values of the charger to the charger;

step 175, constructing a map according to recorded information of the locating tag and coordinate values thereof;

step 176, updating constructed map based on coordinate values of a shift position of the charger when the mobile electronic device receives the coordinate values of the shift position of the charger transmitted by the charger which has shifted.

In step 171, at least one locating tag is arranged at a specific position/arbitrary position of the area to be localized and mapped, and a charger is located in the area to be localized, and the charger is provided with one locating tag as well. As can be understood, the unique coding information of the locating tag of the charger can be prestored in the mobile electronic device. It is necessary to have the mobile electronic traversing the entire area to obtain relevant information in the area, thus realizing localization and mapping for the entire area. Before traversing for the first time, the mobile electronic device can be enabled to move along a certain trajectory until the mobile electronic device senses the information of the first locating tag, then the mobile electronic device takes the location of the first locating tag as the coordinate origin of a coordinate system composed of X-axis and Y-axis, and records the information of the first locating tag and coordinate values thereof (coordinate origin).

As can be understood, the location of the first locating tag which is obtained for the first time is taken as the coordinate origin of the coordinate system composed of the X axis and the Y axis in order to facilitate calculation and composition. However, the location of the first locating tag is not limited as the coordinate origin of the coordinate system composed of the X-axis and the Y-axis, and may be marked as other reference point, so as to have a reference function to facilitate recording information of other points. Wherein, according to the present embodiment, the mobile electronic device can read the information of the locating tag through the locating tag information reader.

According to an achievable embodiment of the present invention, each said locating tag is RFID tag, and a unique number which is originally arranged in the RFID tag (or is written into the RFID tag by a RFID reader-writer) is taken as the unique coding information of the locating tag. Correspondingly, the RFID tag is generally used in conjunction with a RFID tag information reader, and the RFID tag can transmit information to the RFID tag information reader with signal and energy excitation from the RFID tag information reader. Thus, in the present embodiment, the mobile electronic device in the present embodiment can read the information of the RFID tag through the RFID tag information reader.

How the mobile electronic device determines specific location of the RFID tag when reading the information of the RFID tag through the RFID tag information reader will be described in detail as below.

Approach 1: each RFID tag adopts passive RFID tag, and it is limited that only when the mobile electronic equipment is closest to a RFID tag can the mobile electronic device sense (obtain) the information of the RFID tag.

In this way, when the RFID tag information reader of the mobile electronic device can obtain the information of the RFID tag, it can be indicated that the mobile electronic device is close enough to the RFID tag (the distance between each other can be negligible). Hence the current location of the mobile electronic device when the mobile electronic device obtains the information of the RFID tag can be taken as the location of the RFID tag.

As can be understood, the reading range (as small as possible) of the RFID tag information reader of the mobile electronic device can be adjusted to achieve the approach 1.

Approach 2: each RFID tag adopts an active RFID tag; during the moving process, when the mobile electronic device has sensed the information of any one of the RFID tags (which reach a certain reading range), the mobile electronic device is enabled to move in a direction in which RSSI of the RFID tag is gradually increasing; as can be understood, since that the information the mobile electronic device has sensed is from not less than one RFID tag, the mobile electronic device is enabled to move in a direction of the RFID tag with the largest RSSI, and the location of the mobile electronic device is taken as the location of the RFID tag when the RSSI of the RFID tag sensed by the mobile electronic device is equal to or greater than a preset maximum RSSI value or the mobile electronic device collides with the RFID tag (the collision can be sensed by a collision sensor).

According to another achievable embodiment of the present invention, each said locating tag is color block tag, the unique coding information is represented by a plurality of different colors, different shapes, combinations of different shapes and different colors or color blocks with different gray scales. Referring to FIG. 27A~FIG. 27C, wherein different color block tags are distinguished by different colors representing unique coding information 200 (the shape may be the same) in FIG. 27A, for example, the red represents color block tag 1, the yellow represents color block tag 2, and the blue represents color block tag 3 . . . ; different color block tags are distinguished by different shapes representing unique coding information 200 (colors may be the same) in FIG. 27B; for example, the circle represents color block tag 1, the triangle represents color block tag 2, the square represents color block tag 3 . . . ; different color block tags are distinguished by combinations of different shapes and different colors representing unique coding information 200 in FIG. 27C, for example, the circle plus the red represents color block tag 1, the triangle plus the yellow represents color block tag 2, the blue plus the square represents color block tag 3 . . . .

As can be understood that the above provides only easy-to-understand description of the color block tag, which is not limited thereto. For example, each said color block tag may be composed of a plurality of small color blocks, each of which may be represented by a plurality of different colors or different shapes or combinations of different shapes and different colors or color blocks with different gray scales. Therefore, there exit a variety of composition ways of the of the color block tag. Specifically, which way is more convenient is determined by the number of the color block tags needed in the environment of the area to be localized.

When adopting color block tag as locating tag, the mobile electronic device can read the information of the color block tags by a color sensor/camera. How the mobile electronic device determine the specific location of the color block tag when reading the information of the color block tag through the color sensor/camera will be described in detail as below.

Approach 1: it is limited that only when the mobile electronic equipment is closest to a color block tag can the color sensor/camera of the mobile electronic device sense (obtain) the tag information of the color block tag.

In this way, when the color sensor/camera of the mobile electronic device can obtain the tag information of the color block tag, it can be indicated that the mobile electronic device is close enough to the color block tag (the distance between each other can be negligible). Hence current location of the mobile electronic device where the mobile electronic device obtains the information of the color block tag can be taken as the location of the color block tag.

As can be understood, the reading range (as small as possible) of the color sensor/camera of the mobile electronic device or the size of the color block tag (small enough) can be adjusted to achieve the approach 1.

Approach 2: during the moving process, when the mobile electronic device has sensed tag information of any one of the color block tags (which reach a certain reading range) by using a color sensor, the mobile electronic device is enabled to move in a direction in which strength of the tag information of the color block tag is gradually increasing until the strength of the tag information of the color block tag sensed by the mobile electronic device is equal to or greater than a preset maximum value or the mobile electronic device collides with the color block tag, and then a current location of the mobile electronic device is taken as the location of the color block tag. As can be understood, since that the tag information sensed by the color sensor during the mobile electronic device's moving process is from not less than one color block tag, the mobile electronic device is enabled to move in a direction of the color block tag with the most strong tag information.

Approach 3: when a camera is used to read the tag information of the color block tags, the location of the color block tag relative to the mobile electronic device is determined based on number of pixels obtained by projecting a pattern of the color block tag onto CCD, thereby calculating the coordinate values of the color block tag.

As can be understood, the locating tag can be represented by other tag type, which is not limited to the disclosed RFID tag or color block tag described above.

In steps 12~13, the mobile electronic device is moved to traverse the entire area to be localized with the coordinate origin the starting point when it is determined that the location of the first locating tag is taken as the coordinate origin. Furthermore, when the mobile electronic device starts to move from the starting point, the real-time calculation of the moving direction and the moving distance of the mobile electronic device relative to the starting point is started up (for example, moving path and relative position and angle of the robot can be recorded in real time through an encoder installed on a driving wheel axle of the robot), so that the location (including the distance and the direction) of the mobile electronic device relative to the starting point can be obtained through calculation, and the coordinate values of the mobile electronic device are obtained as well. Thereby when the mobile electronic device detects information of other locating tag except the first locating tag each time during the traversal, the coordinate values of the other locating tag can be calculated. Detailed obtaining process can be referring to in step 171.

In step 174, when obtaining information of other locating tag except the first locating tag each time, the mobile electronic device would determine whether a locating tag is on the charger or not based on unique coding information of the locating tag (in the way of judging whether the unique coding information of the locating tag is consistent with the prestored coding information, as a result of determining whether the locating tag is on the charger). And if so, the coordinate values of the locating tag would be taken as the coordinate values of the charger and sent to the charger. (the purpose by doing so is to allow the charger to know the specific coordinate values of the charger before a shift happened, so as to facilitate calculation of the coordinate values of the shift position)

In step 175, a map is constructed on the basis of the recorded information of the locating tag and the coordinate values thereof when the mobile electronic device has accomplished the traversal for one time. As can be understood, the constructed map is 2D map, and the mobile electronic device (for example, a robot) may navigate according to the constructed map.

When the charger start to shift, the mobile electronic device will receive (through wireless means) the coordinate values of the shift position of the charger transmitted by the charger which has shifted (the charger is capable of calculating a distance and direction relative to the position from which the charger has shifted in real time, thereby calculating the coordinate value of the shift position of the charger shifted). Therefore, the mobile electronic device updates the constructed map based on coordinate values of a shift position of the charger when the charger has shifted (that is, makes marks of the charger on the constructed map according to coordinate values of the shift position of the charger, and deletes the coordinate values of the position from which the charger has shifted), so that the mobile electronic device can take advantage of the updated map to find the charger when it needs to be charged.

As can be understood, the locating tag of the present embodiment has the following functions: one is localizing the charger (utilizing the locating tag on the charger), the other is localizing a specific position for the area to be localized. According to the present embodiment, preferably two or more locating tags excluding the locating tag on the charger are used to localize the area to be localized, and each of the locating tags is set at a specific position of the area to be localized. Furthermore the information of each said locating tag comprises unique coding information used for distinguishing an absolute position thereof. For example, when at least two locating tags are placed at different specific positions (for example, room 1, room 2, . . . ) of the area to be localized, it is necessary to determine and distinguish a specific location (absolute location) where a locating tag is located by the unique coding information of the locating tag, for example, the locating tag is located in room 1 or room 2 or the like. In general, for passive RFID tags, each tag will generally has its own unique number (or the unique number is written into the RFID tag), which can be used as unique coding information for distinguishing absolute position thereof, and the passive RFID tag is placed at the specific position to identify the specific position. Therefore, the absolute position where the locating tag is located can be identified and then determined by obtaining the unique coding information of each locating tag.

As can be understood, the method according to the present embodiment is applicable for real-time mapping for the indoor area to be localized. When localizing the indoor environment, it is preferable to place one locating tag 111 on a wall on left and/or right side of a door frame in each room; as can be understood that the locating tag 111 can be fixed on the wall through magnet or the like. Preferably a fixing groove 100 is arranged on the wall on the left side and/or the right side of the door frame, and the locating tag 111 is set in the fixing groove 100, as shown in FIG. 28~FIG. 29.

In this way, the mobile electronic device can realize navigating and identifying of the absolute position based on the unique coding information each said locating tag after the map construction is accomplished based on the recorded information of each said locating tag. For example, when a robot is required to traverse the room 2 for one time, the absolute position of the room 2 (namely, the location of the locating tag) can be determined based on the unique coding information of the locating tag placed on the left and/or right side wall of the door frame in the room 2 and the mobile electronic device navigates to arrive in the room 2 based on the relative coordinate values (both direction and distance relative to the coordinates origin) of the locating tag on the constructed map. Similarly, when the robot needs to be charged, it is achievable to determine the absolute position of the charger (that is, the position of the corresponding locating tag) based on the unique coding information of the locating label on the charger and, thereby navigating the mobile electronic device to the charger for getting charged based on relative coordinate values of the locating tag on the constructed map (the direction and distance relative to the current position of the mobile electronic device).

In addition, the mobile device (the robot) is enabled to know where it is located based on the unique coding information of each locating tag.

According to a preferable embodiment of the present invention, to further improve accuracy of constructed map, each said moving direction and each said moving distance of the mobile electronic device relative to the starting point can be corrected based on an angular velocity or/and an angle and an acceleration of the mobile electronic device; so that obtained coordinate values are corrected. For example, if the moving direction and the moving distance of a robot relative to the starting point are recorded in real time by an encoder installed on a driving wheel axle of the robot, there exit cumulative errors in the calculation process of the encoder due to wheel slippage, uncertain distance of contact points between the two driving wheels and the ground or the like. Therefore, according to the present embodiment the mobile electronic device records the angular velocity and/or the angle and the acceleration of the mobile electronic device in real time, for example, preferably by using a gyro sensor and/or an electronic compass and an accelerometer, respectively, then the moving direction and moving distance of the mobile electronic device relative to the starting point recorded by the encoder in real time are corrected based on the angular velocity and/or angle and acceleration recorded by the gyro sensor and/or the electronic compass and the accelerometer in real time, so that coordinate values calculated based on the corrected moving direction and moving distance of the mobile electronic device relative to the starting point and are made more accurate, so that the map constructed based on the coordinate values is made more accurate.

It can be seen that with the method of finding the charger based on map constructing according to the present embodiment, the mobile electronic device can accurately find the charger for charging when the charger has shifted. Moreover, when the charger has shifted, it only needs to update the position of the charger on the constructed map without reconstructing the map, which has the advantage of low cost, simple operation and effective technical results.

Figure 18:
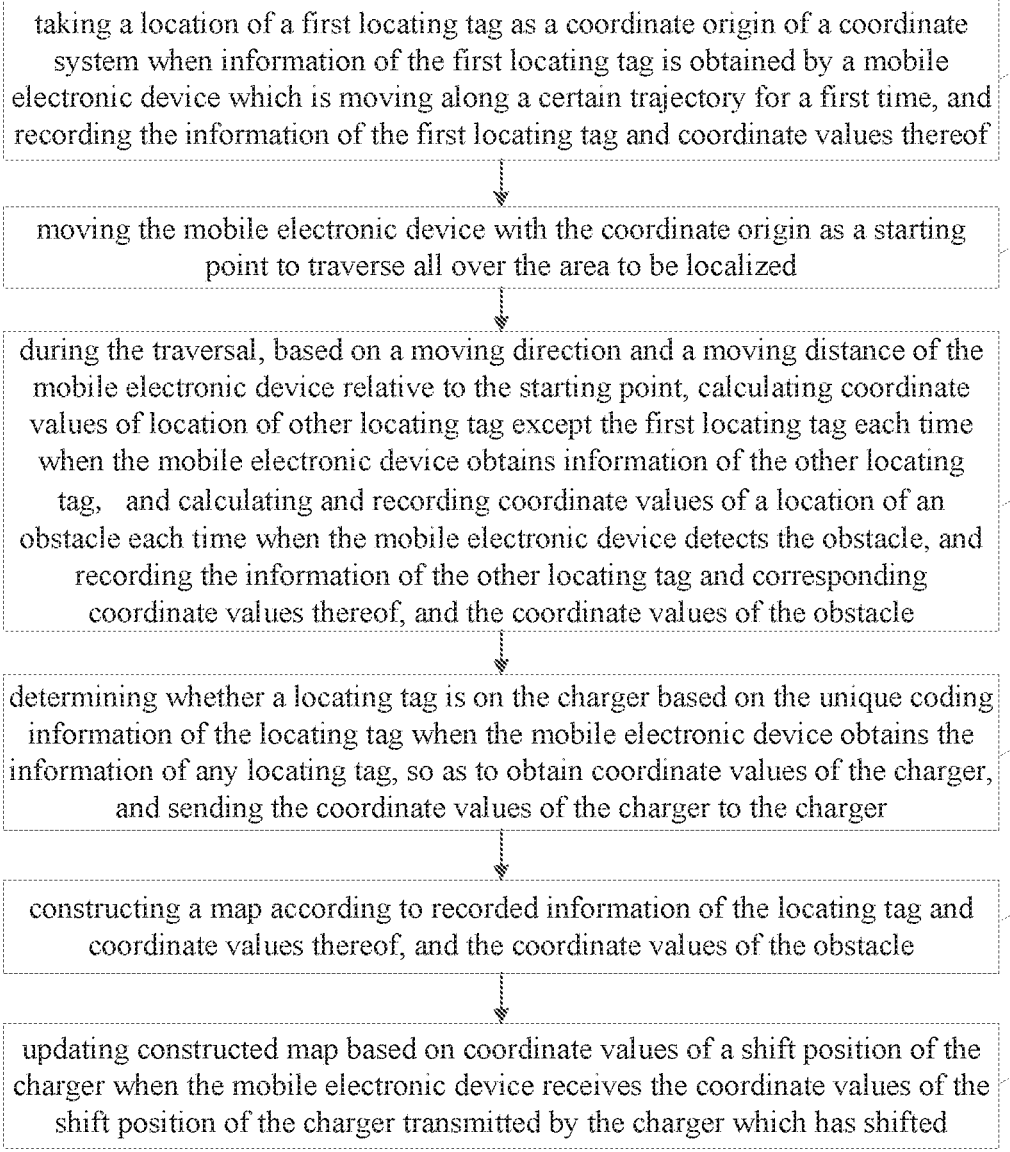
FIG. 18 is a flowchart of a method for finding charger based on map constructing according to the embodiment 18 of the present invention.

Referring to FIG. 18, it is a flowchart of a method for finding charger based on map constructing according to the embodiment 18 of the present invention, wherein the method is applicable for real-time mapping of an area to be localized in which at least one locating tag is arranged, and a charger is located in the area to be localized, and the charger is provided with one locating tag as well, information of each said locating tag comprises unique coding information used for distinguishing an absolute position thereof; the mobile electronic device can be, for example, a robot.

The method for finding charger based on map constructing comprises:

step 181, taking a location of a first locating tag as a coordinate origin of a coordinate system when information of the first locating tag is obtained by a mobile electronic device which is moving along a certain trajectory for a first time, and recording the information of the first locating tag and coordinate values thereof;

step 182, moving the mobile electronic device with the coordinate origin as a starting point to traverse all over the area to be localized;

step 183, during the traversal, based on a moving direction and a moving distance of the mobile electronic device relative to the starting point, calculating coordinate values of location of other locating tag except the first locating tag each time when the mobile electronic device obtains information of the other locating tag, and calculating and recording coordinate values of a location of an obstacle each time when the mobile electronic device detects the obstacle, and recording the information of the other locating tag and corresponding coordinate values thereof, and the coordinate values of the obstacle;

step 184, determining whether a locating tag is on the charger based on the unique coding information of the locating tag when the mobile electronic device obtains the information of any locating tag, so as to obtain coordinate values of the charger, and sending the coordinate values of the charger to the charger;

step 185, constructing a map according to recorded information of the locating tag and coordinate values thereof, and the coordinate values of the obstacle;

step 186, updating constructed map based on coordinate values of a shift position of the charger when the mobile electronic device receives the coordinate values of the shift position of the charger transmitted by the charger which has shifted.

As can be understood, steps 181~182, step 184 and step 186 in the present embodiment are basically consistent with steps 171~172, step 174 and step 176 as shown in FIG. 17, which will not be repeated thereto.

Different from embodiment 17, when the mobile electronic device detects an obstacle each time during the traversal, the coordinate values of the location of the obstacle can be calculated. The more recorded information, the richer and more detailed the constructed map will be. For example, when the mobile electronic device collides with an obstacle, the coordinate values of the obstacle are recorded, so that when the mobile electronic device which is placed in the indoor environment has traversed the entire room, the coordinate values of all the obstacles can be recorded continuously, and the obstacles which surrounds as periphery and at the same time makes a circle can be considered as a wall, so that a barrier-free region area, an obstacle area and a wall area of the room can be separated to construct the map of the whole room.

The coordinate values of the location of the obstacle can be calculated during the traversal in the following approaches:

The obstacle is sensed by using a collision sensor, and current coordinate values of the mobile electronic device are taken as the coordinate values of the location of the obstacle when the collision sensor senses a collision with the obstacle;

The obstacle is detected by using a laser sensor/an infrared sensor, and the location of the obstacle relative to the current location of the mobile electronic device is calculated on the basis of a calculation principle of laser/infrared distance when the laser sensor/infrared sensor detects the obstacle, thus the coordinate values of the location of the obstacle is calculated.

Moreover, an additional collision strategy is set in the present embodiment, that is, when the mobile electronic device has collided with an obstacle during the traversal, the mobile electronic device is enabled to continue to advance to avoid the obstacle according to the preset collision strategy. According to a preferable embodiment of the present invention, the preset collision strategy comprises: when the mobile electronic device senses a collision with the obstacle through, for example, a collision sensor, the mobile electronic device will perform an intelligent analysis to determine the further movement. For example, the mobile electronic device may choose to retreat by greater than 0 and less than 20 cm and rotate to the right or left by 1-10 degrees according to a specific environmental of the area to be localized. Moreover, when the mobile electronic device is in a confined space, the mobile electronic device may choose to retreat by greater than 0 and less than 2 cm. Furthermore, the mobile electronic device chooses a larger angle of rotation, for example, 2 degrees or even 10 degrees, when rotating consecutively by 1 degree for 3 times with collision points of the consecutive rotations on the same plane.

As can be understood, in addition to the preset collision strategy disclosed herein, the collision strategy according to the present embodiment can also adopt other approaches, which is not limited thereto.

Therefore, according the preset collision strategy, the mobile electronic device is moved continually to obtain coordinate values of other obstacle, and the traversal for one time is accomplished until the entire area to be localized has been traversed. As can be understood, all feature information (including the location information of locating tag and t each said obstacle) of the area to be localized is recorded after the mobile electronic device has accomplished the traversal for one time.

Figure 19:
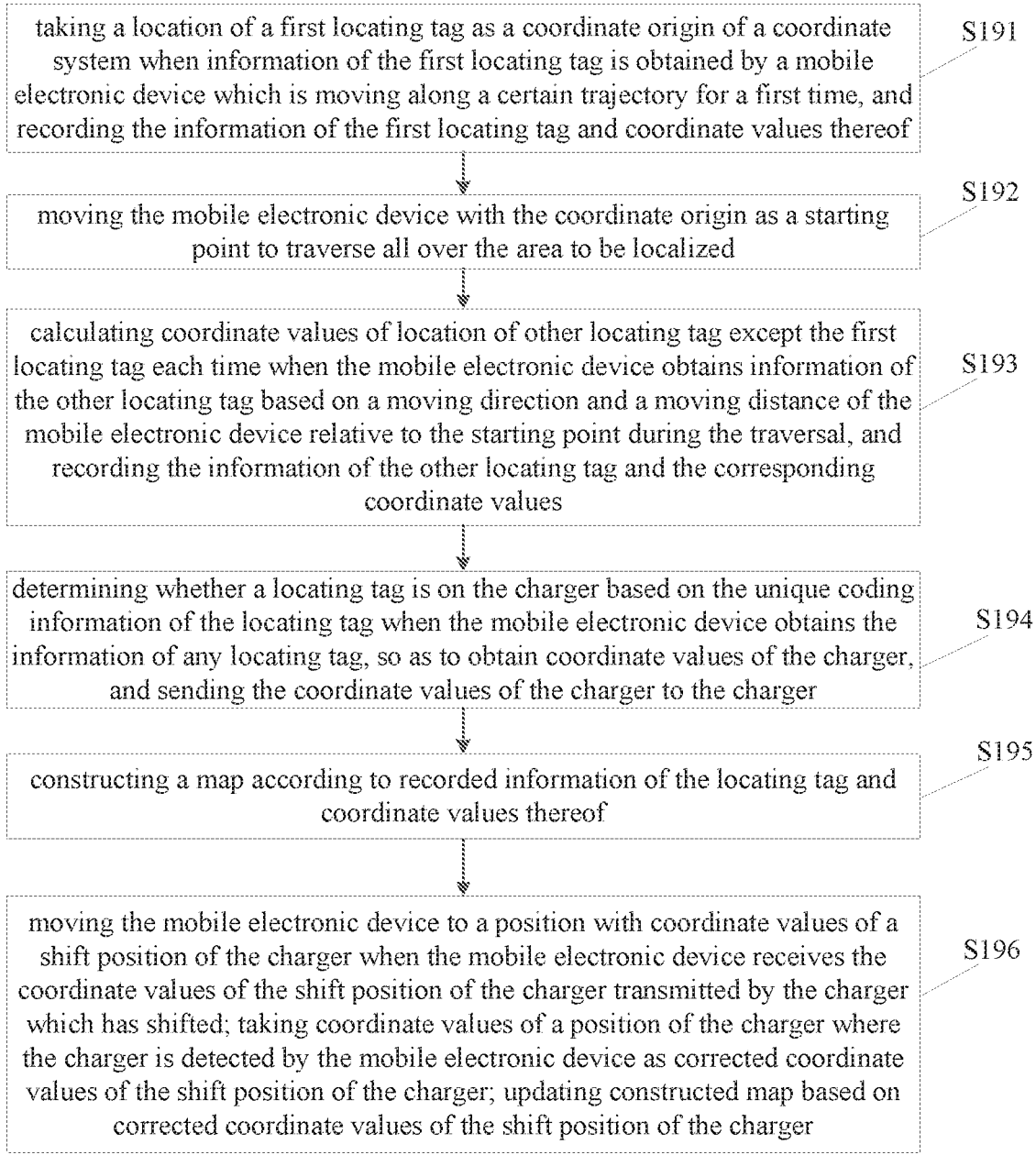
FIG. 19 is a flowchart of a method for finding charger based on map constructing according to the embodiment 19 of the present invention.

Referring to FIG. 19, it is a flowchart of a method for finding charger based on map constructing according to embodiment 19 of the present invention, wherein the method is applicable for real-time mapping of an area to be localized in which at least one locating tag is arranged, and a charger is located in the area to be localized, and the charger is provided with one locating tag as well, information of each said locating tag comprises unique coding information used for distinguishing an absolute position thereof; the mobile electronic device can be, for example, a robot.

The method for finding charger based on map constructing comprises:

step 191, taking a location of a first locating tag as a coordinate origin of a coordinate system when information of the first locating tag is obtained by a mobile electronic device which is moving along a certain trajectory for a first time, and recording the information of the first locating tag and coordinate values thereof;

step 192, moving the mobile electronic device with the coordinate origin as a starting point to traverse all over the area to be localized;

step 193, calculating coordinate values of location of other locating tag except the first locating tag each time when the mobile electronic device obtains information of the other locating tag based on a moving direction and a moving distance of the mobile electronic device relative to the starting point during the traversal, and recording the information of the other locating tag and the corresponding coordinate values;

step 194, determining whether a locating tag is on the charger based on the unique coding information of the locating tag when the mobile electronic device obtains the information of any locating tag, so as to obtain coordinate values of the charger, and sending the coordinate values of the charger to the charger;

step 195, constructing a map according to recorded information of the locating tag and coordinate values thereof; and step 196, moving the mobile electronic device to a position with coordinate values of a shift position of the charger when the mobile electronic device receives the coordinate values of the shift position of the charger transmitted by the charger which has shifted; taking coordinate values of a position of the charger where the charger is detected by the mobile electronic device as corrected coordinate values of the shift position of the charger; updating constructed map based on corrected coordinate values of the shift position of the charger.

As can be understood, steps 191~195 in the present embodiment are basically consistent with steps 171~175 as shown in FIG. 17, which will not be repeated thereto.

Different from the embodiment 17, according to the present embodiment, when receiving the coordinate values of the shift position of the charger transmitted by the charger which has shifted, the mobile electronic device is not directly exploiting the coordinate values of the shift position of the charger to update the constructed map. Since the charger records an angular velocity or/and an angle and an acceleration of the charger in real time through a gyro sensor or/and a electronic compass and a accelerometer, so as to obtain the direction and the distance of the shift position of the charger, and further obtain the coordinate values of the shift position of the charger, consequently there exit errors for the coordinate values of the shift position of the charger, which will lead to errors for coordinate values of the charger obtained by the mobile electronic device. Therefore, in the present embodiment, errors are reduced, for example, in the following manners:

The mobile electronic device is moved to a position with the coordinate values of the shift position of the charger (there exit certain errors) when the mobile electronic device receives the coordinate values of the shift position of the charger transmitted by the charger which has shifted, then the exact position of the charger can be determined through the locating tag on the charger. For example, if the locating tag adopts active RFID tag, the mobile electronic device is enabled to move in a direction in which RSSI of the RFID tag is gradually increasing, and then the location of the mobile electronic device is taken as the location of the RFID tag when the RSSI of the RFID tag sensed by the mobile electronic device is equal to or greater than a preset maximum RSSI value or the mobile electronic device collides with the RFID tag (the collision can be sensed by a collision sensor). For another example, if the locating tag adopts active RFID tag, the mobile electronic device is enabled to move in a direction in which strength of the tag information of the color block tag is gradually increasing, and then taking a current location of the mobile electronic device as the location of the color block tag until the strength of the tag information of the color block tag sensed by the mobile electronic device is equal to or greater than a preset maximum value or the mobile electronic device collides with the color block tag; or, if a camera is used to read the tag information of the color block tags, the location of the color block tag relative to the mobile electronic device is determined based on number of pixels obtained by projecting a pattern of the color block tag onto CCD, thereby calculating corrected coordinate values of the color block tag. The mobile device then updates the constructed map based on the corrected coordinate values of the shift position of the charger which has shifted. Furthermore, the mobile device sends (e.g., wirelessly) the corrected coordinate values of the shift position of the charger to the charger.

As can be seen, implementing the present embodiment can not only achieve the corresponding effect of the embodiment 17 but also obtain more accurate coordinate values of the charger on the basis of the embodiment 17, so that the updated map is made more accurate and the mobile device can accurately find the charger based on the map.

Referring to FIG. 20, it is a flowchart of a method for finding charger based on map constructing according to embodiment 20 of the present invention, wherein the method is applicable for real-time mapping of an area to be localized in which at least one locating tag is arranged, and a charger is located in the area to be localized, and the charger is provided with one locating tag as well, information of each said locating tag comprises unique coding information used for distinguishing an absolute position thereof; the mobile electronic device can be, for example, a robot.

The method for finding charger based on map constructing comprises:

step 201, taking a location of a first locating tag as a coordinate origin of a coordinate system when information of the first locating tag is obtained by a mobile electronic device which is moving along a certain trajectory for a first time, and recording the information of the first locating tag and coordinate values thereof;

step 202, moving the mobile electronic device with the coordinate origin as a starting point to traverse all over the area to be localized;

step 203, calculating coordinate values of location of other locating tag except the first locating tag each time when the mobile electronic device obtains information of the other locating tag based on a moving direction and a moving distance of the mobile electronic device relative to the starting point during the traversal, and recording the information of the other locating tag and the corresponding coordinate values;

step 204, determining whether a locating tag is on the charger based on the unique coding information of the locating tag when the mobile electronic device obtains the information of any locating tag, so as to obtain coordinate values of the charger, and sending the coordinate values of the charger to the charger;

step 205, constructing a map according to recorded information of the locating tag and coordinate values thereof;

step 206, enabling the mobile electronic device to traverse all over the area to be localized for multiple times with the coordinate origin as the starting point, and correcting the coordinate values of each said locating tag by using a correction algorithm based on the coordinate values of each said locating tag obtained from traversal for each time; correcting constructed map based on corrected coordinate values;

step 207, updating constructed map based on coordinate values of a shift position of the charger when the mobile electronic device receives the coordinate values of the shift position of the charger transmitted by the charger which has shifted.

It can be seen that on the basis of embodiment 17 the present embodiment further corrects the location of the locating tags through the correction algorithm according to the coordinate values of the locating tags obtained from traversal for multiple times, that is, step 206.

Specifically, due to cumulative errors of the encoder or for other reasons, the coordinate values of the locating tag obtained by the traversal for one time are inevitably erroneous, resulting in an inaccurate map. Therefore, after a map has been constructed, the coordinate values of each said locating tag are obtained for multiply times by the means that the mobile device traverses for multiply times, and then the coordinate values of each said locating tag are corrected by the recursive algorithm. The more times the mobile device traverses for, the more accurate the calculated coordinate values of the locating tag will be, until final errors will be reduced to negligible. Finally, the constructed map is corrected based on the corrected coordinate values.

Therefore, the present embodiment provides the technical scheme that the coordinate values of each said locating tag are obtained for multiply times from traversal for multiply times, and then the coordinate values of each said locating tag are corrected by a recursive algorithm and the constructed map is corrected based on the corrected coordinate values, which further eliminates the cumulative errors of the mobile electronic device, thereby improving the accuracy of the constructed map.

As can be understood that the step for correcting the coordinate values of each said locating tag by the means of traversal for multiply times can be added in the above-described embodiment 18 or embodiment 19, which is step 206.

Figure 21:
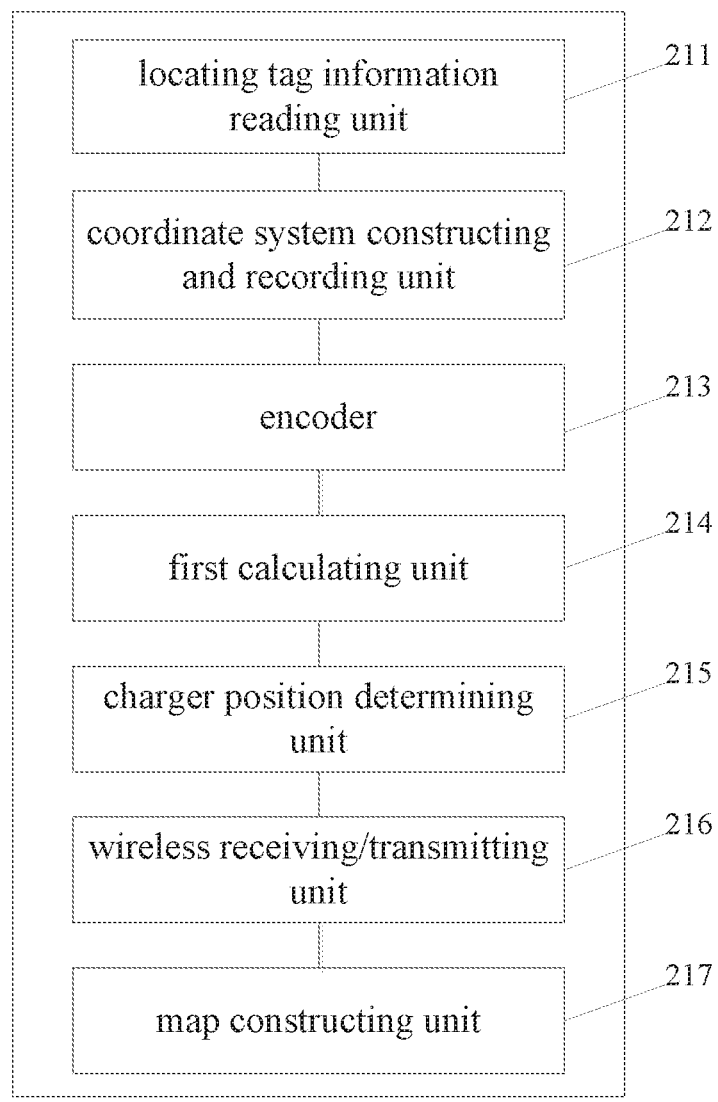
FIG. 21 is a composition block diagram of an apparatus for finding charger based on map constructing according to the embodiment 21 of the present invention.

Referring to FIG. 21, it is a composition block diagram of an apparatus for finding charger based on map constructing according to the embodiment 21 of the present invention. The apparatus for finding charger based on map constructing is a mobile electronic device or installed in a mobile electronic device, which is applicable for real-time mapping of an area to be localized in which at least one locating tag is arranged, and a charger is located in the area to be localized, and the charger is provided with one locating tag as well, information of each said locating tag comprises unique coding information used for distinguishing an absolute position thereof; the mobile electronic device can be, for example, a robot.

The apparatus for finding charger based on map constructing comprises:

a locating tag information reading unit 211, configured to read information of the locating tag;

a coordinate system constructing and recording unit 212, configured to take a location of a first locating tag as a coordinate origin of a coordinate system when information of the first locating tag is obtained by the locating tag information reading unit 211 of the mobile electronic device which is moving along a certain trajectory for a first time, and record the information of the first locating tag and coordinate values thereof;

an encoder 213, configured to record a moving distance and a moving direction of the mobile electronic device relative to a starting point in real time when the mobile electronic device traverses all over the area to be localized with the coordinate origin as the starting point;

a first calculating unit 214, configured to calculate coordinate values of location of other locating tag except the first locating tag each time when the mobile electronic device obtains information of the other locating tag based on a moving direction and a moving distance of the mobile electronic device relative to the starting point during the traversal, and send the information of the other locating tag and the corresponding coordinate values to the coordinate system constructing and recording unit 212;

a charger position determining unit 215, configured to determine whether a locating tag is on the charger or not according to the unique coding information of the locating tag every time when the mobile electronic device obtains information of the locating tag, so as to obtain coordinate values of the charger;

a wireless receiving/transmitting unit 216, configured to transmit the coordinate values of the charger to the charger; and a map constructing unit 217, configured to construct a map according to the information of the locating tag and coordinate values thereof recorded by the coordinate system constructing and recording unit 212;

the wireless receiving/transmitting unit 216 is further configured to receive coordinate values of a shift position of the charger transmitted by the charger which has shifted, and send the coordinate values of the shift position of the charger to the coordinate system constructing and recording unit 212 to update the coordinate values of the charger, so as to cause the map constructing unit 217 to update constructed map.

The operation principle and working process of the apparatus for finding charger based on map constructing according to present embodiment can be referred to embodiment 17, which will not be repeated thereto.

Similarly, each said locating tag may adopt an RFID tag or a color block tag, and the locating tag information reader corresponds to a RFID tag information reader or a color sensor/camera. How the mobile electronic device determine the specific position of the locating tag by reading the information of the locating tag can be referred to the above-described embodiment 17.

Preferably, the apparatus for find charger based on map constructing according to the present embodiment further comprises a charger coding information prestoring unit, which is connected to the charger position determining unit 215. For example, a charger is placed in an area to be localized an mapped, and a locating tag is set in the charger, then the unique coding information of the locating tag on the charger can be prestored in the charger coding information prestoring unit. In this way, before first traversal begins, the mobile electronic device is enabled to move along a certain trajectory until the locating tag information reading unit 211 read information of the first locating tag, and then whether the unique coding information of the locating tag is consistent with the prestored information in the charger coding information prestoring unit is judged by the charger position determining unit 215. If so, the coordinate values of the locating tag are taken as the coordinate values of the charger, which will be further taken as the coordinate origin of a coordinate system composed of X-axis and Y-axis, and the information of the first locating tag and coordinate values thereof (coordinate origin) would be recorded; If not, if the coordinate origin is determined, each time when the mobile electronic device obtains information of the locating tag during the traversal, whether the unique coding information of the locating tag is consistent with the prestored information in the charger coding information prestoring unit is judged by the charger position determining unit 215, for purpose of determining whether the locating tag is on the charger and thereby obtaining the coordinate values of the charger. As can be understood, if the position of the charger is determined, it is not necessary to determine whether a locating tag is on the charger when the locating tag is detected by the locating tag information reading unit 211 in following working process. By implementing the method of finding the charger based on map constructing according to the present embodiment, the mobile electronic device can accurately find the charger to get charged when the charger has shifted. Moreover, when the charger has shifted, it only needs to update the position of the charger on the constructed map without reconstructing the map, which has the advantage of low cost, simple operation and effective technical results.

In addition, according to a preferable embodiment of the present invention, the mobile electronic device is moved to a position with the coordinate values of the shift position of the charger when the wireless receiving/transmitting unit 216 receives the coordinate values of the shift position of the charger transmitted by the charger which has shifted; and then the position of the locating tag can be discovered/determined through the locating tag on the charger. That is, coordinate values of the locating tag on the charger is taken as corrected coordinate values of the shift position of the charger when the locating tag information reading unit 211 obtains the information of the locating tag on the charger; then the constructed map is updated based on the corrected coordinate values of the shift position of the charger. Consequently the updated map is more accurate, and the mobile electronic device can accurately find the charger.

Figure 22:
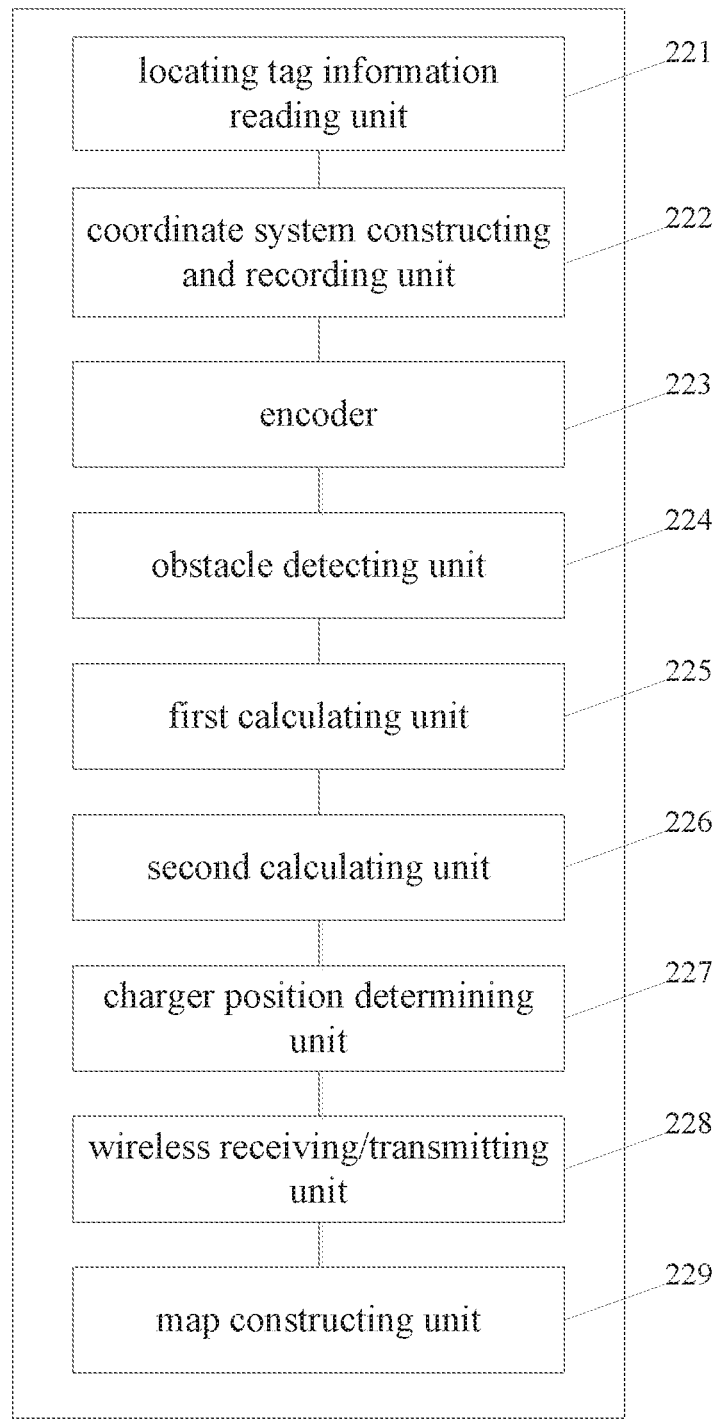
FIG. 22 is a composition block diagram of an apparatus for finding charger based on map constructing according to the embodiment 22 of the present invention.

Referring to FIG. 22, it is a composition block diagram of an apparatus for finding charger based on map constructing according to the embodiment 22 of the present invention. The apparatus for finding charger based on map constructing is a mobile electronic device or installed in a mobile electronic device, which is applicable for real-time mapping of an area to be localized in which at least one locating tag is arranged, and a charger is located in the area to be localized, and the charger is provided with one locating tag as well, information of each said locating tag comprises unique coding information used for distinguishing an absolute position thereof; the mobile electronic device can be, for example, a robot.

The apparatus for finding charger based on map constructing comprises:

a locating tag information reading unit 221, configured to read information of the locating tag;

a coordinate system constructing and recording unit 222, configured to take a location of a first locating tag as a coordinate origin of a coordinate system when information of the first locating tag is obtained by the locating tag information reading unit 221 of the mobile electronic device which is moving along a certain trajectory for a first time, and record the information of the first locating tag and coordinate values thereof;

an encoder 223, configured to record a moving distance and a moving direction of the mobile electronic device relative to a starting point in real time when the mobile electronic device traverses all over the area to be localized with the coordinate origin as the starting point;

an obstacle detecting unit 224, configured to detect obstacle;

a first calculating unit 225, configured to calculate coordinate values of location of other locating tag except the first locating tag each time when the mobile electronic device obtains information of the other locating tag based on a moving direction and a moving distance of the mobile electronic device relative to the starting point during the traversal, and send the information of the other locating tag and the corresponding coordinate values to the coordinate system constructing and recording unit 222;

a second calculating unit 226, configured to calculate coordinate values of an obstacle based on a moving direction and a moving distance of the mobile electronic device relative to the starting point recorded by the encoder 223 when the obstacle detecting unit 224 detects the obstacle each time during the traversal, and send the calculated coordinate values to a coordinate system constructing and recording unit 222.

a charger position determining unit 227, configured to determine whether a locating tag is on the charger or not according to the unique coding information of the locating tag every time when the mobile electronic device obtains information of the locating tag, so as to obtain coordinate values of the charger;

a wireless receiving/transmitting unit 228, configured to transmit the coordinate values of the charger to the charger; and a map constructing unit 229, configured to construct a map according to the information of the locating tag and coordinate values thereof, and the coordinate values of the coordinate origin and each said obstacle recorded by the coordinate system constructing and recording unit 222;

the wireless receiving/transmitting unit 228 is further configured to receive coordinate values of a shift position of the charger transmitted by the charger which has shifted, and send the coordinate values of the shift position of the charger to the coordinate system constructing and recording unit 222 to update the coordinate values of the charger, so as to cause the map constructing unit 229 to update constructed map.

Wherein the obstacle detecting unit 224 comprises a collision sensor, a laser sensor or an infrared sensor;

The obstacle is sensed by using a collision sensor, and the current coordinate values of the mobile electronic device is taken as the coordinate values of the location of the obstacle when the collision sensor senses a collision with the obstacle;

The collision sensor components include, but are not limited to, eccentric hammer sensors, ball-type crash sensors, roller-type expansion sensors, mercury-switched crash sensors, piezoresistive effect type crash sensors, piezoelectric effect type impact sensors, and microswitches and the like.

The obstacle is detected by using a laser sensor/infrared sensor, and the location of the obstacle relative to the current location of the mobile electronic device is calculated on the basis of a calculation principle of laser/infrared distance when the laser sensor/infrared sensor detects the obstacle, thus the coordinate values of the location of the obstacle is calculated.

According to the present embodiment, preferably, the mobile device further comprises a collision strategy unit, which is configured to enable the mobile electronic device to continue to advance to avoid the obstacle when the mobile electronic device has collided with an obstacle during the traversal according to a preset collision strategy.

The operation principle and working process of the collision strategy unit can be referred to embodiment 17.

Figure 23:
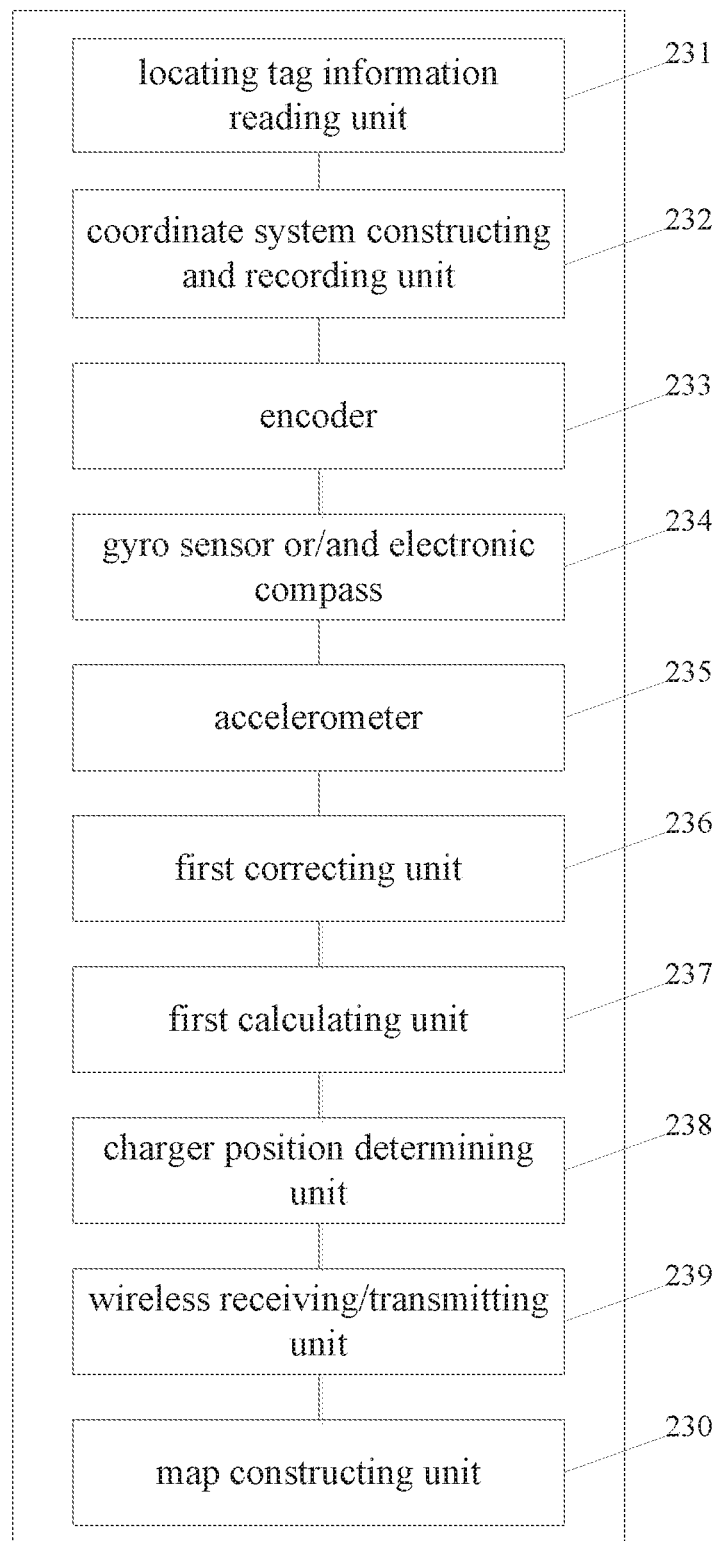
FIG. 23 is a composition block diagram of an apparatus for finding charger based on map constructing according to the embodiment 23 of the present invention.

Referring to FIG. 23, it is a composition block diagram of an apparatus for finding charger based on map constructing according to the embodiment 23 of the present invention. The apparatus for finding charger based on map constructing is a mobile electronic device or installed in a mobile electronic device, which is applicable for real-time mapping of an area to be localized in which at least one locating tag is arranged, and a charger is located in the area to be localized, and the charger is provided with one locating tag as well, information of each said locating tag comprises unique coding information used for distinguishing an absolute position thereof; the mobile electronic device can be, for example, a robot.

The apparatus for finding charger based on map constructing comprises:

a locating tag information reading unit 231, configured to read information of the locating tag;

a coordinate system constructing and recording unit 232, configured to take a location of a first locating tag as a coordinate origin of a coordinate system when information of the first locating tag is obtained by the locating tag information reading unit 231 of the mobile electronic device which is moving along a certain trajectory for a first time, and record the information of the first locating tag and coordinate values thereof;

an encoder 233, configured to record a moving distance and a moving direction of the mobile electronic device relative to a starting point in real time when the mobile electronic device traverses all over the area to be localized with the coordinate origin as the starting point;

a gyro sensor or/and an electronic compass 234, configured to record an angular velocity or/and an angle of the mobile electronic device in real time;

an accelerometer 235, configured to record an acceleration of the mobile electronic device in real time;

a first correcting unit 236, configured to correct each said moving direction and each said moving distance of the mobile electronic device relative to the starting point based on the angular velocity or/and the angle and the acceleration of the mobile electronic device;

a first calculating unit 237, configured to calculate coordinate values of location of other locating tag except the first locating tag each time when the mobile electronic device obtains information of the other locating tag based on a moving direction and a moving distance of the mobile electronic device relative to the starting point during the traversal, and send the information of the other locating tag and the corresponding coordinate values to the coordinate system constructing and recording unit 232;

a charger position determining unit 238, configured to determine whether a locating tag is on the charger or not according to the unique coding information of the locating tag every time when the mobile electronic device obtains information of the locating tag, so as to obtain coordinate values of the charger;

a wireless receiving/transmitting unit 239, configured to transmit the coordinate values of the charger to the charger; and a map constructing unit 230, configured to construct a map according to the information of the locating tag and coordinate values thereof, and coordinate values of the coordinate origin recorded by the coordinate system constructing and recording unit 232;

the wireless receiving/transmitting unit 239 is further configured to receive coordinate values of a shift position of the charger transmitted by the charger which has shifted, and send the coordinate values of the shift position of the charger to the coordinate system constructing and recording unit 232 to update the coordinate values of the charger, so as to cause the map constructing unit 230 to update constructed map.

It can be seen that on the basis of embodiment 21, the present embodiment adds the gyro sensor or/and the electronic compass 234 and the accelerometer 235, which are configured to record the angular velocity or/and the angle and the acceleration of the mobile electronic device in real time respectively so as to correct each said moving direction and each said moving distance of the mobile electronic device relative to the starting point, and calculate the coordinate values based on the corrected moving direction and the moving distance, thereby correcting each obtained coordinate values. Wherein, the gyro include, but are not limited to, wire gyro, electrostatic gyro, laser gyro, fiber optic gyro, micromechanical gyro or the like.

Therefore, the present embodiment can eliminate exiting cumulative errors from calculation process of the encoder 233s installed on the driving wheels, which is resulted from wheel slippage, uncertain distance of contact points between two driving wheels and ground or the like. So coordinate values calculated based on the corrected moving direction and moving distance of the mobile electronic device relative to the starting point and is made more accurate, so that the map constructed on the basis of the coordinate values is made more accurate.

As can be understood, the gyro sensor or/and the electronic compass 234 and the accelerometer 235 can be added in the present embodiment on the basis of embodiment 22, which are configured to record the angular velocity or/and the angle and the acceleration of the mobile electronic device in real time respectively so as to correct each said moving direction and each said moving distance of the mobile electronic device relative to the starting point.

Figure 24:
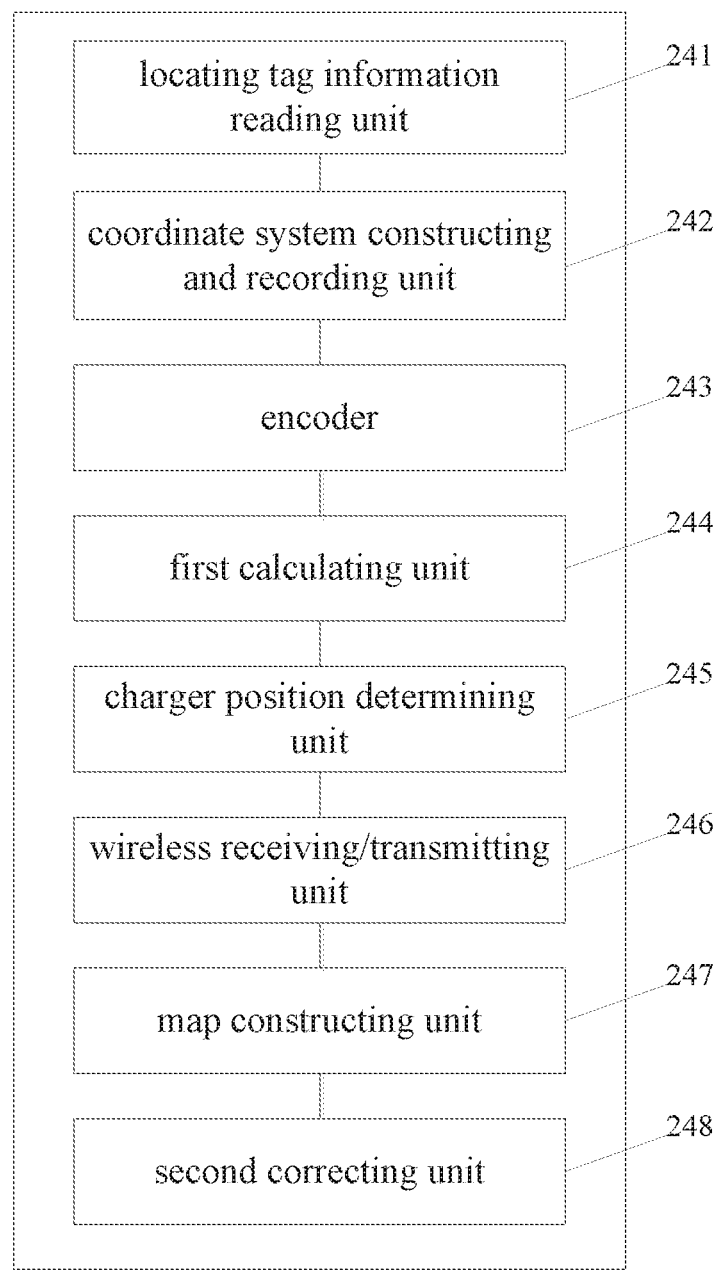
FIG. 24 is a composition block diagram of an apparatus for finding charger based on map constructing according to the embodiment 24 of the present invention.

Referring to FIG. 24, it is a composition block diagram of an apparatus for finding charger based on map constructing according to the embodiment 24 of the present invention. The apparatus for finding charger based on map constructing is a mobile electronic device or installed in a mobile electronic device, which is applicable for real-time mapping of an area to be localized in which at least one locating tag is arranged, and a charger is located in the area to be localized, and the charger is provided with one locating tag as well, information of each said locating tag comprises unique coding information used for distinguishing an absolute position thereof; the mobile electronic device can be, for example, a robot.

The apparatus for finding charger based on map constructing comprises:

a locating tag information reading unit 241, configured to read the information of the locating tag;

a coordinate system constructing and recording unit 242, configured to take a location of a first locating tag as a coordinate origin of a coordinate system when information of the first locating tag is obtained by the locating tag information reading unit 241 of the mobile electronic device which is moving along a certain trajectory for a first time, and record the information of the first locating tag and coordinate values thereof;

an encoder 243, configured to record a moving distance and a moving direction of the mobile electronic device relative to a starting point in real time when the mobile electronic device traverses all over the area to be localized with the coordinate origin as the starting point;

a first calculating unit 244, configured to calculate coordinate values of location of other locating tag except the first locating tag each time when the mobile electronic device obtains information of the other locating tag based on a moving direction and a moving distance of the mobile electronic device relative to the starting point during the traversal, and send the information of the other locating tag and the corresponding coordinate values to the coordinate system constructing and recording unit 242;

a charger position determining unit 245, configured to determine whether a locating tag is on the charger or not according to the unique coding information of the locating tag every time when the mobile electronic device obtains information of the locating tag, so as to obtain coordinate values of the charger;

a wireless receiving/transmitting unit 246, configured to transmit the coordinate values of the charger to the charger; and a map constructing unit 247, configured to construct a map according to the information of the locating tag and coordinate values thereof, and coordinate values of the coordinate origin recorded by the coordinate system constructing and recording unit 242;

a second correcting unit 248, configured to enable the mobile electronic device to traverse all over the area to be localized for multiple times with the coordinate origin as the starting point, and correcting the coordinate values of each said locating tag by using a correction algorithm based on the coordinate values of each said locating tag obtained from traversal for each time; and send corrected coordinate values to the map constructing unit 247 to correct constructed map to correct constructed map;

the wireless receiving/transmitting unit 246 is further configured to receive coordinate values of a shift position of the charger transmitted by the charger which has shifted, and send the coordinate values of the shift position of the charger to the coordinate system constructing and recording unit 242 to update the coordinate values of the charger, so as to cause the map constructing unit 247 to update constructed map.

The present embodiment adds the second correcting unit 248 on basis of the embodiment 21, according to which the coordinate values of each locating tag are obtained for multiply times in the way that the mobile device traverses for multiply times, and then the coordinate values of each locating tag are corrected by the recursive algorithm. The more times the mobile device traverses for, the more accurate the calculated coordinate values of the locating tag will be, until final errors will be reduced to negligible. Finally, the constructed map is corrected based on the corrected coordinate values by the map constructing unit 247. Thereby exiting cumulative errors from the mobile device traversing for one time are eliminated, and accuracy of the constructed map is improved.

As can be understood, the second correcting unit 248 of the present embodiment can be added in the embodiments 22~23, so as to correct the coordinate values of each said locating tag and consequently improve accuracy of the constructed map.

Figure 25:
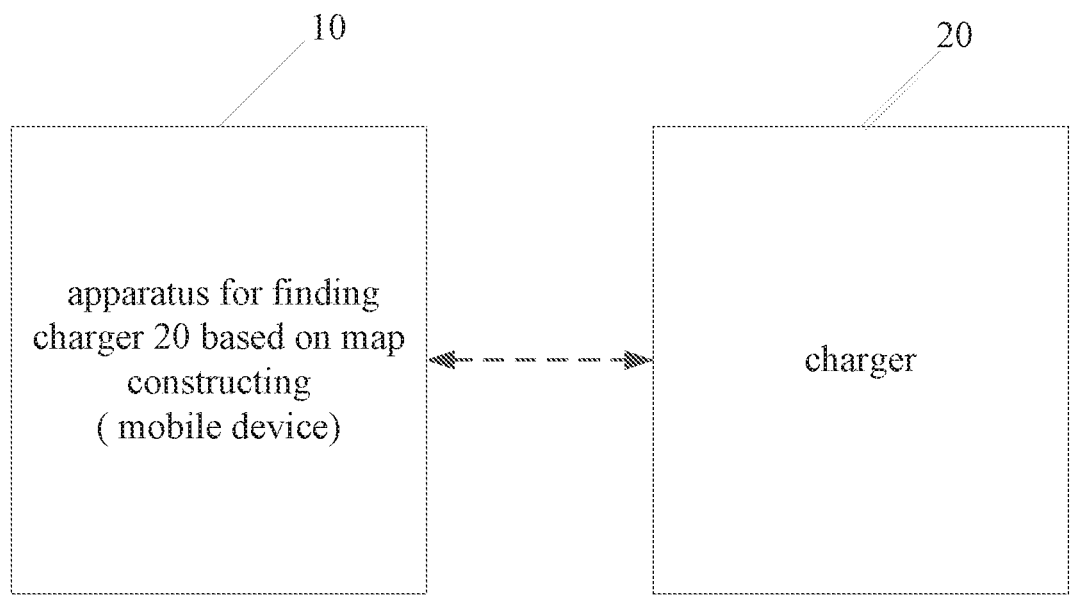
FIG. 25 is a composition block diagram of a system for finding charger based on map constructing according to the embodiment 25 of the present invention.
Figure 26:
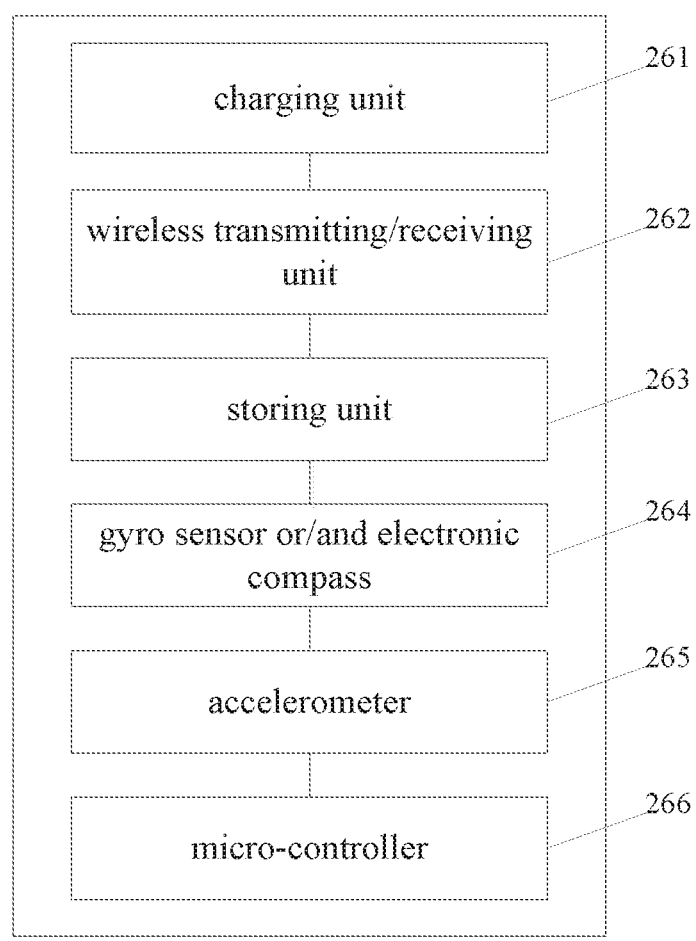
FIG. 26 is a composition block diagram of a charger according to the embodiment 26 of the present invention.

Referring to FIG. 25, it is a composition block diagram of a system for finding charger 20 based on map constructing according to the embodiment 25 of the present invention. The system comprises charger 20 and any one of the apparatuses for finding charger 20 based on map constructing (the mobile electronic device) as shown in FIG. 5~FIG. 8, FIG. 13~FIG. 16 and FIG. 21~FIG. 24. Wherein, the charger 20 is set in the area to be localized. As shown 26, the charger 20 comprises:

a charging unit 261, configured to charge battery of the mobile electronic device;

a wireless transmitting/receiving unit 262, configured to receive the coordinate values of the charger 20;

a storing unit 263, configured to store the coordinate values of the charger 20;

a gyro sensor or/and an electronic compass 264, configured to record an angular velocity or/and an angle of the charger 20 in real time when the charger 20 start to shift;

an accelerometer 265, configured to record an acceleration of the charger 20 in real time when the charger 20 start to shift;

a micro-controller 266, configured to calculate a direction and a distance of a shift position of the charger 20 relative to a position from which the charger 20 has shifted based on the angular velocity or/and the angle and the acceleration of the charger 20 recorded by the gyro sensor or/and the electronic compass 264 and the accelerometer 265; and calculate the coordinate values of the shift position of the charger 20 according to coordinate values of the position from which the charger has shifted and which is stored in the storing unit 263, and the direction and the distance of the shift position of the charger 20 relative to the position from which the charger 20 has shifted.

the wireless transmitting/receiving unit 262 is further configured to transmit the coordinate values of the shift position of the charger 20 to the mobile electronic device.

According to the present embodiment, when constructing a map for an area to be localized and thus determining the coordinate values of the charger 20, the mobile electronic device sends coordinate values of the charger 20 to the charger 20 by wireless means. The charger 20 receives the coordinate values through the wireless transmitting/receiving unit 262 and store the coordinate values in the storing unit 263. When the charger 20 has shifted, a direction and a distance of a shift position of the charger 20 relative to a position from which the charger 20 has shifted are calculated based on an angular velocity or/and an angle and an acceleration of the charger 20 recorded by the gyro sensor or/and the electronic compass 264 and the accelerometer 265, and the coordinate values of the shift position of the charger 20 is calculated according to coordinate values of the position stored in the storing unit 263 from which the charger has shifted, and the direction and the distance of the shift position of the charger 20 relative to the position from which the charger 20 has shifted, which then is sent to the mobile electronic device. In this way, the mobile electronic device can update the constructed map based on coordinate values of a shift position of the charger 20.

Preferably, the charger 20 is provided with locating tag, The mobile electronic device is moved to a position with the coordinate values of the shift position of the charger 20 (there exit certain errors) when the mobile electronic device receives the coordinate values of the shift position of the charger 20 transmitted by the charger 20 which has shifted, then the exact position of the charger 20 can be determined through the locating tag on the charger 20. That is, coordinate values of the locating tag on the charger 20 is taken as corrected coordinate values of the shift position of the charger 20 when the locating tag information reading unit obtains the information of the locating tag on the charger 20; then the constructed map is updated based on the corrected coordinate values of the shift position of the charger 20. Consequently the updated map is more accurate, and the mobile electronic device can accurately find the charger 20.

Preferably, the charger 20 according to the present embodiment further comprises a vibration sensor, which is configured to sense whether the charger 20 has shifted. if the charger 20 shifts, the micro-controller 266 would activates the gyro sensor or/and the electronic compass 264 and the accelerometer 265 in standby mode when detecting signal change from the vibration sensor. Consequently, in other cases, power can be saved by controlling the gyro sensor or/and the electronic compass 264 and the accelerometer 265 in standby mode by the micro-controller 266.

It should be explained that according to the present description, the term "comprise", "include" or any other variant thereof which is intended to encompass the non-exclusive, so that the process, method, objects or apparatus comprising a series of elements includes not only those elements, but also includes other elements which are not explicitly listed, or further includes the elements that are inherent in such processes, methods, objects or devices. In the absence of more restrictions, the elements defined by the statements "comprise . . . " do not preclude the presence of additional identical elements in the process, methods, objects or devices that includes the listed elements.

Finally, it should be noted as well that the above-mentioned series of processing includes not only the processing performed according to time sequence in the order described herein, but also the processing performed in parallel or separately, rather than in chronological order. With the description of the above embodiments, it will be apparent to persons having ordinary skill in the art that the present invention may be implemented by means of software and necessary hardware platforms, and may be implemented only by software for sure. Based on this understanding, all or parts of the technical solution of the present invention that contributes to the background art may be embodied in the form of software product, which can be stored in a storage medium such as ROM/RAM, magnetic disk, optical disk and so on, which is including a number of instructions for enabling a computer device (which may be a personal computer, a server, or a network device and so on) to perform the methods described in certain parts of the embodiments or each embodiment of the present invention.

The foregoing descriptions are merely exemplary embodiments of the present invention, but are not intended to limit the present disclosure. Any modifications, equivalent substitutions, and improvements made by those skilled in the art within the spirit and principle of the present disclosure shall fall within the protection scope of the present disclosure.

What is claimed is:

1. A method for finding charger based on map constructing, wherein the method is applicable for real-time mapping of an area to be localized in which a charger is arranged, and the method comprises steps of:
    taking a position of the charger as a coordinate origin of a coordinate system, moving the mobile electronic device with the coordinate origin as a starting point to traverse all over the area to be localized, calculating and recording coordinate values of a location of an obstacle based on a moving direction and a moving distance of the mobile electronic device relative to the starting point when the mobile electronic device detects the obstacle each time during the traversing process;
    constructing a map according to recorded coordinate values of the coordinate origin and the location of each said obstacle when the traversal has been finished; and
    updating constructed map based on coordinate values of a shift position of the charger when the mobile electronic device receives the coordinate values of the shift position of the charger transmitted by the charger which has shifted;
    wherein at least two locating tags are arranged in the area to be localized, each said locating tag is correspondingly arranged at a specific position of the area to be localized, and the information of each said locating tag comprises unique coding information used for distinguishing an absolute position thereof, the method further comprises step of:
    calculating coordinate values of a location of a locating tag each time when the mobile electronic device obtains information of the locating tag based on a moving direction and a moving distance of the mobile electronic device relative to the starting point during the traversing process, and recording the information of the locating tag and the corresponding coordinate values;
    constructing a map according to recorded information of the locating tag and coordinate values thereof, and the coordinate values of the location of each said obstacle;
    enabling the mobile electronic device to traverse all over the area to be localized for multiple times with the coordinate origin as the starting point, and correcting the coordinate values of each said locating tag by using a correction algorithm based on the coordinate values of each said locating tag obtained from traversal for each time; and
    correcting constructed map based on corrected coordinate values.

2. The method for finding charger based on map constructing according to claim 1, wherein when the charger has shifted, the coordinate values of the shift position of the charger are calculated through the following steps:
    calculating a direction and a distance of a shift position of the charger relative to a position from which the charger has shifted based on an angular velocity or/and an angle and an acceleration of the charger; and calculating the coordinate values of the shift position of the charger according to coordinate values of the position from which the charger has shifted, and the direction and the distance of the shift position of the charger relative to the position from which the charger has shifted.

3. The method for finding charger based on map constructing according to claim 2, wherein the updating constructed map based on coordinate values of a shift position of the charger when the mobile electronic device receives the coordinate values of the shift position of the charger transmitted by the charger which has shifted constructed map specifically comprises steps of:

moving the mobile electronic device to a position with the coordinate values of the shift position of the charger when the mobile electronic device receives the coordinate values of the shift position of the charger transmitted by the charger which has shifted; taking coordinate values of a position of the charger where the charger is detected by the mobile electronic device as corrected coordinate values of the shift position of the charger; and updating constructed map based on the corrected coordinate values of the shift position of the charger.

4. The method for finding charger based on map constructing according to claim 1, wherein the coordinate values of a location of an obstacle are calculated based on a moving direction and a moving distance of the mobile electronic device relative to the starting point when the mobile electronic device detects the obstacle each time in the following manners:

sensing the obstacle by using a collision sensor, and taking coordinate values of the mobile electronic device as the coordinate values of the location of the obstacle when the collision sensor senses a collision with the obstacle; or detecting the obstacle by using a laser sensor/an infrared sensor, and obtaining the location of the obstacle relative to a current location of the mobile electronic device according to a calculation principle of laser/infrared distance when the laser sensor/the infrared sensor detects the obstacle, thus calculating the coordinate values of the location of the obstacle.

5. The method for finding charger based on map constructing according to claim 1, wherein each said locating tag is RFID tag, and a unique number of each said RFID tag which is originally arranged in the RFID tag or is written into the RFID tag by an RFID reader-writer is taken as the unique coding information of the locating tag;

when passive RFID tag is employed as the locating tag, and it is limited that only when the mobile electronic device is closest to one of the locating tags can the mobile electronic device obtain the information of the locating tag, and taking a location of the mobile electronic device where the mobile electronic device obtains the information of the locating tag as the location of the locating tag; or when active RFID tag is employed as the locating tag, when the mobile electronic device has sensed the information of any one of the locating tags, the mobile electronic device is enabled to move in a direction in which RSSI of the locating tag is gradually increasing until RSSI of the locating tag sensed by the mobile electronic device is equal to or greater than a preset maximum RSSI value or the mobile electronic device collides with the locating tag, and then taking a location of the mobile electronic device as the location of the locating tag.

6. The method for finding charger based on map constructing according to claim 1, wherein each said locating tag is color block tag, the unique coding information is represented by a plurality of different colors, different shapes, combinations of different shapes and different colors or color blocks with different gray scales;

when the mobile electronic device has sensed tag information of any one of the color block tags by using a color sensor, enabling the mobile electronic device to move in a direction in which strength of tag information of the color block tag is gradually increasing until the strength of the tag information of the color block tag sensed by the mobile electronic device is equal to or greater than a preset maximum value or the mobile electronic device collides with the color block tag, and then taking a current location of the mobile electronic device as the location of the color block tag;

when the mobile electronic device has sensed tag information of any one of the color block tags by using a camera, the location of the color block tag relative to the mobile electronic device is determined based on number of pixels obtained by projecting a pattern of the color block tag onto CCD, thereby calculating the coordinate values of the color block tag; or when the mobile electronic device read tag information of the color block tags by using a camera, enabling the mobile electronic device to move in a direction in which a pixel value obtained by projecting a pattern of a color block tag onto CCD is gradually increasing until the pixel value obtained by projecting the pattern of the color block tag onto the CCD reach a certain threshold or the mobile electronic device collides with the color block tag, and then taking a current location of the mobile electronic device as the location of the color block tag.

7. The method for finding charger based on map constructing according to claim 1, wherein the method further comprises step of:

correcting each said moving direction and each said moving distance of the mobile electronic device relative to the starting point based on an angular velocity or/and an angle and an acceleration of the mobile electronic device, and coordinate values are obtained according to corrected moving direction and corrected moving distance of the mobile electronic device relative to the starting point.

8. A method for finding charger based on map constructing, wherein the method is applicable for real-time mapping of an area to be localized in which a charger is arranged, and the method comprises steps of:

taking any initial position as a coordinate origin of a coordinate system, moving the mobile electronic device with the coordinate origin as a starting point to traverse all over the area to be localized, calculating and recording coordinate values of the charger or an obstacle based on a moving direction and a moving distance of the mobile electronic device relative to the starting point when the mobile electronic device detects the charger or the obstacle each time during the traversing process;

constructing a map according to recorded coordinate values of the coordinate origin, the charger and the obstacle when the traversal has been finished; and updating constructed map based on coordinate values of a shift position of the charger when the mobile electronic device receives the coordinate values of the shift position of the charger transmitted by the charger which has shifted;

wherein at least two locating tags are arranged in the area to be localized, each said locating tag is correspondingly arranged at a specific position of the area to be localized, and information of each said locating tag comprises unique coding information used for distinguishing an absolute position thereof, the method further comprises step of:

calculating coordinate values of a location of a locating tag each time when the mobile electronic device obtains information of the locating tag based on a moving direction and a moving distance of the mobile electronic device relative to the starting point during the traversing process, and recording the information of the locating tag and the corresponding coordinate values;

constructing a map according to recorded information of the locating tag and coordinate values thereof, and the coordinate values of the location of each said obstacle;

enabling the mobile electronic device to traverse all over the area to be localized for multiple times with the coordinate origin as the starting point, and correcting the coordinate values of each said locating tag by using a correction algorithm based on the coordinate values of each said locating tag obtained from traversal for each time; and correcting constructed map based on corrected coordinate values.

9. The method for finding charger based on map constructing according to claim 8, wherein when the charger has shifted, coordinate values of a shift position of the charger are calculated through the following steps:

calculating a direction and a distance of a shift position of the charger based on an angular velocity or/and an angle and an acceleration of the charger relative to a position from which the charger has shifted; and calculating the coordinate values of the shift position of the charger according to coordinate values of the position from which the charger has shifted, and the direction and the distance of the shift position of the charger relative to the position from which the charger has shifted.

10. The method for finding charger based on map constructing according to claim 9, wherein the step of updating constructed map based on coordinate values of a shift position of the charger when the mobile electronic device receives the coordinate values of the shift position of the charger transmitted by the charger which has shifted specifically comprises steps of:

moving the mobile electronic device to a position with the coordinate values of the shift position of the charger when the mobile electronic device receives the coordinate values of the shift position of the charger transmitted by the charger which has shifted;

taking coordinate values of a position of the charger where the charger is detected by the mobile electronic device as corrected coordinate values of the shift position of the charger; and updating constructed map based on corrected coordinate values of the shift position of the charger.

11. The method for finding charger based on map constructing according to claim 8, wherein coordinate values of the position of the charger where the charger is detected by the mobile electronic device is calculated in the following manners:

the mobile electronic device is moved to a position with the coordinate values of the shift position of the charger when the mobile electronic device receives the coordinate values of the shift position of the charger transmitted by the charger which has shifted; coordinate values of a position of the charger where the charger is detected by a laser transmitting/receiving sensor are taken as corrected coordinate values of the shift position of the charger; constructed map is updated based on corrected coordinate values of the shift position of the charger; or the mobile electronic device is moved to a position with the coordinate values of the shift position of the charger when the mobile electronic device receives the coordinate values of the shift position of the charger transmitted by the charger which has shifted; the mobile electronic device is guided by an infrared transmitting/receiving sensor or/and a camera to a exact position of the charger which is taken as corrected coordinate values of the shift position of the charger; updating constructed map based on corrected coordinate values of the shift position of the charger.

12. The method for finding charger based on map constructing according to claim 8, wherein the coordinate values of the location of the obstacle are calculated when the mobile electronic device detects the obstacle each time in the following manners:

sensing the obstacle by using a collision sensor, and taking coordinate values of the mobile electronic device as the coordinate values of the location of the obstacle when the collision sensor senses a collision with the obstacle; or detecting the obstacle by using a laser sensor/an infrared sensor, and obtaining the location of the obstacle relative to a current location of the mobile electronic device according to a calculation principle of laser/infrared distance when the laser sensor/the infrared sensor detects the obstacle, thus calculating the coordinate values of the location of the obstacle.

13. The method for finding charger based on map constructing according to claim 8, wherein each said locating tag is RFID tag, and an unique number of each said RFID tag which is originally arranged in the RFID tag or is written into the RFID tag by an RFID reader-writer is taken as the unique coding information of the locating tag;

when passive RFID tag is employed as the locating tag, and it is limited that only when the mobile electronic device is closest to one of the locating tags can the mobile electronic device obtain the information of the locating tag, and taking a location of the mobile electronic device where the mobile electronic device obtains the information of the locating tag as the location of the locating tag; or when active RFID tag is employed as the locating tag, when the mobile electronic device has sensed the information of any one of the locating tags, the mobile electronic device is enabled to move in a direction in which RSSI of the locating tag is gradually increasing until RSSI of the locating tag sensed by the mobile electronic device is equal to or greater than a preset maximum RSSI value or the mobile electronic device collides with the locating tag, and then taking a location of the mobile electronic device as the location of the locating tag.

14. The method for finding charger based on map constructing according to claim 8, wherein each said locating tag is color block tag, the unique coding information is represented by a plurality of different colors, different shapes, combinations of different shapes and different colors or color blocks with different gray scales;
- when the mobile electronic device has sensed tag information of any one of the color block tags by using a color sensor, enabling the mobile electronic device to move in a direction in which strength of tag information of the color block tag is gradually increasing until the strength of the tag information of the color block tag sensed by the mobile electronic device is equal to or greater than a preset maximum value or the mobile electronic device collides with the color block tag, and then taking a current location of the mobile electronic device as the location of the color block tag;
- when the mobile electronic device has sensed tag information of any one of the color block tags by using a camera, the location of the color block tag relative to the mobile electronic device is determined based on number of pixels obtained by projecting a pattern of the color block tag onto CCD, thereby calculating the coordinate values of the color block tag; or
- when the mobile electronic device read tag information of the color block tags by using a camera, enabling the mobile electronic device to move in a direction in which a pixel value obtained by projecting a pattern of a color block tag onto CCD is gradually increasing until the pixel value obtained by projecting the pattern of the color block tag onto the CCD reach a certain threshold or the mobile electronic device collides with the color block tag, and then taking a current location of the mobile electronic device as the location of the color block tag.

15. The method for finding charger based on map constructing according to claim 8, wherein the method further comprises step of:
- correcting each said moving direction and each said moving distance of the mobile electronic device relative to the starting point based on an angular velocity or/and an angle and an acceleration of the mobile electronic device, and coordinate values are obtained according to corrected moving direction and corrected moving distance of the mobile electronic device relative to the starting point.

16. A method for finding charger based on map constructing, wherein the method is applicable for real-time mapping of an area to be localized in which at least one locating tag is arranged, a charger is located in the area to be localized, and the charger is provided with one locating tag as well, information of each said locating tag comprises unique coding information used for distinguishing an absolute position thereof, and the method comprises steps of:
- taking a location of a first locating tag as a coordinate origin of a coordinate system when information of the first locating tag is obtained by a mobile electronic device which is moving along a certain trajectory for a first time, and recording the information of the first locating tag and coordinate values thereof;
- moving the mobile electronic device with the coordinate origin as a starting point to traverse all over the area to be localized; calculating coordinate values of location of other locating tag except the first locating tag each time when the mobile electronic device obtains information of the other locating tag based on a moving direction and a moving distance of the mobile electronic device relative to the starting point during the traversing process, and recording the information of the other locating tag and the corresponding coordinate values;
- determining whether a locating tag is on the charger based on the unique coding information of the locating tag when the mobile electronic device obtains the information of any locating tag, so as to obtain coordinate values of the charger, and sending the coordinate values of the charger to the charger;
- constructing a map according to recorded information of the locating tag and coordinate values thereof; and
- updating constructed map based on coordinate values of a shift position of the charger when the mobile electronic device receives the coordinate values of the shift position of the charger transmitted by the charger which has shifted;
- wherein each said locating tag is RFID tag, and an unique number of each said RFID tag which is originally arranged in the RFID tag or is written into the RFID tag by an RFID reader-writer is taken as the unique coding information of the locating tag;
- when passive RFID tag is employed as the locating tag, and it is limited that only when the mobile electronic device is closest to one of the locating tags can the mobile electronic device obtain the information of the locating tag, and taking a location of the mobile electronic device where the mobile electronic device obtains the information of the locating tag as the location of the locating tag; or
- when active RFID tag is employed as the locating tag, when the mobile electronic device has sensed the information of any one of the locating tags, the mobile electronic device is enabled to move in a direction in which RSSI of the locating tag is gradually increasing until RSSI of the locating tag sensed by the mobile electronic device is equal to or greater than a preset maximum RSSI value or the mobile electronic device collides with the locating tag, and then taking a location of the mobile electronic device as the location of the locating tag.

17. The method for finding charger based on map constructing according to claim 16, wherein the method further comprises step of:
- calculating and recording coordinate values of an obstacle based on a moving direction and a moving distance of the mobile electronic device relative to the starting point when the mobile electronic device detects the obstacle each time during the traversing process; and
- constructing a map according to recorded information of the locating tag and coordinate values thereof, and the coordinate values of each said obstacle when the traversal has been finished.

18. The method for finding charger based on map constructing according to claim 16, wherein the method further comprises step of:
- prestoring the unique coding information of the locating tag on the charger in the mobile electronic device; and
- determining whether a locating tag is on the charger or not by judging the unique coding information of the locating tag every time when the mobile electronic device obtains the information of the locating tag, and if so, taking the coordinate values of the locating tag as the coordinate values of the charger.

19. The method for finding charger based on map constructing according to claim 16, wherein after constructing the map, the method further comprises steps of:

enabling the mobile electronic device to traverse all over the area to be localized for multiple times with the coordinate origin as the starting point, and correcting the coordinate values of each said locating tag by using a correction algorithm based on the coordinate values of each said locating tag obtained from traversal for each time; and correcting constructed map based on corrected coordinate values.

20. The method for finding charger based on map constructing according to claim 16, wherein when the charger has shifted, the coordinate values of the shift position of the charger is calculated through the following steps:

calculating a direction and a distance of a shift position of the charger based on an angular velocity or/and an angle and an acceleration of the charger relative to a position from which the charger has shifted; and calculating the coordinate values of the shift position of the charger according to coordinate values of the position from which the charger has shifted, and the direction and the distance of the shift position of the charger relative to the position from which the charger has shifted.

21. The method for finding charger based on map constructing according to claim 20, wherein the updating constructed map based on coordinate values of a shift position of the charger when the mobile electronic device receives the coordinate values of the shift position of the charger transmitted by the charger which has shifted specifically comprises steps of:

moving the mobile electronic device to a position with the coordinate values of the shift position of the charger when the mobile electronic device receives the coordinate values of the shift position of the charger transmitted by the charger which has shifted;

taking coordinate values of a position of the charger where the charger is detected by the mobile electronic device as corrected coordinate values of the shift position of the charger; and updating constructed map based on corrected coordinate values of the shift position of the charger.

22. The method for finding charger based on map constructing according to claim 17, wherein the coordinate values of the location of the obstacle are calculated when the mobile electronic device detects the obstacle each time in the following manners:

sensing the obstacle by using a collision sensor, and taking coordinate values of the mobile electronic device as the coordinate values of the location of the obstacle when the collision sensor senses a collision with the obstacle; or detecting the obstacle by using a laser sensor/an infrared sensor, and obtaining the location of the obstacle relative to a current location of the mobile electronic device according to a calculation principle of laser/infrared distance when the laser sensor/the infrared sensor detects the obstacle, thus calculating the coordinate values of the location of the obstacle.

23. The method for finding charger based on map constructing according to claim 16, wherein the method further comprises step of:

correcting each said moving direction and each said moving distance of the mobile electronic device relative to the starting point based on an angular velocity or/and an angle and an acceleration of the mobile electronic device, and coordinate values are obtained according to corrected moving direction and corrected moving distance of the mobile electronic device relative to the starting point.

24. The method for finding charger based on map constructing according to claim 16, wherein each said locating tag is color block tag, the unique coding information is represented by a plurality of different colors, different shapes, combinations of different shapes and different colors or color blocks with different gray scales;

when the mobile electronic device has sensed tag information of any one of the color block tags by using a color sensor, enabling the mobile electronic device to move in a direction in which strength of tag information of the color block tag is gradually increasing until the strength of the tag information of the color block tag sensed by the mobile electronic device is equal to or greater than a preset maximum value or the mobile electronic device collides with the color block tag, and then taking a current location of the mobile electronic device as the location of the color block tag;

when the mobile electronic device has sensed tag information of any one of the color block tags by using a camera, the location of the color block tag relative to the mobile electronic device is determined based on number of pixels obtained by projecting a pattern of the color block tag onto CCD, thereby calculating the coordinate values of the color block tag; or when the mobile electronic device read tag information of the color block tags by using a camera, enabling the mobile electronic device to move in a direction in which a pixel value obtained by projecting a pattern of a color block tag onto CCD is gradually increasing until the pixel value obtained by projecting the pattern of the color block tag onto the CCD reach a certain threshold or the mobile electronic device collides with the color block tag, and then taking a current location of the mobile electronic device as the location of the color block tag.

25. The method for finding charger based on map constructing according to claim 16, wherein the mobile electronic device is a robot.

26. The method for finding charger based on map constructing according to claim 16, wherein the method is applicable for real-time mapping for an indoor area to be localized; the locating tag with exception of that on the charger is arranged on a left and/or right side wall of a door frame.

* * * * *